United States Patent
Yamada et al.

(10) Patent No.: US 8,228,529 B2
(45) Date of Patent: Jul. 24, 2012

(54) ADAPTER FOR COMMUNICATING WITH IMAGE SUPPLY DEVICE AND PRINTING DEVICE AND METHOD OF CONTROLLING THE SAME

(75) Inventors: Akitoshi Yamada, Yokohama (JP); Tetsuya Suwa, Yokohama (JP); Yusuke Hashii, Kawasaki (JP); Kentaro Yano, Yokohama (JP); Arata Miyagi, Kawasaki (JP); Takao Aichi, Ohta-ku (JP); Fumihiro Goto, Kawasaki (JP); Masao Kato, Kawasaki (JP); Mitsuhiro Ono, Koto-ku (JP); Fumitaka Goto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1060 days.

(21) Appl. No.: 11/448,461

(22) Filed: Jun. 7, 2006

(65) Prior Publication Data

US 2006/0285155 A1 Dec. 21, 2006

(30) Foreign Application Priority Data

Jun. 15, 2005 (JP) ................................. 2005-174925

(51) Int. Cl.
*G06F 3/12* (2006.01)
(52) U.S. Cl. ...... 358/1.15; 358/1.1; 358/1.16; 358/1.13; 358/500
(58) Field of Classification Search ................. 358/1.15, 358/1.1, 1.16, 1.13, 500
See application file for complete search history.

(56) References Cited

U.S. PATENT DOCUMENTS

| | | | |
|---|---|---|---|
| 6,327,044 B1 | 12/2001 | Shima | |
| 6,369,909 B1 | 4/2002 | Shima | |
| 6,433,884 B1* | 8/2002 | Kawakami | 358/1.15 |
| 2002/0080403 A1* | 6/2002 | Oshima | 358/1.15 |
| 2005/0030584 A1 | 2/2005 | Tanaka | |
| 2005/0052686 A1* | 3/2005 | Maruyama | 358/1.15 |

FOREIGN PATENT DOCUMENTS

| | | |
|---|---|---|
| JP | 11-184649 A | 7/1999 |
| JP | 11-305957 A | 11/1999 |
| JP | 3175620 | 4/2001 |
| JP | 03486553 B | 10/2003 |
| JP | 03495845 B | 11/2003 |
| JP | 03573466 B | 7/2004 |
| JP | 2005-056130 | 3/2005 |

OTHER PUBLICATIONS

Hiraki, Hiroshi et al.,Printing Server Device and Network Printing System,Jan. 29, 2004,JP 2004030153 A.*

* cited by examiner

*Primary Examiner* — Benny Q Tieu
*Assistant Examiner* — Martin Mushambo
(74) *Attorney, Agent, or Firm* — Canon USA Inc IP Division

(57) ABSTRACT

An adapter capable of communicating with an image supply device and an image output device and allowing direct printing even when a plurality of images are transferred at the same time from image supply devices. The adapter transmits a print request associated with a first image to the image output device. If acquisition of a second image is completed before acquisition of the first image completed, the adapter transfers the second image instead of the first image as the image to be printed.

11 Claims, 40 Drawing Sheets

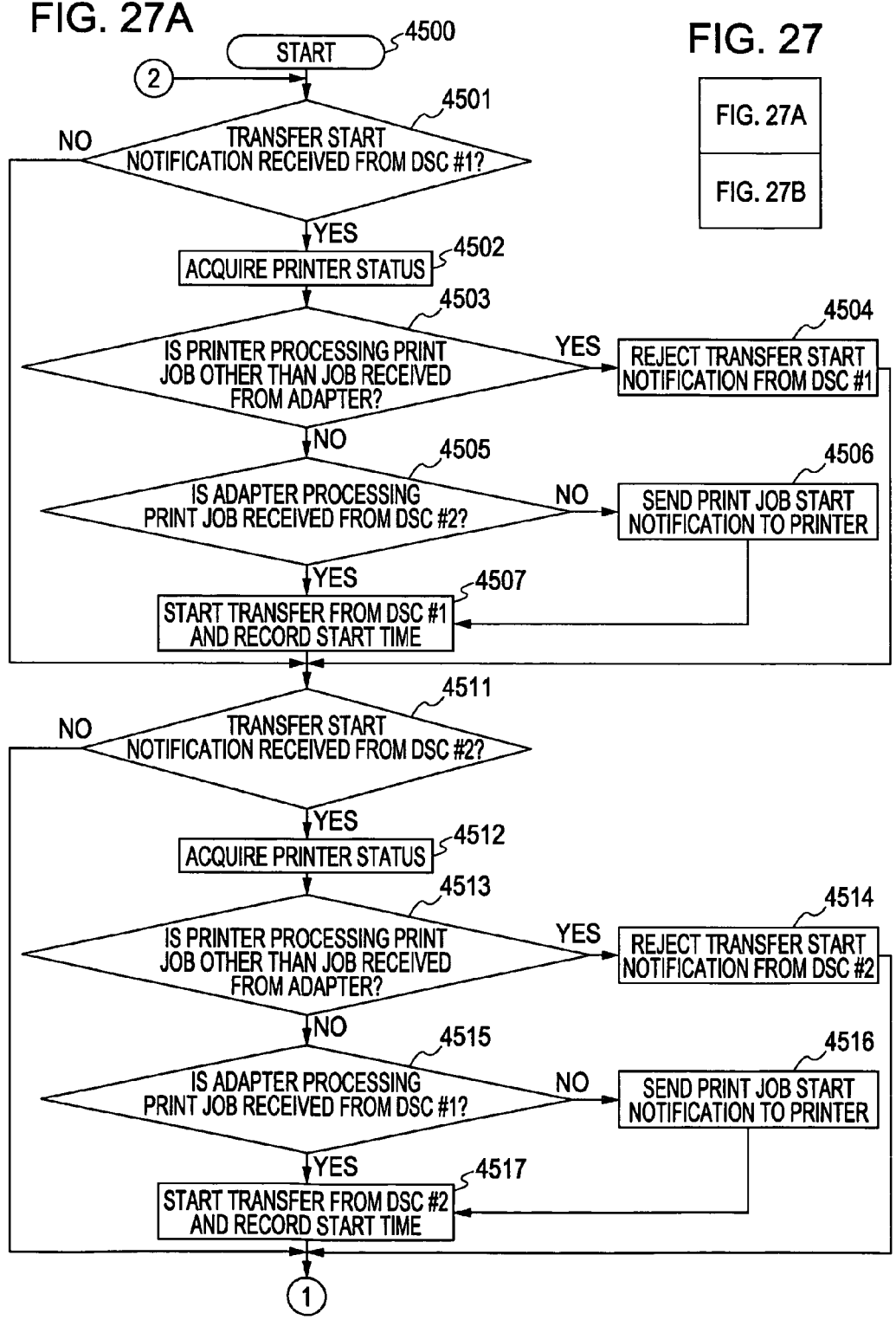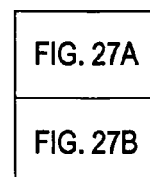

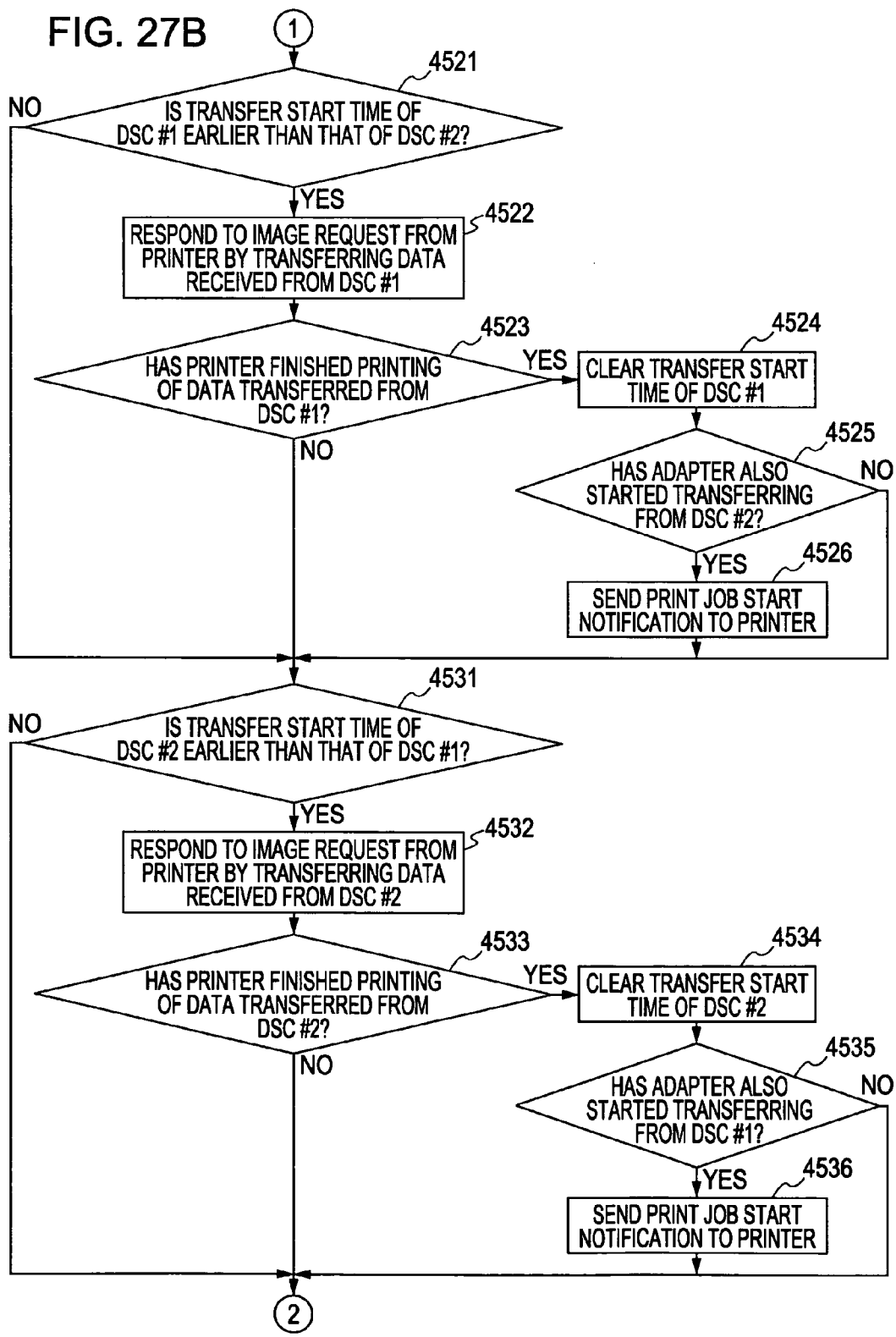

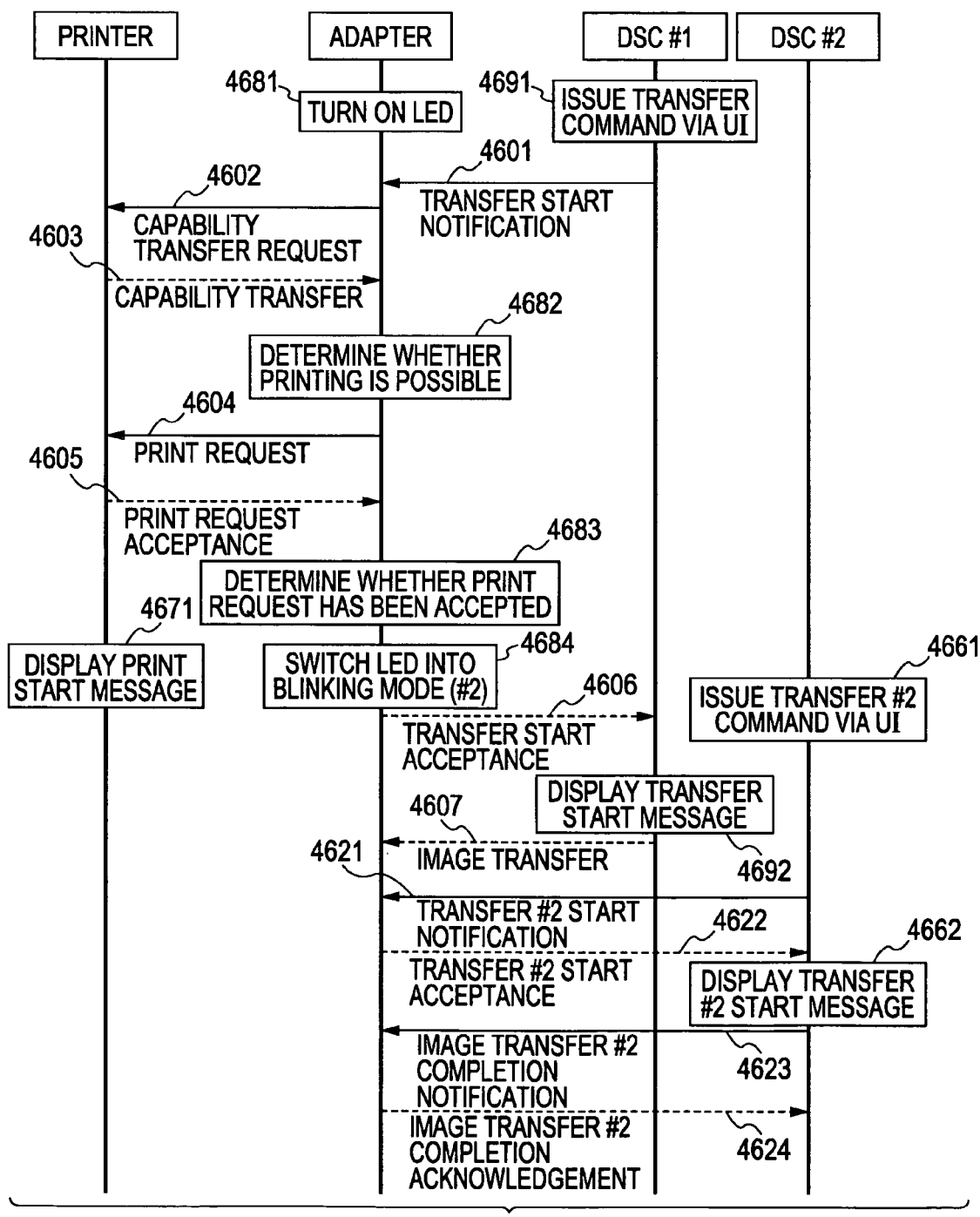

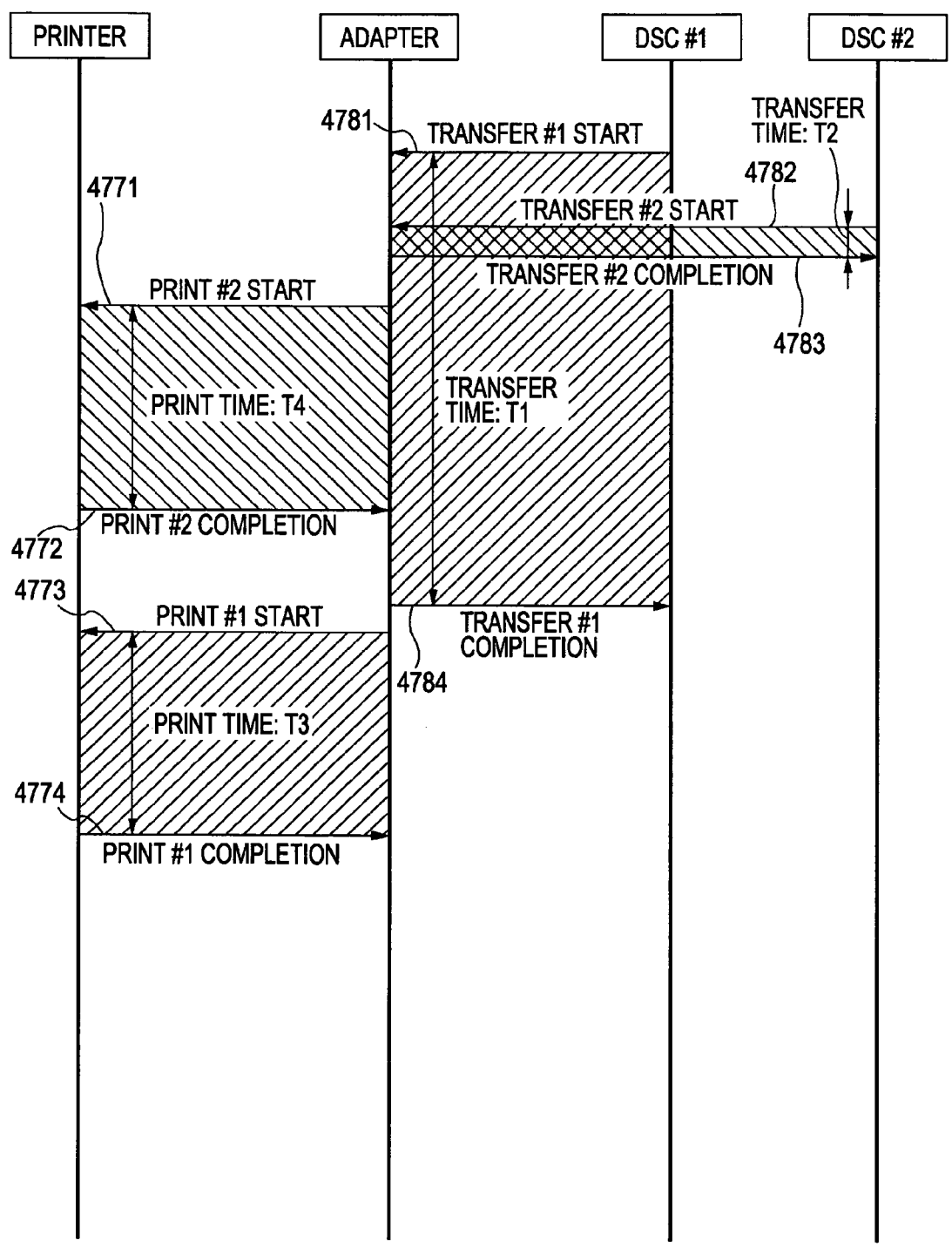

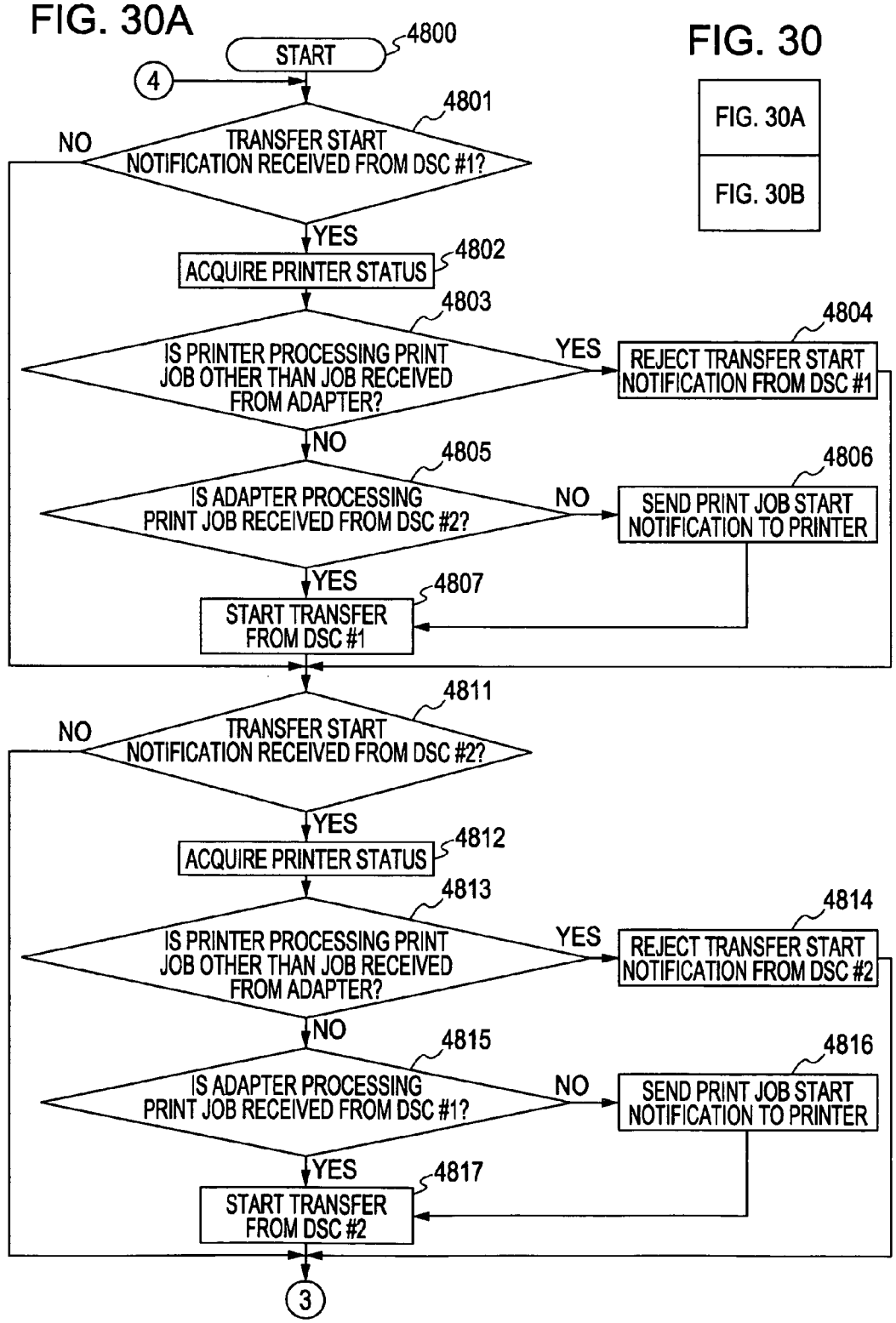
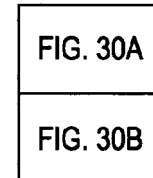
FIG. 30A
FIG. 30

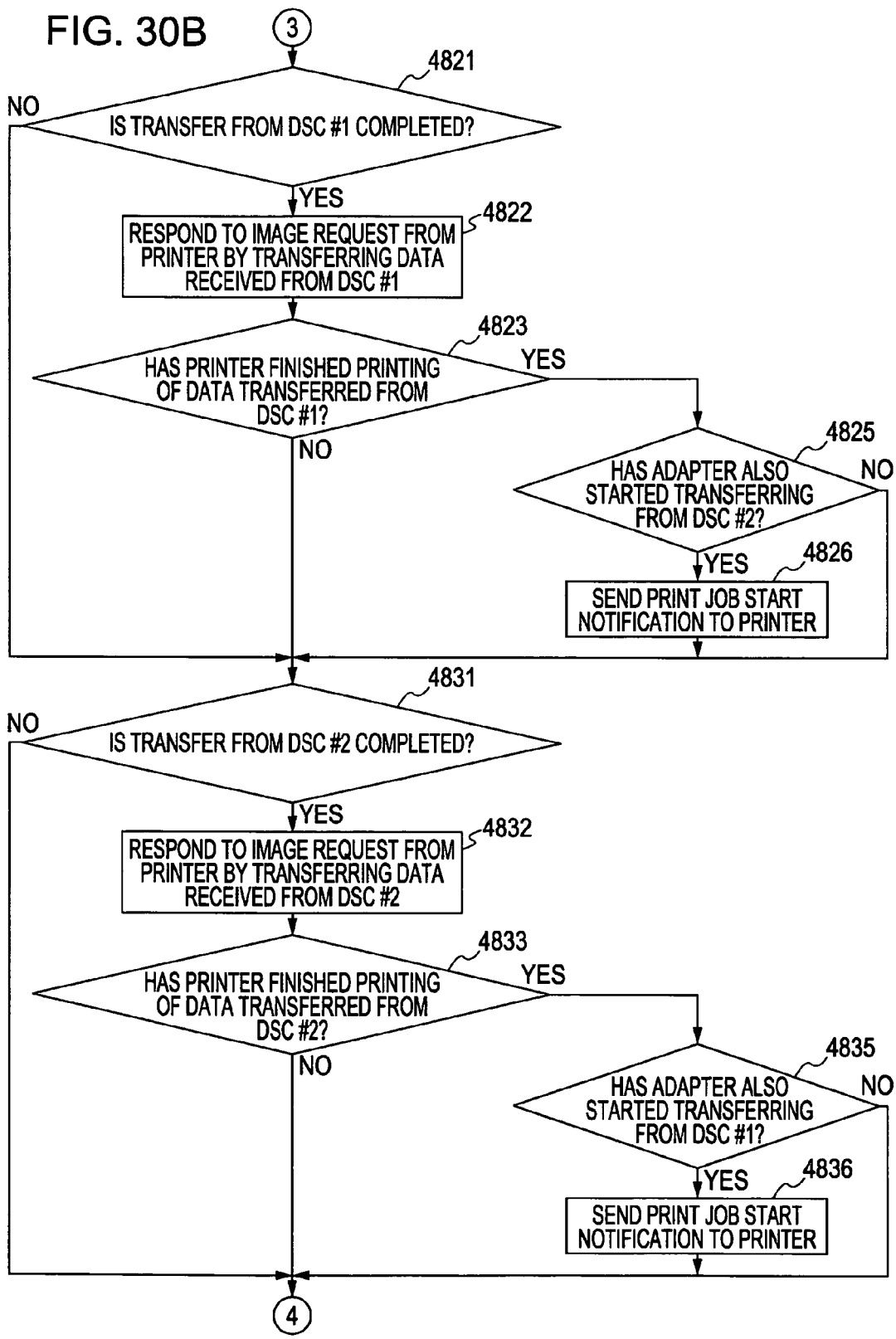

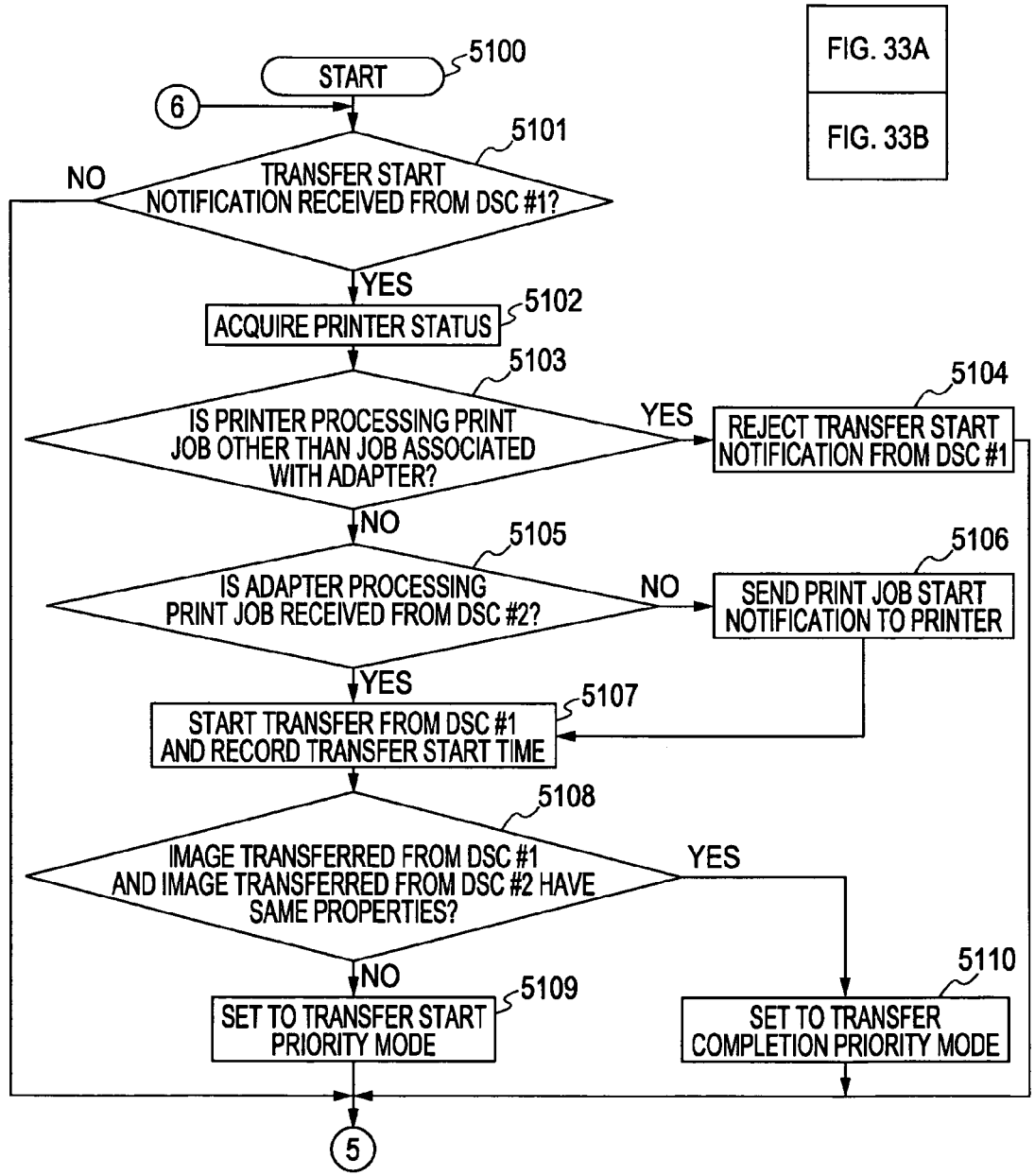

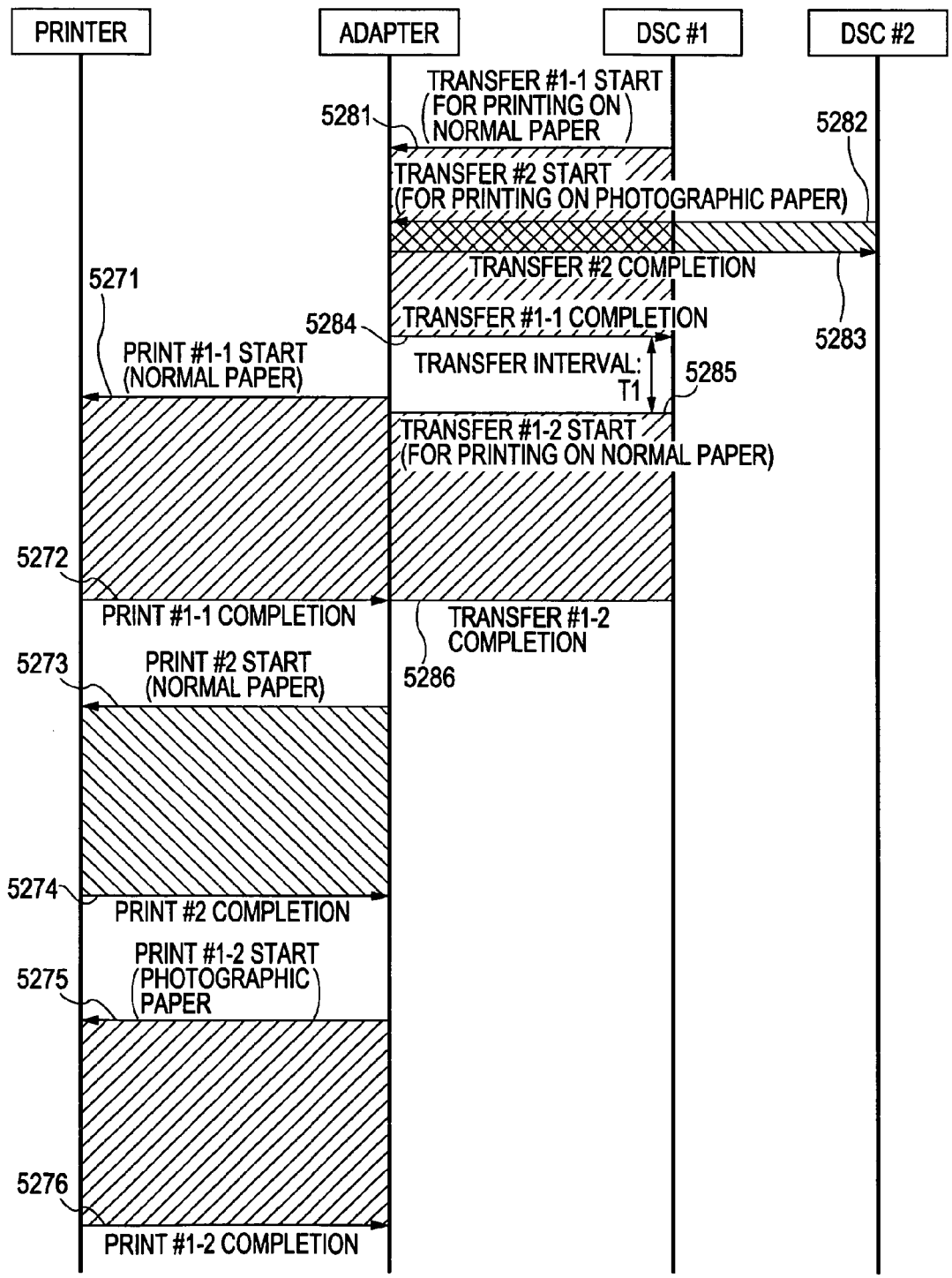

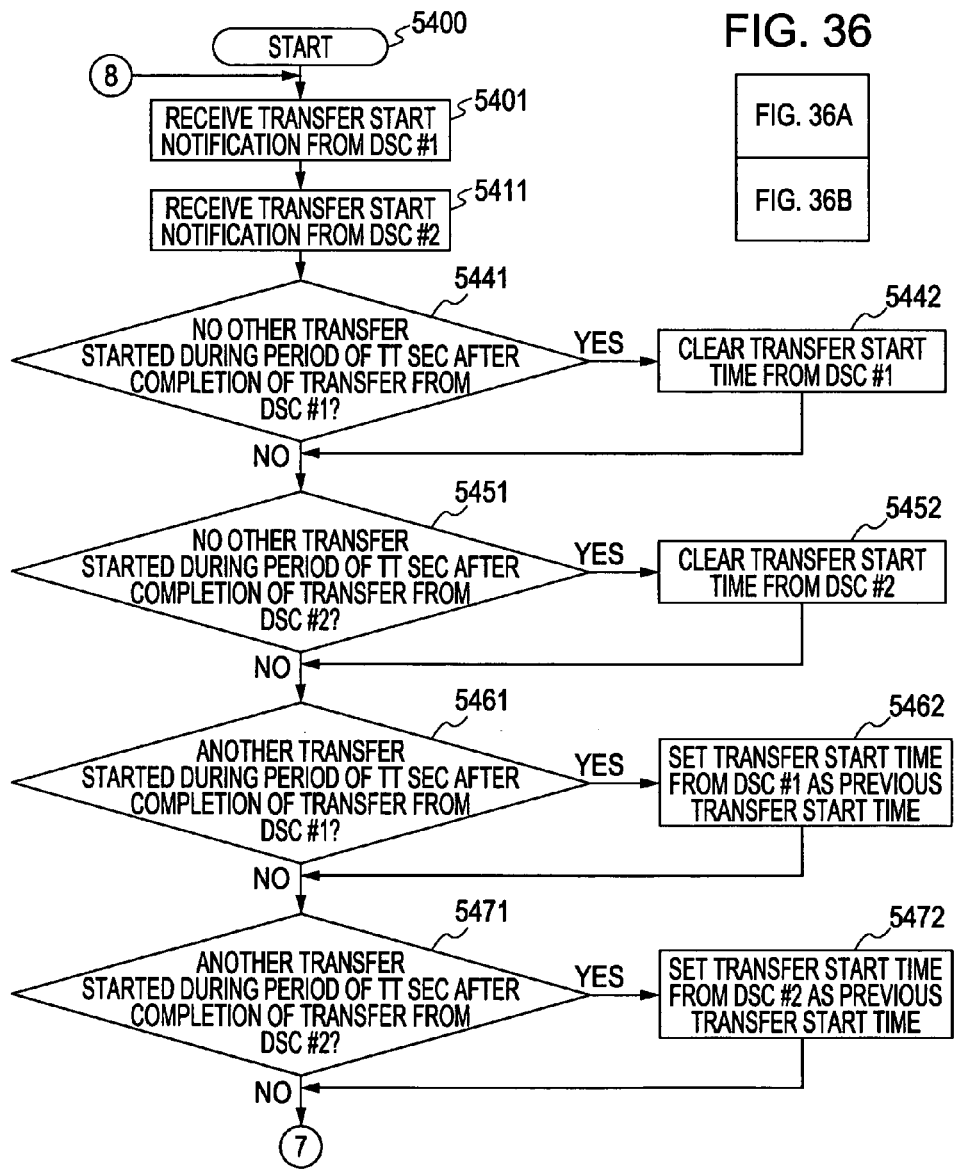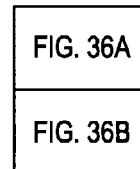

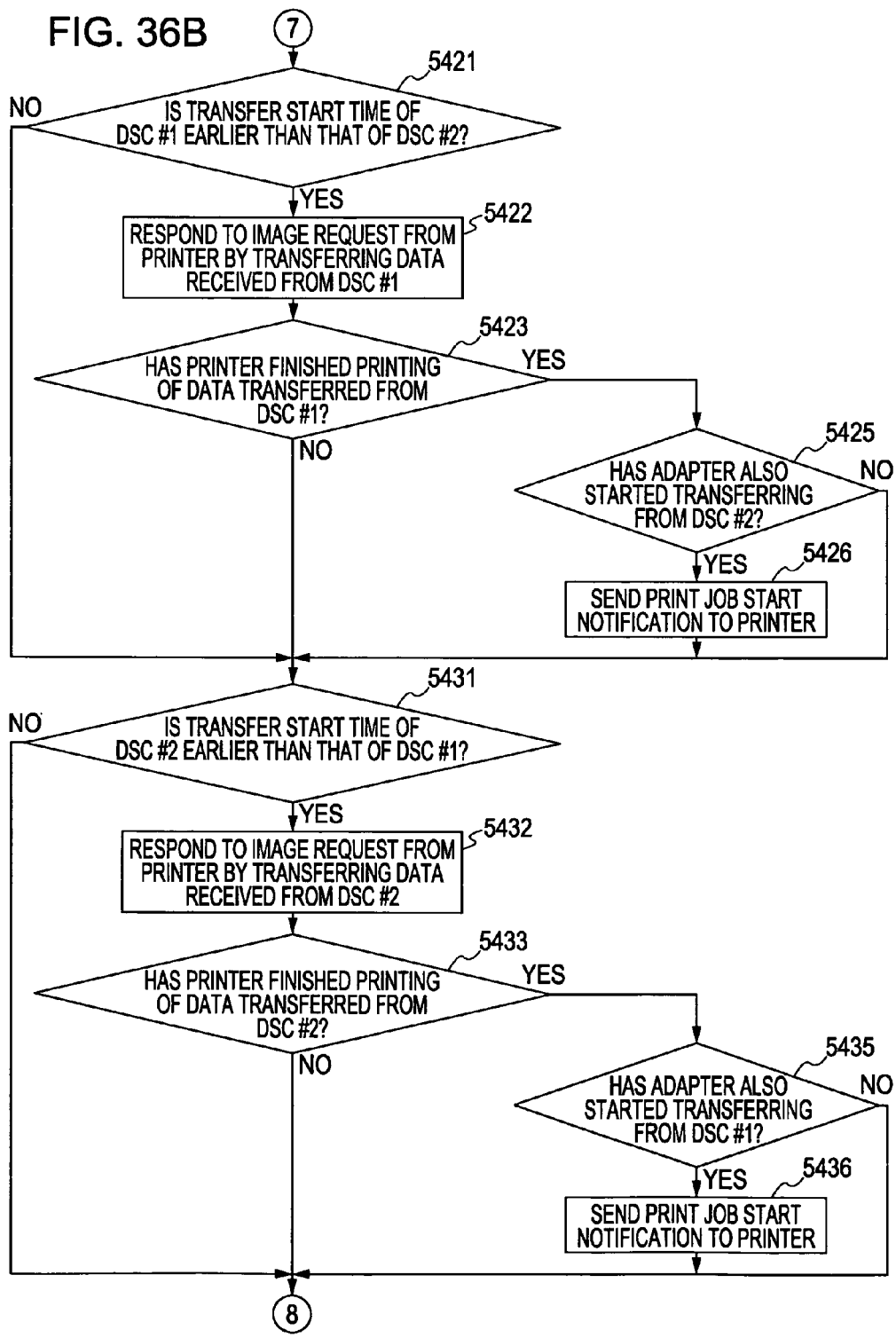

ADAPTER FOR COMMUNICATING WITH IMAGE SUPPLY DEVICE AND PRINTING DEVICE AND METHOD OF CONTROLLING THE SAME

BACKGROUND OF THE INVENTION

1. Field of the Invention

The present invention relates to an adapter capable of communicating with an image supply device and an image output device (printer) to print an image stored in the image supply device, and to a method of controlling such adapter.

2. Description of the Related Art

In recent years, a digital camera or an image sensing device capable of taking an image and converting the image into digital image data has become very popular. A direct print system is also widely used, which allows image data to be directly transmitted from a digital camera to a printer to obtain a printed photographic image.

However, the direct print function is provided in a preinstalled form, and it is very difficult or impossible to update the direct print function preinstalled in a digital camera or a printer after the digital camera or the printer was sold. Besides, direct print systems are not designed according to common standards or specifications, and there is no compatibility among different direct print systems. At present, most digital cameras and printers can be directly connected only when a USB connection is used. On the other hand, a camera-equipped mobile telephone having a wireless communication capability has become very popular, and some direct print systems allow a wireless connection between a printer and a camera-equipped mobile telephone.

In view of the above, there is a need for an adapter that allows different types of devices to be directly connected to a printer to achieve a direct print function.

In a conventional personal computer environment, a print conversion adapter called a print server is known, which allows a printer to be shared by a plurality of users and which also allows extension of functions of a printer.

FIG. 21 is a diagram showing a conventional print server system in a personal computer environment.

In this example, the print server system includes print servers 2115 and 2116 that respectively control printers 2117 and 2119, which are shared among clients 2111, 2112, and 2113. In this print server system, printing using, for example, the printer 2117, can be performed as follows.

First, a client (for example, the client 2111) sends document data to be printed to the print server 2115 via a network 2110. Each page of the document data includes a print command string that describes content such as characters, graphics, and images to be printed. The print command string is also called a PDL (Page Description Language).

If the print server 2115 receives the document data from the client 2111, the print server 2115 temporarily stores the received document data in a file called a spool in the print server 2115. The print server 2115 then reads the document data and transfers the data to the printer 2117 to print it. The printer 2117 performs printing on paper in accordance with the received document data.

As described above, the print server system is generally designed such that information is transmitted between a printer (such as the printer 2117 or 2119) and a print server (such as the print server 2115 or 2116) via a local connection, and such information is correctly transmitted to a client (such as the client 2111, 2112, or 2113) via the print server. Japanese Patent No. 03486553 discloses an adapter that acquires information about a printer status and sends the acquired information to a client. Japanese Patent No. 03573466 discloses a network print server that supports error notification, resumption, and cancellation of printing.

In general, a print server is designed after specifications of a printer are determined, and thus the print server can provide higher-level functions than the printer solely can. Japanese Patent Laid-Open No. 11-184649 (corresponding to U.S. Pat. No. 6,369,909) discloses a print server that can provide high-level functions and be used as an adapter of a plurality of printers having low-level functions. Japanese Patent No. 03495845 discloses a print server capable of registering functions of each of a plurality of printers and selecting a printer suitable for a given print job.

A direct print conversion adapter is used to provide functions very different from functions provided by a conventional print server used in a personal computer environment.

When a direct print conversion adapter is produced, if a newly designed direct print protocol is employed, it is difficult to ensure the compatibility with a large number of existing products. To avoid such problem, it is necessary to directly employ an existing direct print protocol.

There are large differences among direct print protocols which are currently used, and such differences can cause a problem in that information about a printer is not correctly sent to a digital camera or the like. For example, in many direct printing systems in which devices are wirelessly connected, a file transfer protocol designed to transfer data from a digital camera to a printer is used. However, the file transfer protocol used in such direct printing systems does not have specifications in terms of transmission of status information or device information specific to direct printing from a printer to a digital camera and transmission of print job information from the digital camera to the printer.

Even if the problems described above are solved, a new problem can occur as described below with reference to a specific example.

When an image file to be printed is transferred from a mobile telephone having a camera and an infrared transmitting/receiving device according to the IrDA (Infrared Data Association) standard, if an adapter receives the image file via an infrared transmitting/receiving device provided in the adapter, the adapter issues a print job to print the image file to a printer. If transferring the image file from the camera-equipped mobile telephone is successfully completed, the adapter returns a transfer completion response to the camera-equipped mobile telephone.

In the above process, if the print job is issued to the printer after the transfer completion response was returned, there occurs a possibility that the printer cannot immediately process the received print job, for example, because the printer is printing data received from a personal computer or because the printer has an error such as a "no paper" error. A user of the camera-equipped mobile telephone cannot determine, based on the operation result (the completion of the transfer) of the camera-equipped mobile telephone, whether the printing was actually completed.

In a situation in which a printer is connected to a personal computer, there is a possibility that a print request is issued by the personal computer when transferring an image file from a camera-equipped mobile telephone is in process. In this case, if, in this printer, higher priority is assigned to printing for data supplied from the personal computer, a print request issued from the personal computer is performed in preference to the image data being transmitted from the mobile telephone with camera. For example, when a user sets an L-size photographic paper on the printer with the intention of printing an image stored in the mobile telephone with camera, if another user issues a print start command via the personal computer to print a document produced by the personal computer, the document is printed on the L-size photographic paper.

In the conventional technique, there is no consideration on a proper process to be performed when image data are transferred at the same time from a plurality of sending devices. For example, when an adapter having a plurality of connection units is receiving image data concurrently from a plurality of camera-equipped mobile telephones, there is a possibility that the transfer is completed earlier for image data whose transfer was started later than for image data whose transfer was started earlier, because the transfer time depends on the size of image data and transfer method. In this situation, if a print job associated with image data whose transfer was started earlier was issued earlier than a print job associated with image data whose transfer was started later, then the image data whose transfer was started later and was completed earlier is not printed immediately after completion of the transfer, and has to wait until printing of the image data started to be transferred earlier is completed. This results in an unnecessary increase in total time from the start of transfer to the completion of printing.

If printing is started simply in the same order as the order in which transferring is completed, there is a possibility that when different paper sizes or different paper types are specified for respective image data, printing is performed on paper which is wrong in type or size, as in the above-described case in which a personal computer is connected to a printer.

Transfer methods such as IrDA and Bluetooth are designed separately without taking into account the possibility that different transfer methods are used in the same system in which a plurality of devices are connected to a printer via a single adapter with a plurality of connection ports for respective transfer methods and the plurality of devices are allowed to transfer image data to be printed to the printer. That is, the adapter is not designed to handle a plurality of image data transferred at substantially the same time from different devices via different transfer methods such as IrDA and Bluetooth.

SUMMARY OF THE INVENTION

The present invention is directed to an adapter and a method of control thereof.

According to one aspect of the present invention, an adapter adapted to communicate with an image supply device and an image output device in order to print, via the image output device, an image stored in the image supply device, includes a first acquisition unit adapted to acquire a first image from the image supply device, a second acquisition unit adapted to acquire a second image from the image supply device, a print request transmission unit adapted to transmit a print request to the image output device to print the first image, and a transfer unit adapted to transfer an image to be printed to the image output device, wherein responsive to the second acquisition unit completely acquiring the second image before the first acquisition unit completely acquiring the first image, the transfer unit transfers the second image, instead of the first image, as the image to be printed.

Further features of the present invention will become apparent from the following description of exemplary embodiments with reference to the attached drawings.

BRIEF DESCRIPTION OF THE DRAWINGS

FIGS. 25, 25A and 25B are diagrams showing an operation sequence of direct printing in an environment in which image data is supplied from a plurality of image supply devices.

FIGS. 27, 27A and 27B are flow charts of direct printing in an environment in which image data is supplied from a plurality of image supply devices.

FIGS. 28, 28A, and 28B are diagrams showing an operation sequence in a transfer completion priority mode according to an embodiment of the present invention.

FIG. 29 is a timing chart of an operation in a transfer completion priority mode according to an embodiment of the present invention.

FIGS. 30, 30A, and 30B are flow charts of an operation in a transfer completion priority mode according to an embodiment of the present invention.

FIGS. 33, 33A, and 33B are flow charts of an improved operation in a transfer completion priority mode according to an embodiment of the present invention, wherein an occurrence of a problem is prevented.

FIG. 34 is a timing chart associated with direct printing in an environment in which image data is supplied from a plurality of image supply devices according to an embodiment of the present invention, wherein there is a possibility that a problem can occur.

FIGS. 36, 36A, and 36B are flow charts of an improved direct printing operation in an environment in which image data is supplied from a plurality of image supply devices according to an embodiment of the present invention, wherein an occurrence of a problem is prevented.

DESCRIPTION OF THE EMBODIMENTS

The present invention is described in further detail below with reference to embodiments in conjunction with the accompanying drawings. Note that that the present invention is not limited to those embodiments described below, and note that it is not necessarily needed to combine all features described in embodiments to achieve advantages of the present invention.

Overview of Adapter

Figure 4:
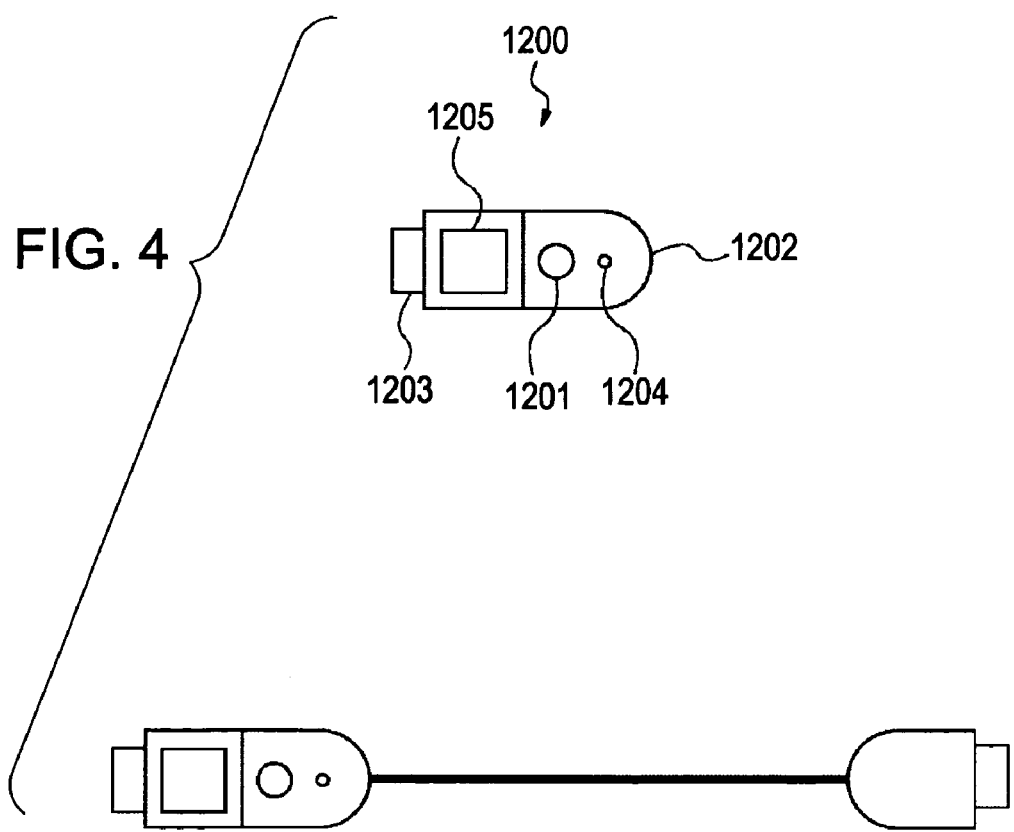
FIG. 4 is a schematic diagram of an adapter according to an embodiment of the present invention.

FIG. 4 shows an outside view of an adapter 1200 according to an embodiment of the present invention.

Reference numeral 1201 denotes a print resume button used to resume a printing operation in a state in which printing is suspended. Note that the print resume button 1201 may be assigned another function when an operation other than a print job is performed. For example, the button 1201 may also be used as a paper size selection button for selecting a size of paper to be used. The paper size selection button and the resume button may be provided separately. In addition to the paper size selection button, various operation buttons such as a layout button, a number-of-copies button, a date setting button, and other setting buttons may be provided separately.

Reference numeral 1202 denotes an infrared transmitting and receiving unit for infrared communication.

Reference numeral 1203 denotes a USB terminal for connection with a direct printing terminal of the printer.

Reference numeral 1204 denotes a status indication LED for indicating the status of the adapter 1200. The status indication LED 1204 can switch color or blinking mode depending on the status of the adapter 1200 so that a user can know the status of the adapter 1200 from the status of the LED 1204. For example, the status of the LED 1204 is switched depending on whether the adapter 1200 is waiting for a print job to be issued, has accepted a print job, is receiving image data, is handling a print job, has a print error, or has a transfer error.

In addition to the LED for indicating the status of the adapter, LEDs (not shown) functioning as user interfaces may also be provided. For example, LEDs may be disposed to indicate the paper size. In this case, character strings (such as "A4", "Post Card", "Card", etc.) indicating paper sizes are printed in areas close to the respective LEDs, and a turn-on LED is switched each time the operation button 1201 is pressed.

In addition to the paper sizes, LEDs may also be provided to indicate setting results in terms of, for example, the layout, the number of copies, the date, etc. To indicate a numeric value, a 7SEG LED or an LCD may be used.

Instead of printing the character strings indicating the paper sizes directly on the case of the adapter, labels may be stuck to the case. In this case, various labels corresponding to various paper sizes which may depend on countries (such as an A4 size, an L-size, a post card size, etc, in Japan or a letter size, a 4×6 size, a card size, etc. in the USA) are prepared, and proper labels are stuck to the case. A proper ROM (described later) is installed in the adapter so that the adapter is realized in a proper form depending on the country where the adapter is used.

Reference numeral 1205 denotes a logo label indicating that the adapter supports the direct print function, that is, the adapter can connect via the USB terminal 1203 with a printer that supports the direct print function.

Instead of sticking the logo label, a logo may be directly printed or inscribed on the adapter case.

Overview of Electrical Specifications of Adapter

Figure 8:
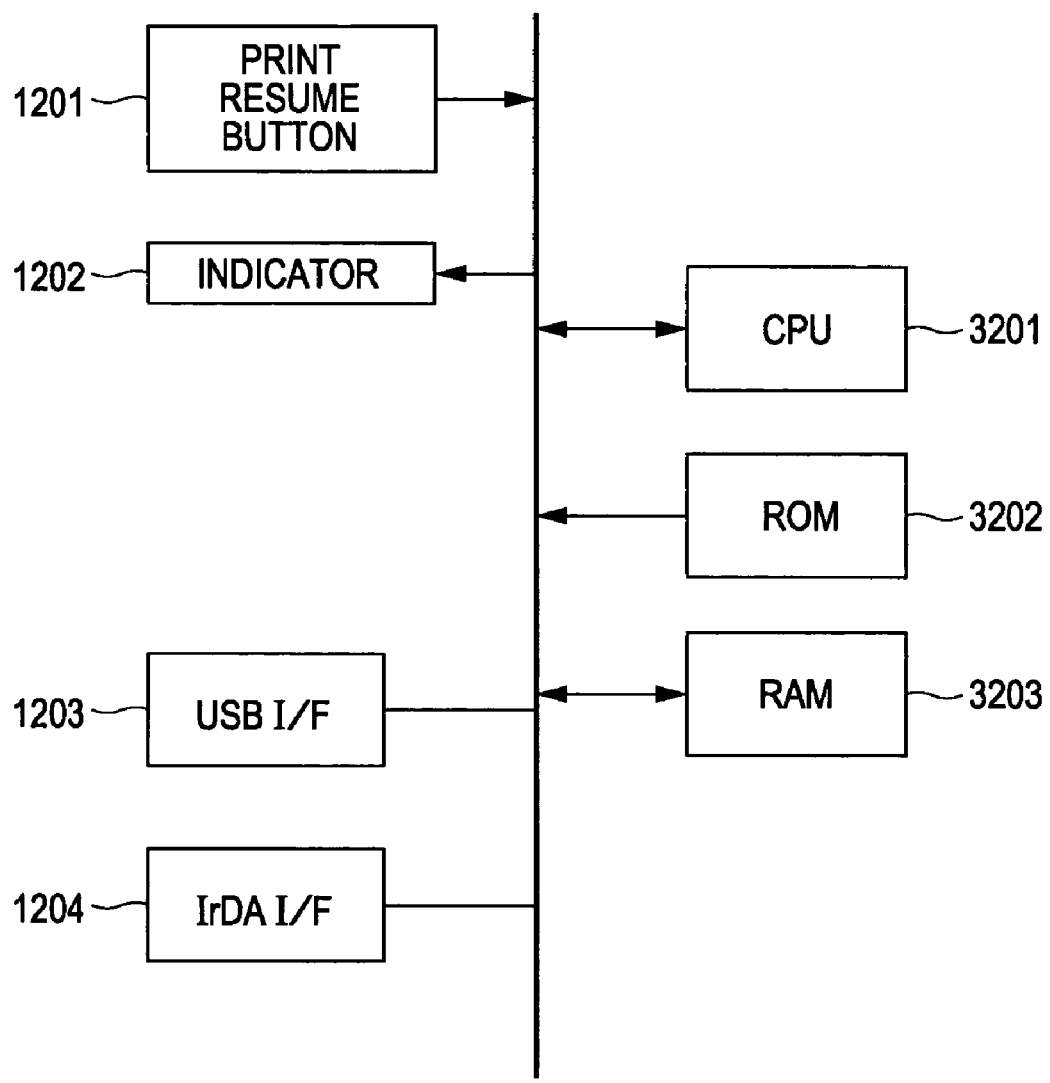
FIG. 8 is a block diagram showing main parts, relating to control, of an adapter according to an embodiment of the present invention.

With reference to FIG. 8, main parts, relating to control, of the adapter 1200 according to the present embodiment of the invention are described below. In FIG. 8, similar parts to those in the previous figures are denoted by similar reference numerals, and a duplicate explanation thereof is omitted.

Reference numeral 3201 denotes a CPU responsible for control of the operation of the adapter.

Reference numeral 3202 denotes a ROM, in which a processing procedure (firmware) performed by the CPU 3201 is stored. In order to allow the firmware to be updated, a nonvolatile writable memory such as a flash memory may be employed as the ROM 3202.

Reference numeral 3203 denotes a RAM, which is used as a work area by the CPU 3201. As for the RAM 3203, a volatile memory, whose content is lost when the power is turned off, may be used. As with the ROM 3202, a nonvolatile memory such as a flash memory may also be used for the RAM 3203. Various types of memories may be used together or separately depending on the purpose. For example, image files may be stored in a nonvolatile storage area so that the image files are retained even after the power of the adapter is turned off and so that the image files can be used when the power of the adapter is turned on again.

Overview of PD Printer

Figure 1:
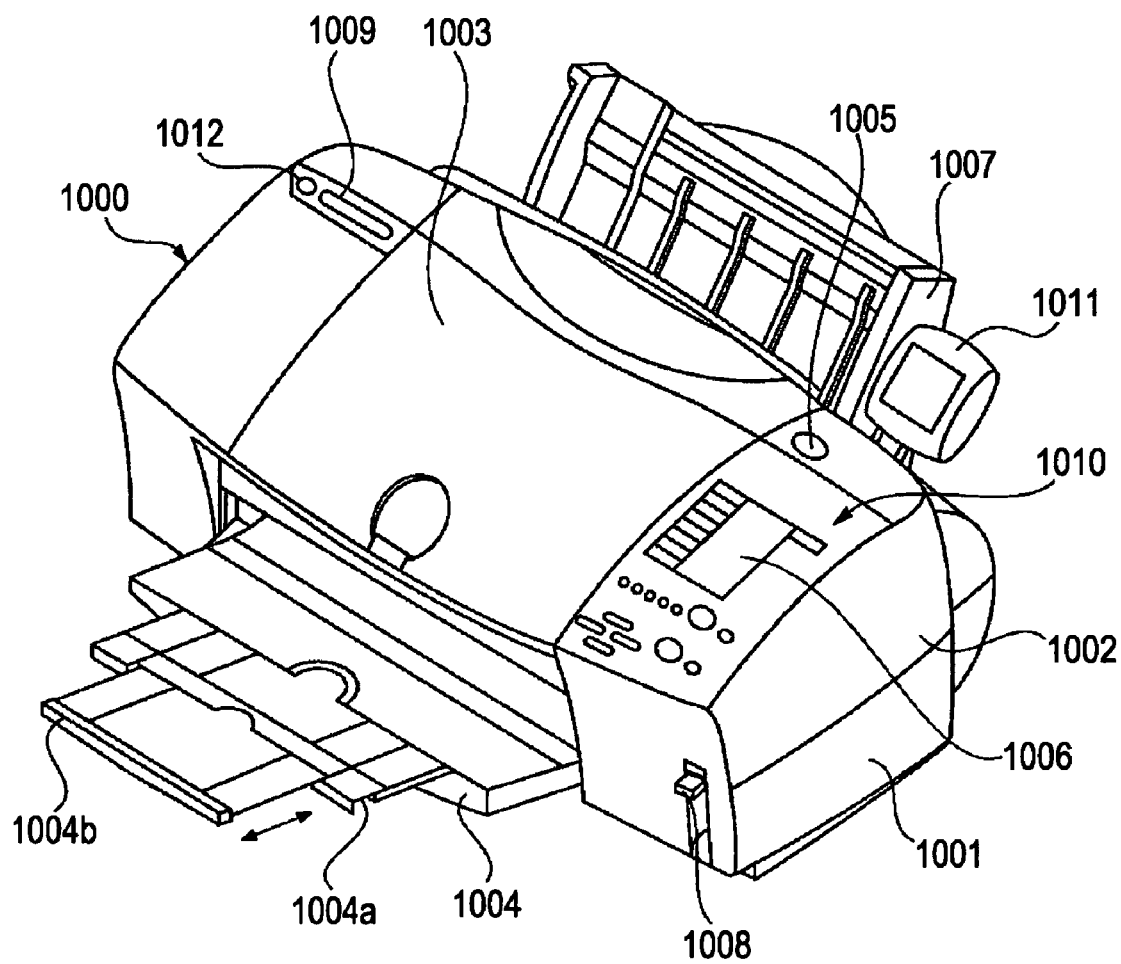
FIG. 1 is a schematic perspective view of a PD printer according to an embodiment of the present invention.

FIG. 1 is a schematic perspective view showing a photo direct printer (hereinafter, referred to as a PD printer) 1000 according to an embodiment of the present invention. The PD printer 1000 not only has functions, as with a usual PC printer, of receiving data from a host computer (a personal computer) and printing the received data but also functions of directly reading image data stored in a storage medium such as a memory card and printing the read image data and/or receiving image data from a digital camera, a PDA device, or the like and printing the received image data.

As shown in FIG. 1, the PD printer 1000 according to the present embodiment has exterior parts including a lower case 1001, an upper case 1002, an access cover 1003, and a paper output tray 1004. The lower case 1001 forms a substantially lower half part of the PD printer 1000, and the upper case 1002 forms a substantially upper half part of the PD printer 1000. The lower case 1001 and the upper case 1002 are combined together such that an inner space is created between them for installing various mechanisms, which will be described below. An opening is formed in the upper surface, and another opening is formed in a front surface. An end of the paper output tray 1004 is connected to the lower case 1001 such that the paper output ray 1004 can be turned about that end. By turning up or down the paper output tray 1004, the opening in the front surface of the lower case 1001 can be closed or opened. When a printing operation is performed, the paper output tray 1004 is turned down from a vertical position so that the opening is opened and sheets (such as normal paper, special paper, plastic sheets, etc.) can be ejected onto the tray 1004 after being printed. The ejected sheets are stacked on the paper output tray 1004. The paper output tray 1004 accommodates two auxiliary trays 1004a and 1004b, which can be drawn out to extend the total tray area and allow the total tray area to be changed at three levels.

One end of the access cover 1003 is connected to the upper case 1002 such that the access cover 1003 can be turned about that end and such that when the access cover 1003 is turned up or down, the opening in the upper surface of the upper case 1002 is opened or closed. When the access cover 1003 is in the open state, it is possible to exchange a print head cartridge (not shown) or an ink tank (not shown) disposed inside the main body of the printer. Although not shown in the figure, when the access cover 1003 is opened or closed, a protrusion formed on the back surface of the access cover 1003 rotates a cover open/close lever, and the status of the access cover 1003 in terms of the position is detected by detecting the position of the cover open/close lever using a microswitch or the like.

A power switch 1005 is disposed on the upper surface of the upper case 1002. An operation panel 1010 including a liquid crystal display 1006 and various key switches is disposed on the right-hand side of the upper case 1002. The structure of the operation panel 1010 will be described in detail below with reference to FIG. 2. Reference numeral 1007 denotes an automatic sheet feeder that automatically feeds sheets one by one into the main body of the printer. Reference numeral 1008 denotes a lever for adjusting the space between paper and a print head. Reference numeral 1009 denotes a card slot for inserting the adapter capable to which a memory card is attached. When the adapter is inserted in this card slot 1009, it is possible to directly read image data from the memory card into the printer to perform printing. The memory card can be, for example, a compact flash (registered trademark) memory, a smart media, a memory stick, or a similar memory device. Reference numeral 1011 denotes a viewer (using a liquid crystal display) which is removably attached to the main body of the PD printer 1000. The viewer 1011 is used to display images on a one-by-one basis or display an index image when an image to be printed is retrieved from images stored in the memory card. Reference numeral 1012 denotes a USB terminal for connection with a digital camera. The adapter 1200 according to the present embodiment of the invention is connected to this USB terminal 1012. A USB connection for connection with a personal computer (PC) is disposed on the rear side of the PD printer 1000.

Operation Unit of Printer

Figure 2:
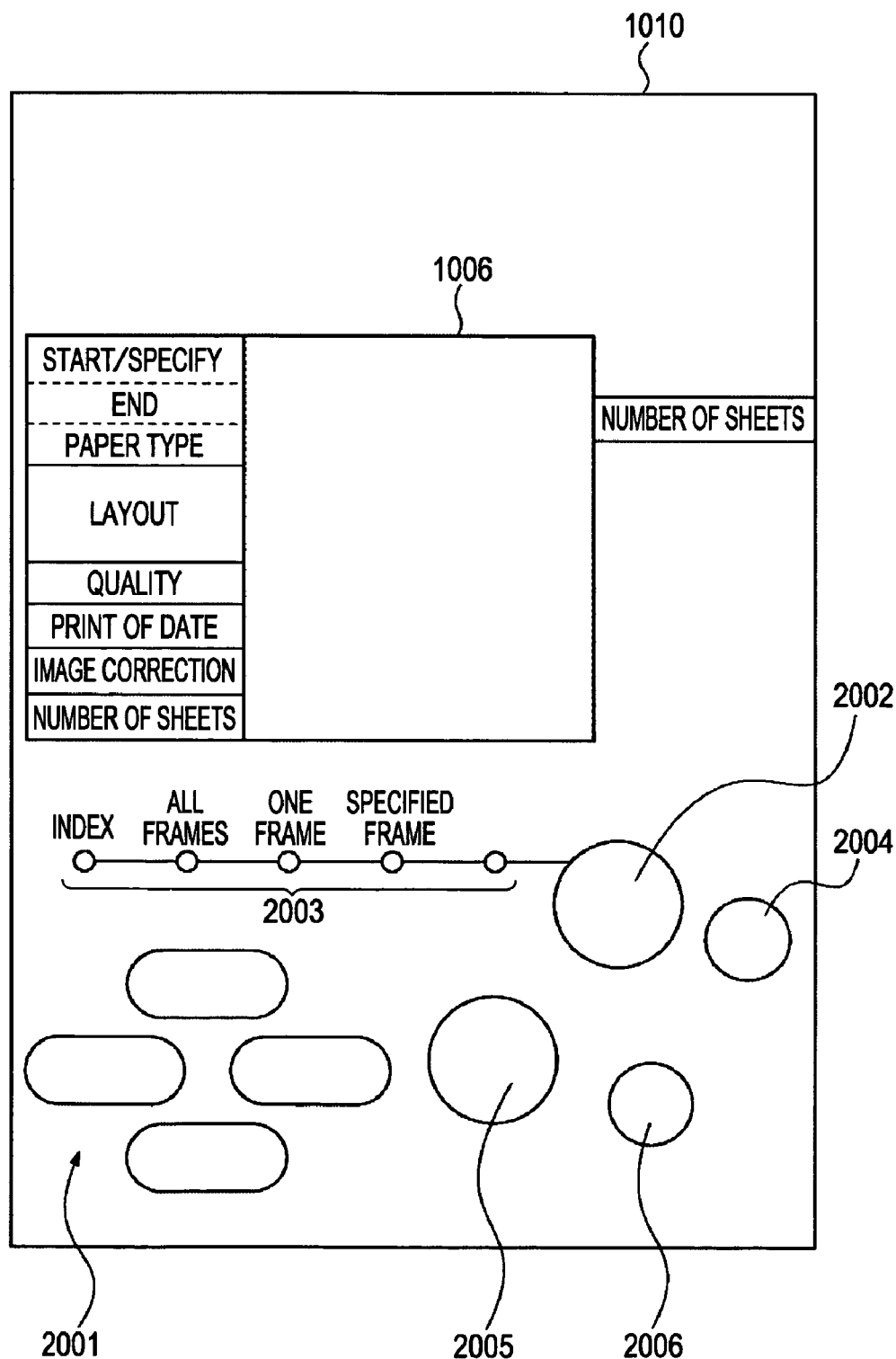
FIG. 2 is a schematic diagram showing an operation panel of a PD printer according to an embodiment of the present invention.

FIG. 2 is a schematic diagram showing an operation panel 1010 of the PD printer 1000 according to the present embodiment of the invention.

As shown in FIG. 2, a menu facilitating setting various items is displayed on the liquid crystal display 1006. The items of the menu include, for example, the "start/specified" image number for specifying the start image number of images to be printed or a particular image to be printed from images stored in a photographic image file, the "end" image number for specifying the final image number of images to be printed, the "number of copies" to be printed, the "paper type" for specifying the type of paper to be used in printing, the "layout" for specifying the layout of a plurality of images to be printed on a single sheet, the "quality" for specifying the print quality, the "print of date" for specifying whether to print the date of taking an image, the "image correction" for specifying whether to correct an image to be printed, and the "number of sheets" for specifying the number of sheets to be printed. Any of these items can be selected or specified using a cursor key 2001. Each time a mode key 2002 is pressed, the print mode is toggled from one print mode to another (of available print modes including an index print mode, an all-frame print mode, a single-frame print mode, a specified frame print mode, etc.), and an LED 2003 corresponding to the selected print mode is turned on. Reference numeral 2004 denotes a maintenance key used to perform maintenance such as cleaning of a print head or maintenance of other parts of the printer. Reference numeral 2005 denotes a print start key, which is pressed to start printing or to start a maintenance operation. Reference numeral 2006 denotes a print stop key, which is pressed to stop printing or to stop the maintenance operation.

Electrical Specifications of PD Printer

Figure 6:
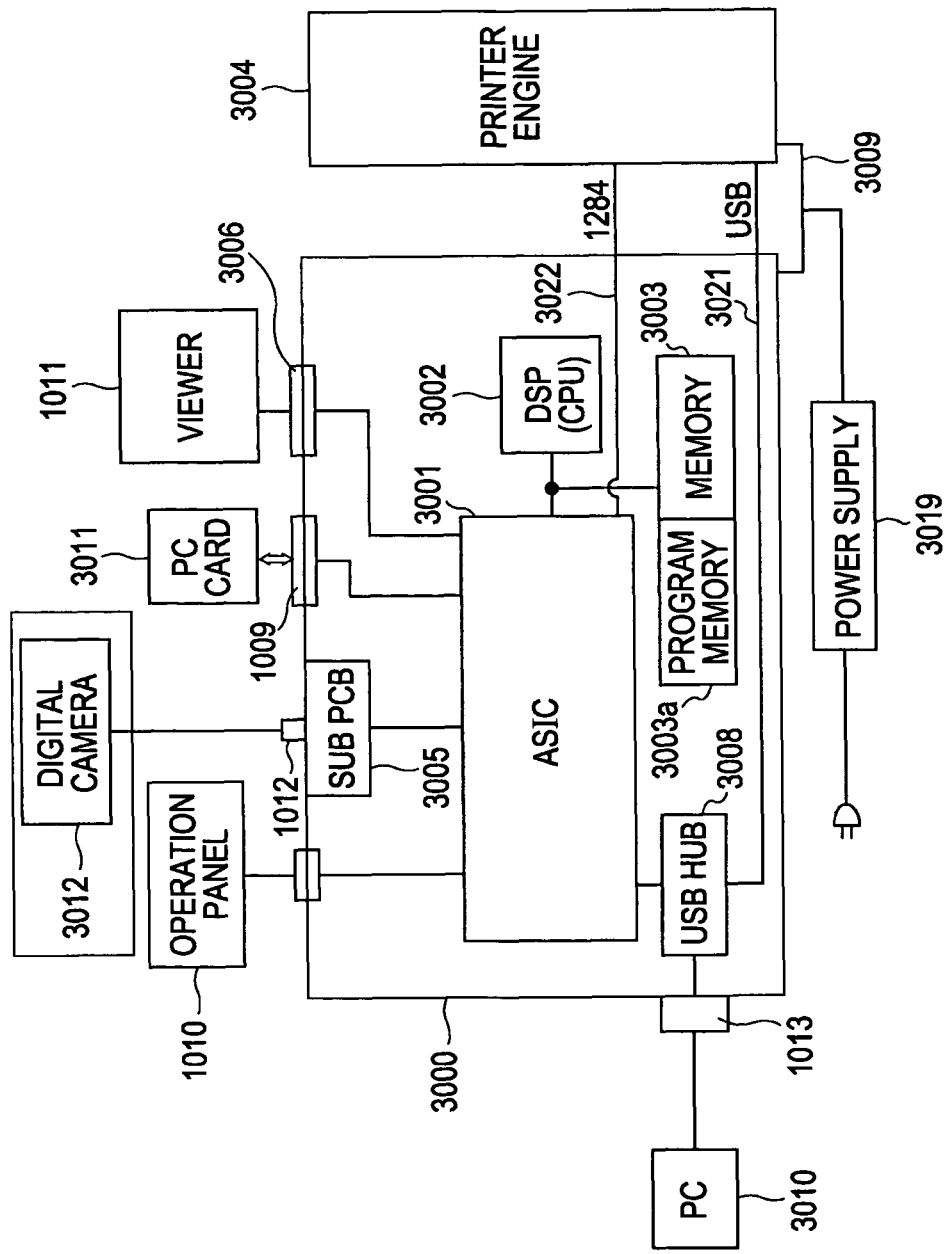
FIG. 6 is a block diagram showing main parts, relating to control, of a PD printer according to an embodiment of the present invention.

Main parts, relating to control, of the PD printer 1000 according to the present embodiment of the invention are described below with reference to FIG. 6. In FIG. 6, similar parts to those in previous figures are denoted by similar reference numerals and a duplicated explanation thereof is omitted.

In FIG. 6, reference numeral 3000 denotes a controller (a controller board). Reference numeral 3001 denotes an ASIC (a custom LSI). Reference numeral 3002 denotes a DSP (Digital Signal Processor), which includes a CPU and which is responsible for controlling various operations and image processing including a conversion from a luminance signal (RGB) to an intensity signal (CMYK), scaling, a gamma conversion, an error diffusion process, etc. Reference numeral 3003 denotes a memory including a program memory 3003a for storing control program that controls the CPU of the DSP 3002 and also including memory areas such as a RAM area for storing a program to be executed, a work memory area for storing image data, etc. Reference numeral 3004 denotes a printer engine. In this specific embodiment, the printer engine 3004 is assumed to function as an engine of an ink-jet printer capable of printing a color image using a plurality of color inks. Reference numeral 3005 denotes a USB connector serving as a port for connecting a digital still camera (DSC) 3012. Reference numeral 3006 denotes a connector for connecting a viewer 1011. Reference numeral 1013 denotes a USB connector serving as a port for connecting a PC 3010. Reference numeral 3008 denotes a USB hub. When the PD printer 1000 performs printing in accordance with image data supplied from the PC 3010, the image data is simply passed through the USB hub 3008 and transferred to the printer engine 3004 via a USB bus 3021. This allows the connected PC 3010 to directly communicate with the printer engine 3004 to perform printing (in this case, the PD printer 1000 operates in a similar manner as a usual PC printer). Reference numeral 3009 denotes a power connector for inputting a DC voltage output from a power supply 3019 which generates the DC voltage by conversion from commercial AC electric power. Reference numeral 3010 denotes a personal computer (PC) of a common type. Reference numeral 3011 denotes a memory card (PC card). Reference numeral 3012 denotes a digital still camera (DSC).

Note that signals are transmitted between the controller 3000 and the printer engine 3004 via the USB bus 3021 described above.

Overview of Camera-Equipped Mobile Telephone

Figure 3:
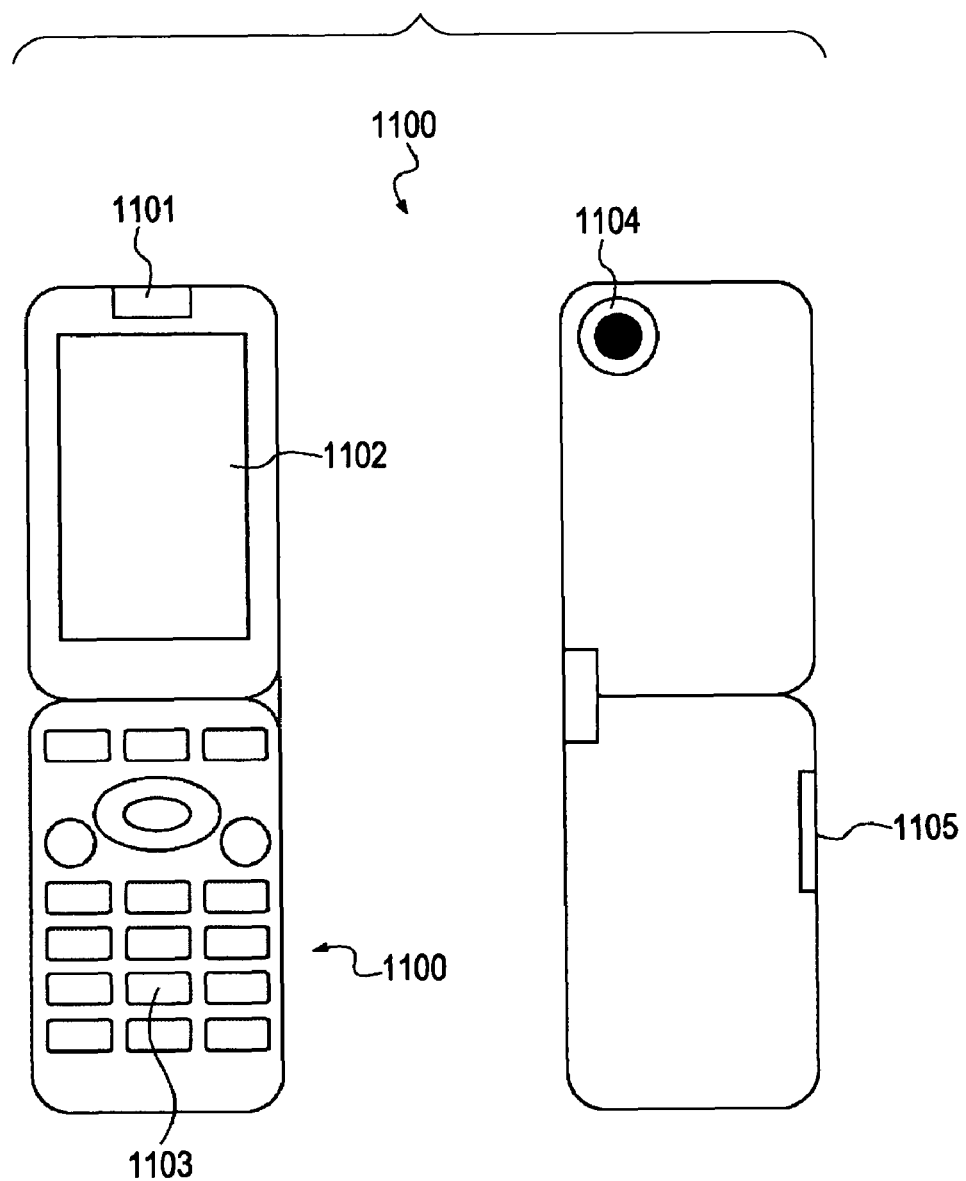
FIG. 3 is a schematic diagram of camera-equipped mobile telephone according to an embodiment of the present invention.

FIG. 3 is an outside view of a camera-equipped mobile telephone capable of transmitting image data to be printed in the direct printing mode to the PD printer 1000 via the adapter 1200 according to the present embodiment of the invention.

Reference numeral 1101 denotes an infrared transmitting and receiving unit for infrared communication. In addition to communication with the adapter 1200, this infrared transmitting and receiving unit 1101 can be used to communicate with other devices such as another camera-equipped mobile telephone 1100, an electronic device with remote controller receiver such as a TV set, etc.

Reference numeral 1102 denotes a liquid crystal display used to display various kinds of information when used as a usual mobile telephone. The liquid crystal display 1102 functions as a viewfinder when a camera equipped in the mobile telephone 1100 is activated. A photographic image already taken by the camera can also be displayed on the liquid crystal display 1102.

Reference numeral 1103 denotes a set of operation buttons. This set of operation buttons is used not only to input a telephone number to make a telephone call but also to input a command or data when a mail document is created or when a built-in camera is used. Functions assigned to respective buttons are varied depending on the internal state of the mobile telephone 1100.

Reference numeral 1104 denotes an imaging lens 1104 for forming an image of a subject. When an image of a subject is formed via the imaging lens 1104, zooming, focus adjustment, and capturing of the image can be performed by pressing a proper operation button 1103.

Reference numeral 1105 denotes a memory card slot for inserting a memory card. The memory card may be used not only to store taken image but also to store various kinds of information associated with internal parameters of the mobile telephone.

Electrical Specifications of Camera-Equipped Mobile Telephone

Figure 7:
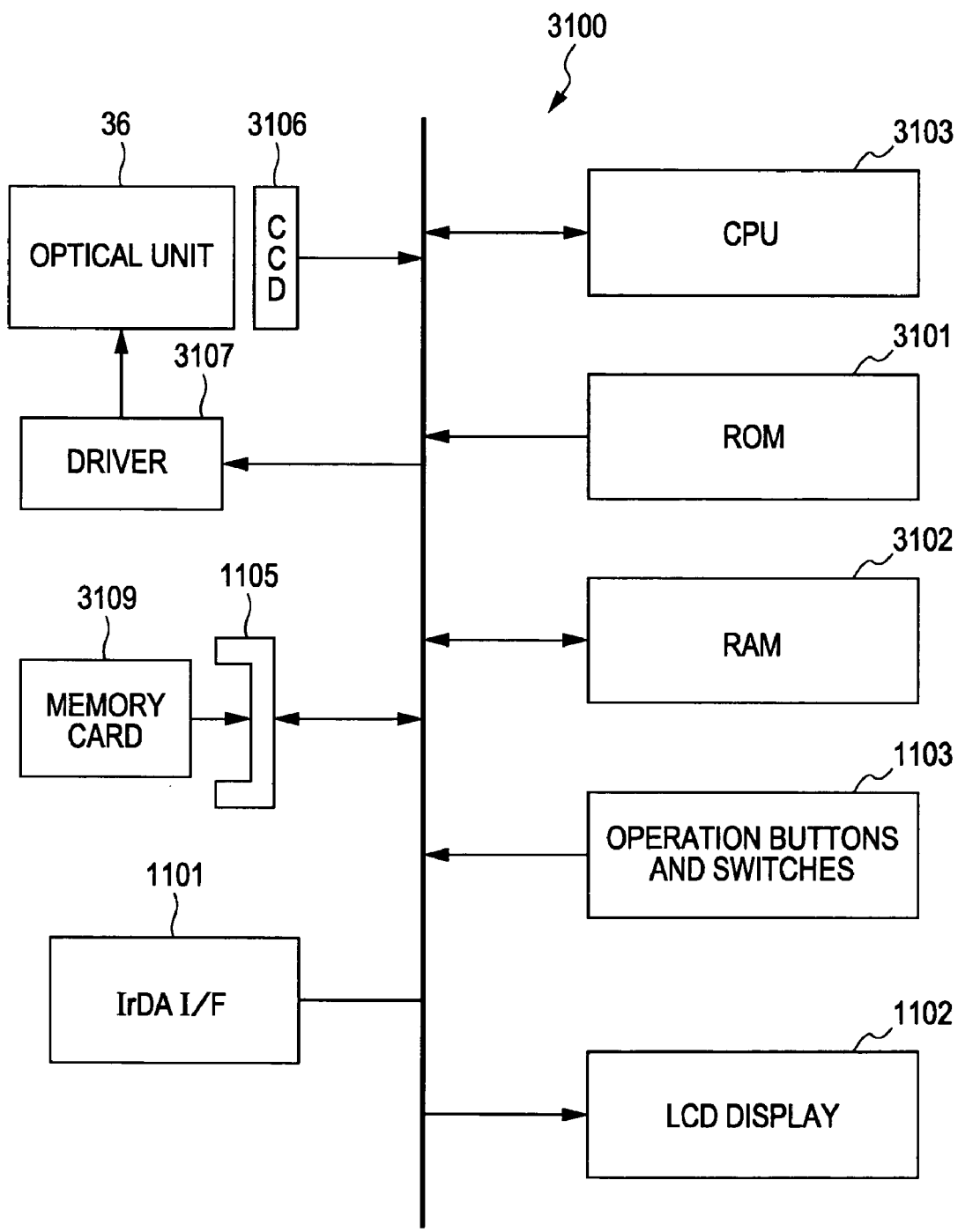
FIG. 7 is a block diagram showing main parts, relating to control, of a camera-equipped mobile telephone according to an embodiment of the present invention.

Main parts, relating to control, of the camera-equipped mobile telephone usable by the adapter 1200 according to the present embodiment of the invention are described below with reference to FIG. 7. In FIG. 7, similar parts to those in previous figures are denoted by similar reference numerals, and a duplicate explanation thereof is omitted.

Reference numeral 3103 denotes a CPU responsible for general control of the camera-equipped mobile telephone.

Reference numeral 3101 denotes a ROM, in which a processing procedure (firmware) performed by the CPU 3103 is stored. In order to allow the firmware to be updated, a nonvolatile writable memory such as a flash memory may be employed as the ROM 3101.

Reference numeral 3102 denotes a RAM, which is used as a work area by the CPU 3103. As for the RAM 3102, a volatile memory or a nonvolatile memory may be used. In the case in which a nonvolatile memory is used, it is possible to retain the content of the work area even after the power is turned off.

Reference numeral 3106 denotes a CCD device.

Reference numeral 3107 denotes a driver, which controls an optical unit 36 under the control of the CPU 3103.

Reference numeral 3109 denotes a memory card realized such as a compact flash (registered trademark) memory card or smart media.

Connection of Adapter

Figure 5:
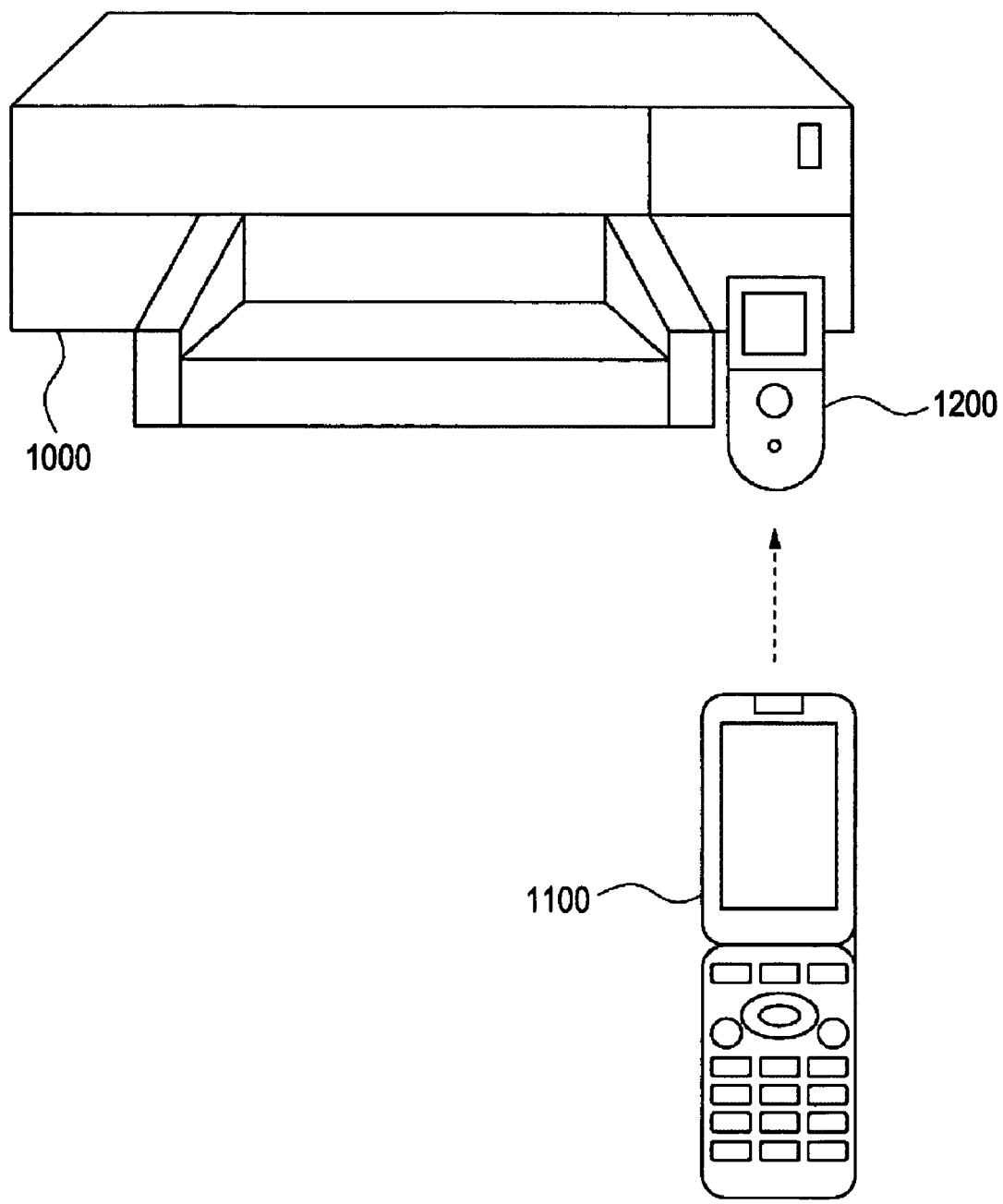
FIG. 5 is a diagram showing a PD printer, an adapter, and a camera-equipped mobile telephone in a connected state, according to an embodiment of the present invention.

FIG. 5 shows the adapter 1200 according to the present embodiment of the invention in a state in which the adapter 1200 is connected to the PD printer 1000 and an infrared transmitting/receiving unit 1101 of the camera-equipped mobile telephone 1100 directed to an infrared transmitting/receiving unit 1202 of the adapter 1200.

By connecting the adapter 1200 as shown in FIG. 5, it becomes possible to perform printing using the adapter 1200.

Figure 9:
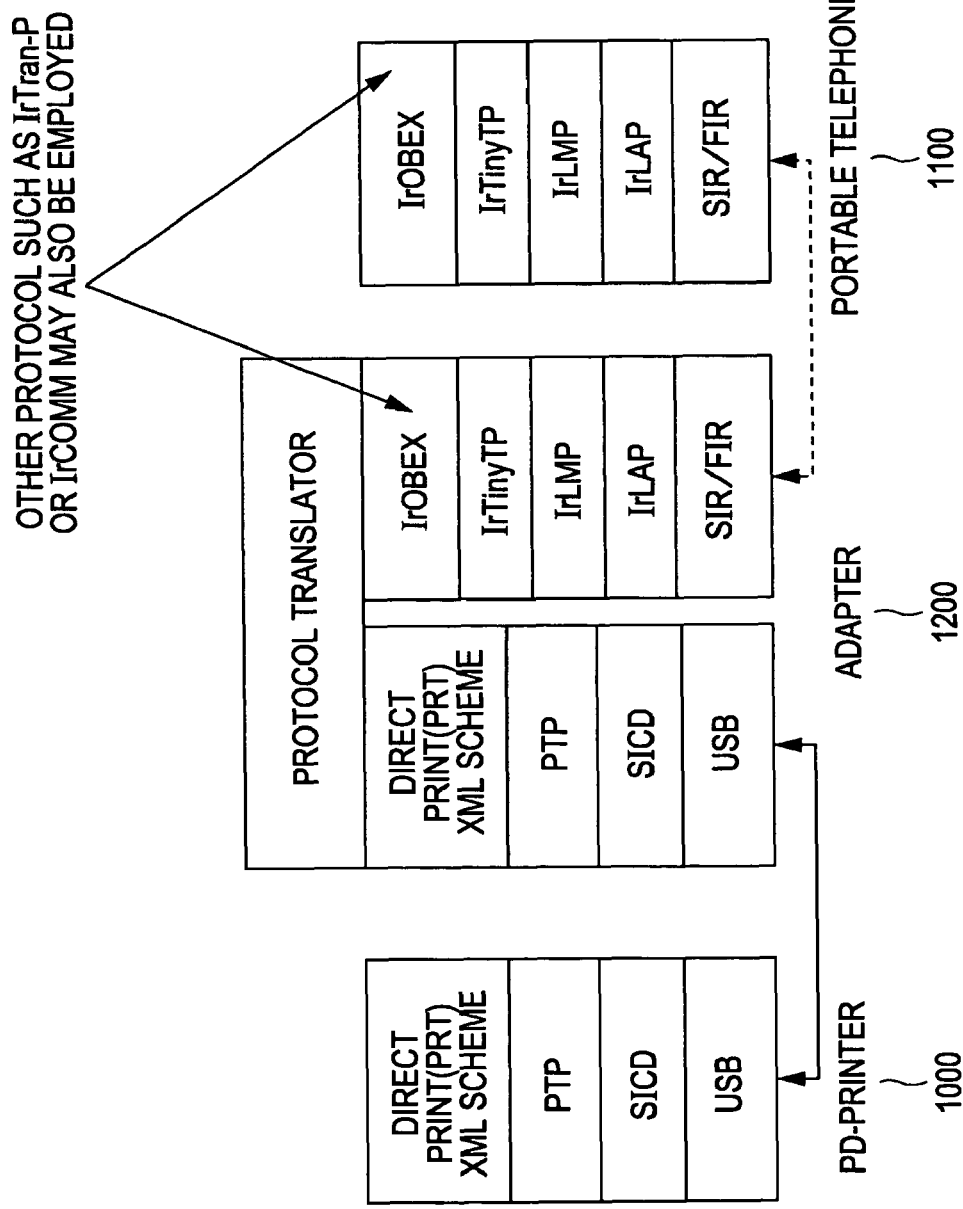
FIG. 9 is a diagram showing a structure of a communication protocol stack for communication between a PD printer and a mobile telephone with a camera and an IrDA device according to an embodiment of the present invention.

Communication Protocol Stack for Use in Communication by Direct Printing Adapter FIG. 9 shows a protocol stack for use in communication between the adapter 1200 and the PD printer 1000 and communication between the adapter 1200 and the camera-equipped mobile telephone 1100 in a state in which the adapter 1200 is connected to the PD printer 1000 and the infrared transmitting/receiving unit 1101 of the camera-equipped mobile telephone 1100 is directed to the infrared transmitting/receiving unit 1202 of the adapter 1200.

The PD printer 1000 has a USB host terminal as a physical interface, and the PD printer 1000 functions as a USB host of the SICD (Still Image Capture Device) class defined in the USB standard. The transport is controlled by using the PTP (Picture Transfer Protocol (PIMA15740)) of the SICD class.

The PD printer 1000 includes a direct printing application capable of transmitting/receiving direction printing information using the PTP whereby the PD printer 1000 functions as a direct printing printer.

The camera-equipped mobile telephone 1100 can have an SIR or FIR device according to the IrDA (Infrared Data Association) standard as a physical interface that allows the camera-equipped mobile telephone 1100 to function as an infrared wireless communication terminal. Upper-level protocols such as IrLAP (Link Access Protocol) for link access and IrLMP (Link Management Protocol) for link management are available. The transport can be controlled by IrTinyTP (Tiny Transport Protocol) using IrLMP.

A data transfer application can be installed in the camera-equipped mobile telephone 1100. The data transfer application can transfer data using IrOBEX (Object Exchange Protocol on IrTinyTP). This allows the mobile telephone 1100 to function as an infrared data communication terminal.

Note that another protocol may also be used to realize an infrared data communication terminal. For example, the data transfer application may transfer data by using IrTran-P (Transfer Picture) or by means of serial/parallel port emulation using IrCOMM.

The adapter 1200 has both the protocol stack for communication with the PD printer 1000 and the protocol stack for communication with the camera-equipped mobile telephone 1100, and is capable of making conversion between these two communication protocols by using a protocol translator shown in FIG. 9.

If the adapter 1200 receives image data transmitted from the camera-equipped mobile telephone 1100 via the infrared communication channel, the adapter 1200 generates direct printing information based on the received image data by using the protocol translator and issues a direct print job to the PD printer 1000.

Although in the example shown in FIG. 9, the camera-equipped mobile telephone with an IrDA terminal is used as the image supply device, another type of device such as a mobile telephone, a PHS telephone, a PDA device, or a digital still camera, which have an IrDA terminal that allows image data to be transferred, may also be used as the image supply device.

The communication unit disposed in the image supply device to transfer image information is not limited to the IrDA communication unit, but other types of communication units may be used. For example, a wire or wireless communication unit such as a Bluetooth communication unit, an 802.11x communication unit, a USB communication unit, an IEEE1394 communication unit, or an Ethernet (registered trademark) communication unit may also be used.

Examples of protocol stacks for use with a Bluetooth communication unit, an 802.11x communication unit, a USB communication unit, and an IEEE1394 communication unit are respectively shown in FIGS. 10 to 13. Although the details of each layer of these protocol stacks are not described herein, communication is performed in a similar manner to that with the IrDA communication device whichever type of communication unit is used, that is, direct print information is generated based on image data received from the image supply device by using a protocol translator and a direct print job is issued to the PD printer 1000.

As for the image supply device having a communication unit, not only the mobile telephone described above but also other types of image supply devices such as a car navigation system, a personal computer, a game machine, a digital television set, etc. may be used.

Figure 14:
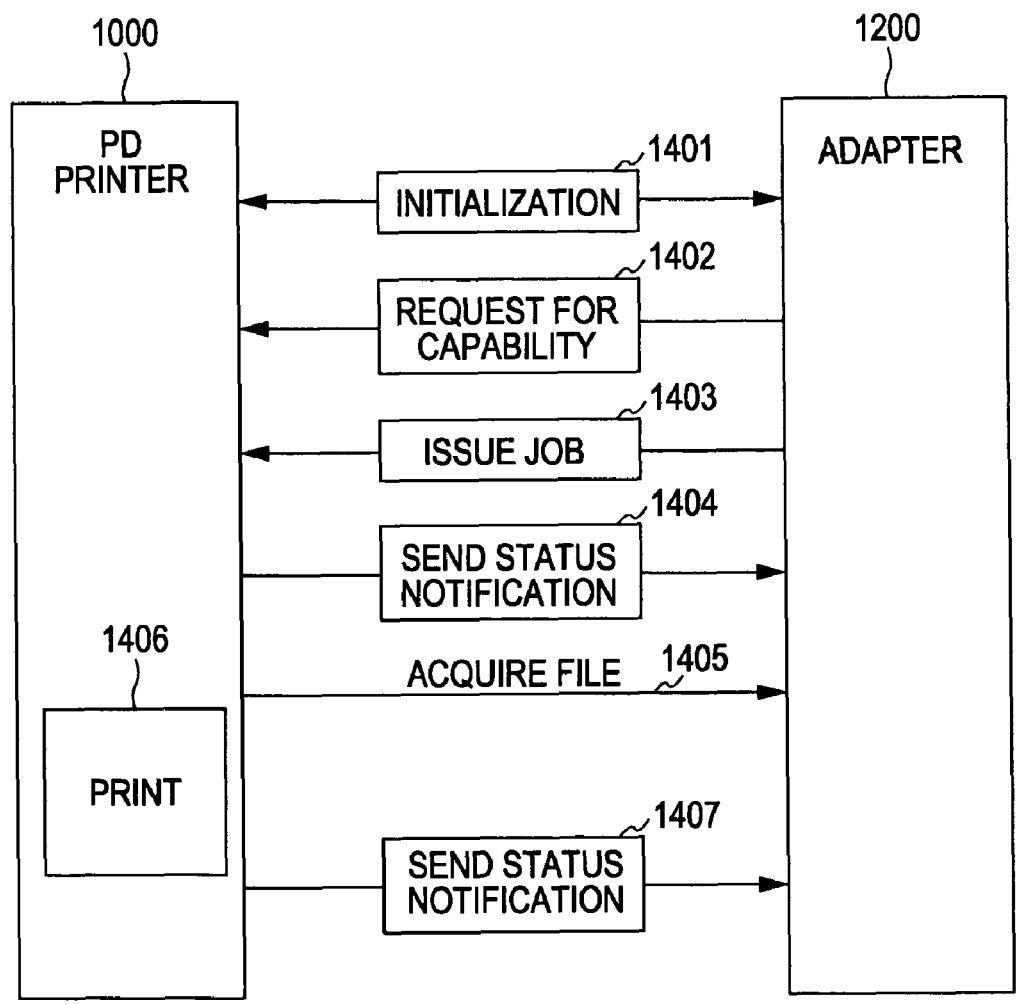
FIG. 14 is a simplified diagram showing a processing flow of direct printing via USB according to an embodiment of the present invention.

FIG. 14 shows, in a simplified fashion, a process flow associated with direct printing using a USB device according to an embodiment of the present invention. In this specific example shown in FIG. 14, direct printing is accomplished using a PTP architecture shown on the left-hand side of FIG. 9.

In step 1401, after a physical connection is established between the PD printer 1000 and the adapter 1200, initialization is performed at the PD printer 1000 and the adapter 1200. In this step, it is confirmed that both devices support direct printing.

In step 1402, the adapter 1200 issues a capability information request to the PD printer 1000 to acquire the information about the capability of the PD printer 1000.

In step 1403, the adapter 1200 issues a job to the PD printer 1000 and requests the PD printer 1000 to perform printing.

In step 1404, the PD printer 1000 sends a status notification to the adapter 1200 to notify that the PD printer 1000 is ready to start printing.

In step 1405, the PD printer 1000 performs a file acquisition process to acquire an image file needed for printing from the adapter 1200. In step 1406, the PD printer 1000 performs printing.

In step 1407, the PD printer 1000 sends a status notification to the adapter 1200 to notify that the printing is completed.

In steps 1401 to 1404 and step 1407 described above, information is sent in the form of a script. On the other hand, the acquisition of the image file in step 1405 can be performed by a PTP file transfer function such as GetObject, GetPartialObject, etc.

The printing operation in step 1406 is performed solely internally in the PD printer 1000.

Each step of the operation is described in further detail below with reference to FIGS. 15 to 19.

Figure 15:
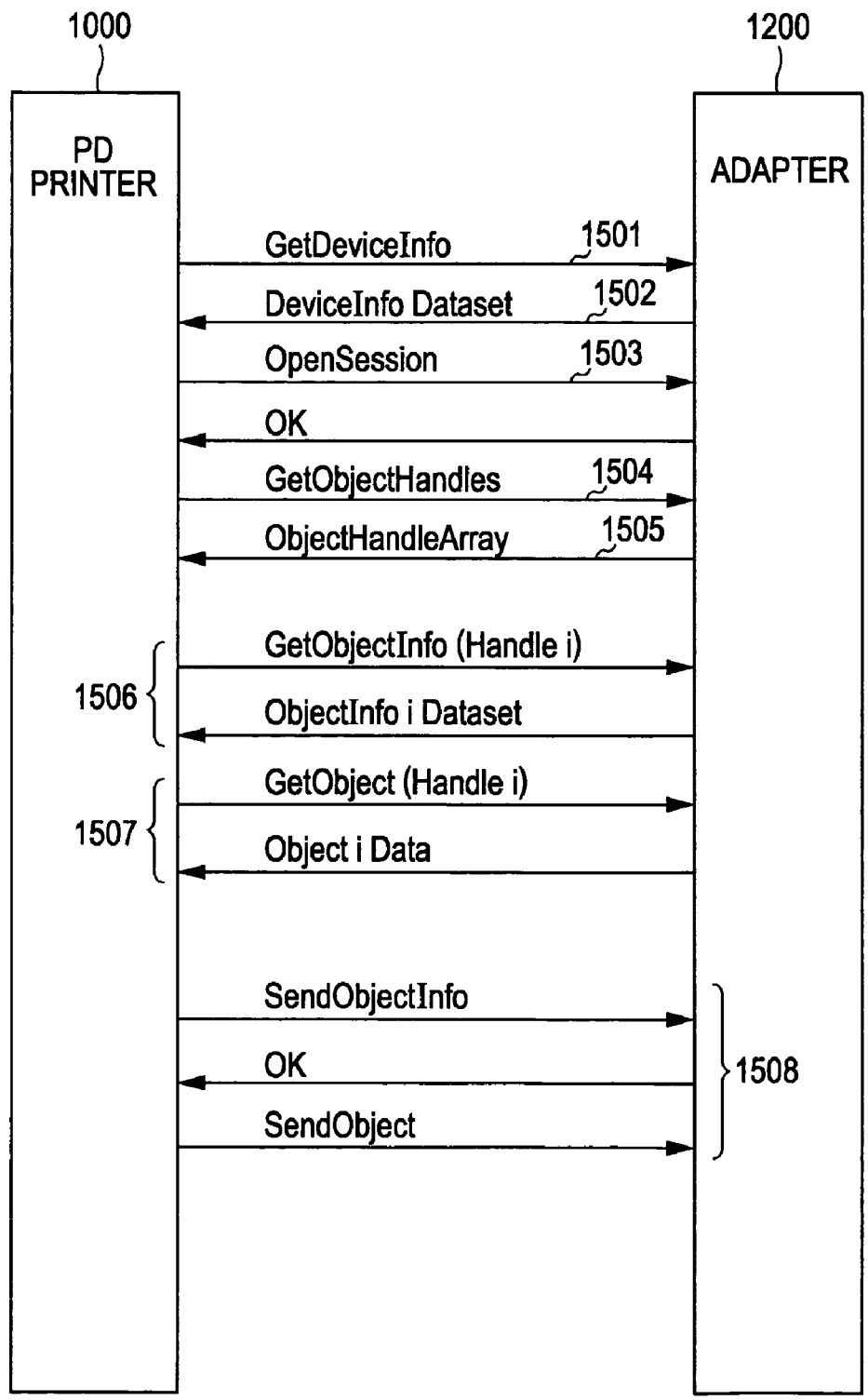
FIG. 15 is a flow chart of an initialization process in direct printing via USB according to an embodiment of the present invention.

FIG. 15 shows the detailed flow of the initialization process in step 1401 shown in FIG. 14 according to the embodiment of the invention, wherein this initialization is performed before direct printing using a USB is performed.

In step 1501, after the PD printer 1000 and the adapter 1200 are physically connected to each other, the PD printer 1000 sends a GetDeviceInfo command to the adapter 1200 to request the adapter 1200 to provide information about objects stored in the adapter 1200. The "object" refers to a data file or a set of data such as an image file, an audio file, a text file, etc. stored in the adapter 1200.

In step 1502, in response to the GetDeviceInfo command, the adapter 1200 returns a DeviceInfoDataset response indicating the information about objects stored in the adapter 1200 to the PD printer 1000. In step 1503, the PD printer 1000 assigns the adapter 1200 as a resource and sends an OpenSession command to the adapter 1200. A handle is then assigned to a data object as required. A procedure start request is then issued to perform initialization. If an acknowledgement (OK) is returned from the adapter 1200, PTP communication is started.

In step 1504, the PD printer 1000 issues a request for all handles in the script form (Storage ID: FFFFFF, Object Type: Script) to the adapter 1200. That is, the PD printer 1000 requests the adapter 1200 to provide numbers uniquely identifying respective objects (such as photographic images, scripts, etc.) stored in the adapter 1200. In step 1505, in response to the request, the adapter 1200 returns a list of all handles stored in the adapter 1200 as a handle list to the PD printer 1000.

Then, in steps 1506 and 1507, information about an i-th object handle is acquired from the PD printer 1000. If the object includes a keyword (such as "Macro") identifying the adapter 1200, then in step 1508, the PD printer 1000 issues an object information send command (SendObjectInfo). If an acknowledgement (OK response) returned in response to this command is received, the PD printer 1000 sends the object information to the adapter 1200. In this case, the object includes a response keyword (such as "Polo") corresponding to the above-described keyword.

Thus, the PD printer 1000 and the adapter 1200 can recognize each other as a communication partner. At this time, it becomes possible to start direct printing.

Figure 16:
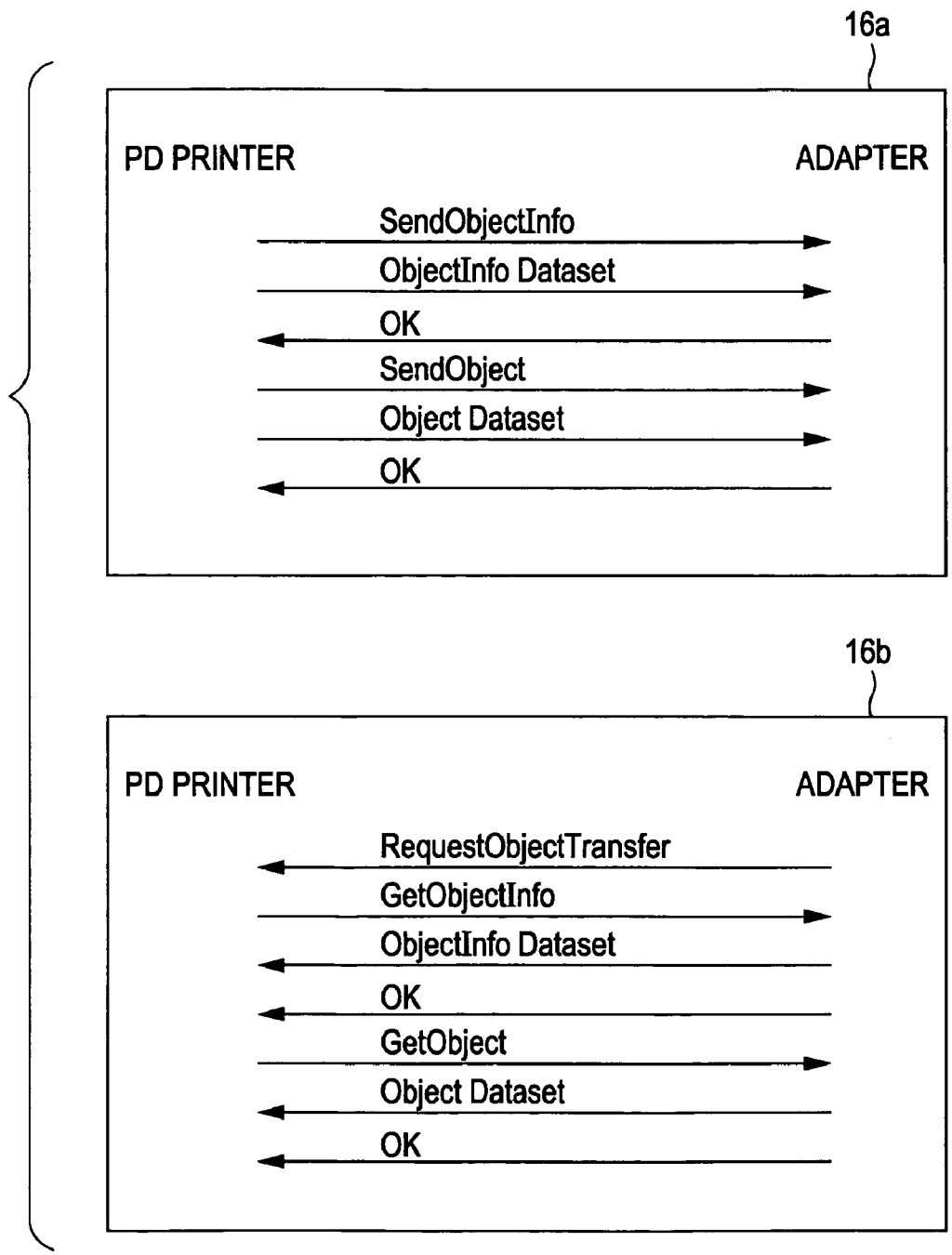
FIG. 16 is a flow chart of a script transfer process in direct printing via USB according to an embodiment of the present invention.

FIG. 16 shows a flow of a script transfer process in direct printing using a USB device according to an embodiment of the present invention. Note that a script is transferred at the PTP level in a similar manner for all steps 1402 to 1404 and 1407 shown in FIG. 14.

In FIG. 16, a flow of script transfer from the PD printer 1000 to the adapter 1200 is shown in a box 16a.

First, the PD printer 1000 sends SendObjectInfo (an object information send request) to the adapter 1200 and further sends ObjectInfoDataset (object information) to the adapter 1200.

If the adapter 1200 receives the object information, the adapter 1200 analyzes the received object information. If the adapter 1200 determines that the object can be received, the adapter 1200 returns an OK response together with an object handle number to be assigned to the object.

If the OK response is received, the PD printer 1000 sends SendObject (an object send request) to the adapter 1200 and subsequently sends ObjectData (the main part of the object) in the form of a script to the adapter 1200.

If the adapter 1200 has received all objects, the adapter 1200 returns an OK response.

In FIG. 16, a flow of script transfer from the adapter 1200 to the PD printer 1000 is shown in a box 16b.

First, the adapter 1200 sends RequestObjectTransfer to the PD printer to prompt the PD printer 1000 to acquire an object with a particular object handle.

In response, the PD printer 1000 sends GetObjectInfo to the adapter 1200 to request the adapter 1200 to provide information associated with the object with the particular object handle.

If the adapter 1200 receives GetObjectInfo, the adapter 1200 sends ObjectInfoDataset associated with the object to be sent to the PD printer 1000. When sending of ObjectInfoDataset is completed, the adapter 1200 sends an OK response.

If the PD printer 1000 receives the OK response, the PD printer 1000 sends GetObject to the adapter 1200 to request the adapter 1200 to send the object.

If the adapter 1200 receives GetObject, the adapter 1200 sends the object. When sending of the object is completed, the adapter 1200 sends an OK response.

In the direct printing using the USB device, as described above, information is sent in the form of a script between the PD printer 1000 and the adapter 1200.

Figure 17:
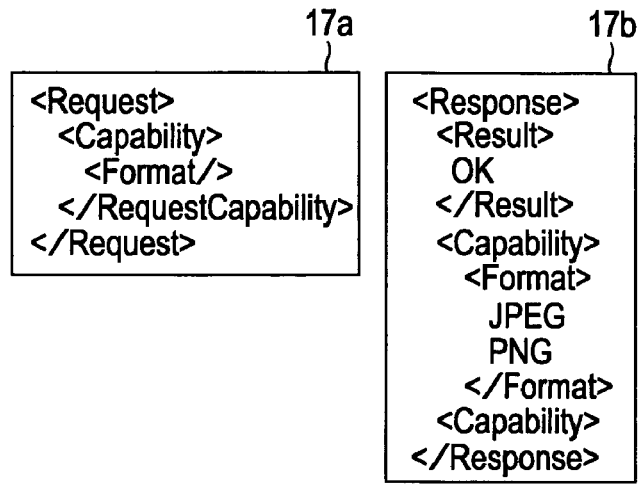
FIG. 17 is a diagram showing a script associated with acquisition of capability information in direct printing via USB according to an embodiment of the present invention.
Figure 18:
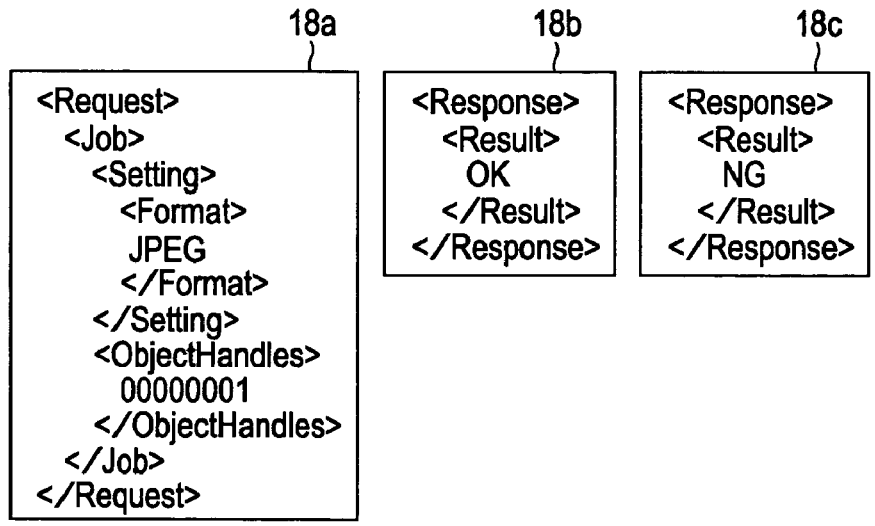
FIG. 18 is a diagram showing a script associated with issuance of a job in direct printing via USB according to an embodiment of the present invention.
Figure 19:
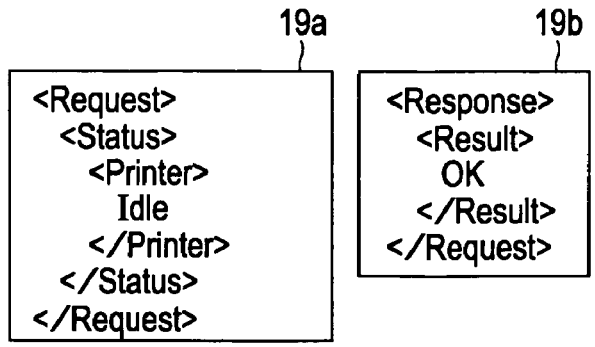
FIG. 19 is a diagram showing a script associated with status notification in direct printing via USB according to an embodiment of the present invention.

FIGS. 17 to 19 show examples of scripts transmitted in the direct printing using the USB device between the PD printer 1000 and the adapter 1200.

FIG. 17 shows an example of a capability acquisition script transmitted in the direct printing using the USB device, according to an embodiment of the present invention. Note that this script is sent in step 1402 in FIG. 14.

In FIG. 17, in a box 17a, there is shown an example of a capability request script sent from the adapter 1200 to the PD printer 1000. In this specific example, information about types of image formats supported by the PD printer 1000 is requested.

In a box 17b, there is shown an example of a response script sent from the PD printer 1000 to the adapter 1200 as a response to the capability request script 17a. In this specific example, the script indicates that the PD printer 1000 supports two types of formats, that is, JPEG and PNG formats.

A capability acquisition script is also issued to acquire information about capability in terms of, for example, the size of printing paper, the type of printing paper, the layout capability corresponding to a particular size of printing paper, the capability of fixed-size printing, the print quality, the image correction capability, the image cutout capability, and the capability of printing date.

FIG. 18 shows an example of a job issue script sent in direct printing using a USB device, according to an embodiment of the present invention. This job issue script is used in step 1403 in FIG. 14.

In FIG. 18, in a box 18a, there is shown a job issue script sent from the adapter 1200 to the PD printer 1000. In this specific example, the script requests printing of one sheet of a JPEG image with an object handle number 00000001.

In a box 18b, there is shown an example of a response script sent from the PD printer 1000 to the adapter 1200 as a response to the job issue script 18a. In this specific example, the response script is sent as an OK response from the PD printer 1000 to notify that the print job has been accepted.

In a box 18c, there is shown another example of a response script sent, as a response to the job issue script 18a, from the PD printer 1000 to the adapter 1200. In this specific example, the response script is sent from the PD printer 1000 to notify that the request for the print job is rejected because the PD printer cannot perform the requested printing job.

A job issue script is also sent to specify a paper size other than a standard size corresponding to an image format as described above with reference to the capability acquisition script.

A plurality of images can be specified using a single job issue script. A job issue script is also used to specify the number of copies for each image, the area of an image to be cutout, the date, the file name, etc.

The negative response script shown in FIG. 18c may include an additional description indicating the reason for the rejection of the request for the job. For example, it is additionally stated that the job is rejected because the PD printer 1000 is currently busy with a job for another image supply device, or because the print job includes an incorrect setting.

FIG. 19 shows an example of a status notification script sent in the direct printing operation. This type of status notification script is used in step 1404 or 1407 shown in FIG. 14.

In FIG. 19, in a box 19a, there is shown an example of a status notification script sent from the PD printer 1000 to the adapter 1200. In this specific example, the status notification script indicates that the PD printer 1000 is not currently performing any print job but is in an idle state in which the PD printer 1000 is ready to start printing.

In a box 19b, there is shown an example of a response script returned as a response to the status notification script 18a from the adapter 1200 to the PD printer 1000. In this specific example, the response script indicates the acknowledgement (OK).

A status notification script is also issued to notify of other statuses such as an occurrence of an error, the type of an error, the status of printing operation such as the page number or the image number being currently processed, whether the PD printer 1000 can finish the print job even if the cable is disconnected, whether a next print job can be accepted, whether the capability information has been updated, or the reason for the termination of the print job.

A status notification script is sent not only from the PD printer 1000 to the adapter 1200 but can also be sent from the adapter 1200 to the PD printer 1000 to request the PD printer 1000 to notify the status of the PD printer 1000.

A script can be issued not only to acquire capability information, issue a job, or notify of the status as described above, but also for other purposes such as to suspend a print job, recover from an error, or transmit or request for authentication information such as version information, device name, serial number, or a vender name.

Figure 20:
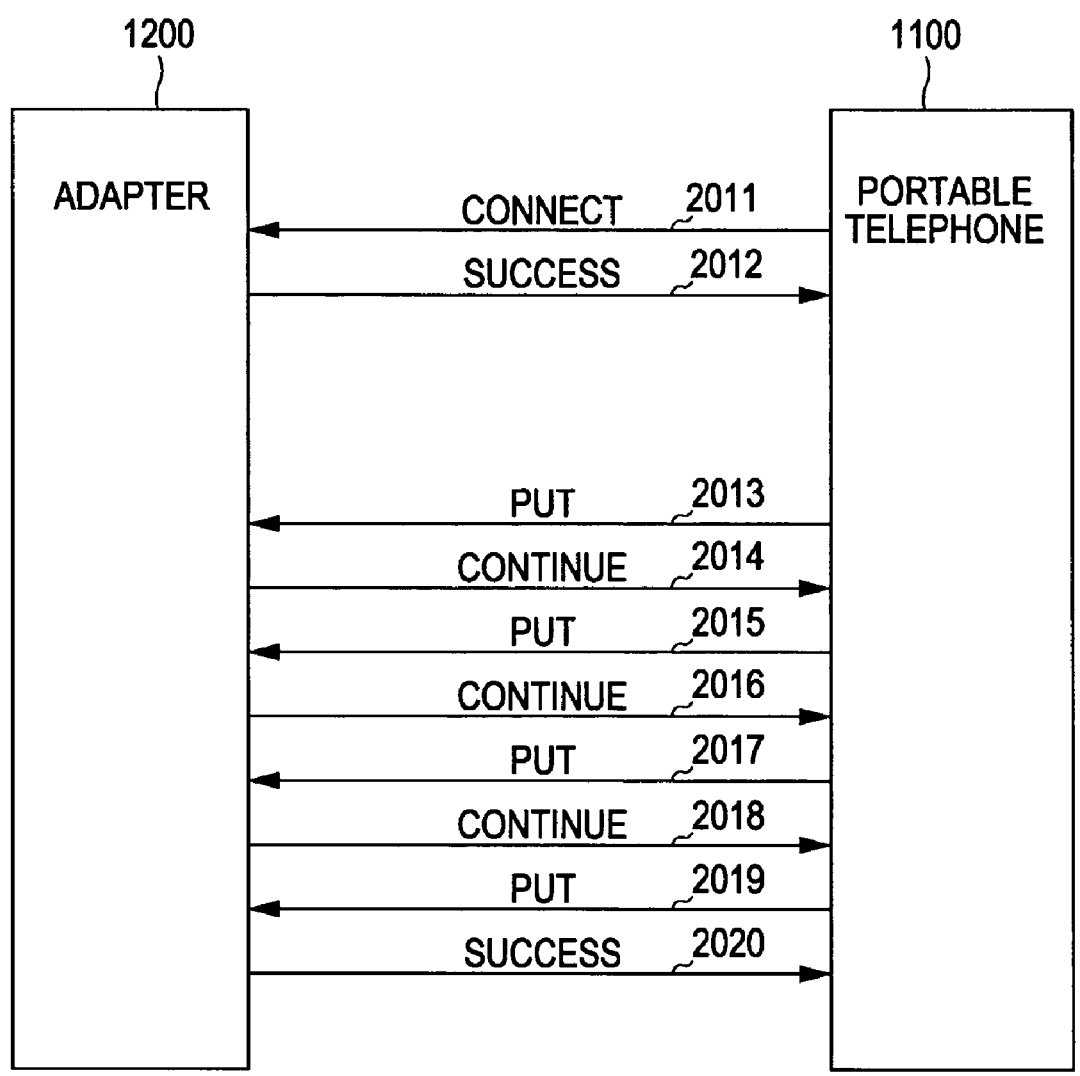
FIG. 20 is a flow chart of an initialization process and a file transfer process using an IrDA device according to an embodiment of the present invention.
Figure 21:
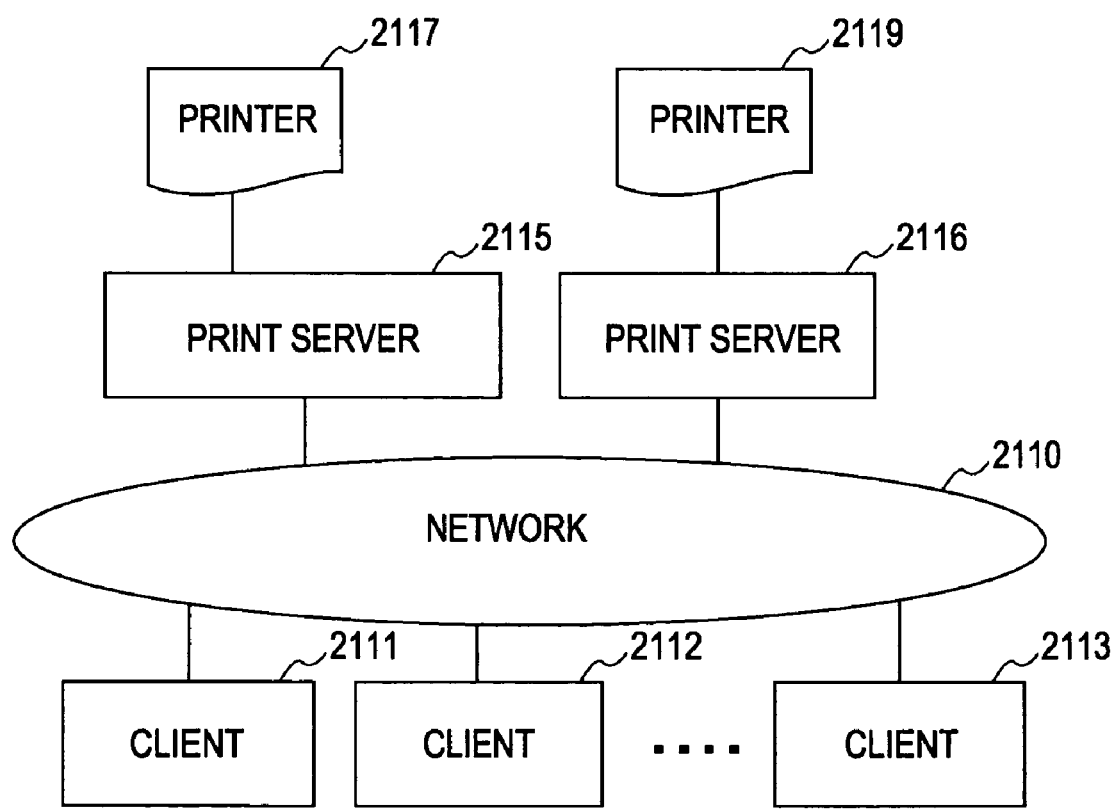
FIG. 21 is a diagram showing a print server system.

FIG. 20 shows a flow of an initialization process and a file transfer process using an IrDA device according to an embodiment of the present invention. In this specific example, transferring of a file is accomplished using an IrOBEX architecture shown on the right-hand side of FIG. 9.

First, in step 2011, the mobile telephone 1100 sends a CONNECT request to the adapter 1200.

In step 2012, if the adapter 1200 accepts the CONNECT request, the adapter 1200 returns a SUCCESS response.

In step 2013, the mobile telephone 1000 sends information indicating the file name and the file size of a file to be transferred and a first packet of data of the file.

If the adapter 1200 successfully receives the first packet, then in step 2014 the adapter 1200 returns a CONTINUE response to notify that the adapter 1200 is ready to receive next data.

In step 2015, the mobile telephone 1100 transmits a next packet. In step 2016, if the adapter 1200 successfully receives the next packet, the adapter 1200 returns a CONTINUE response to notify that the adapter 1200 is ready to receive further next data. Steps 2017 to 2018 are performed in a similar manner.

In step 2019, the mobile telephone 1100 transmits a final packet. In step 2020, if the adapter 1200 successfully receives the final packet, the adapter 1200 returns a SUCCESS response to notify that receiving of data is completed.

The adapter 1200 assigns a PTP object handle to the image received via the PUT command from the mobile telephone 1100, and the adapter 1200 requests the PD printer 1000 to perform direct printing using the object handle.

Figure 10:
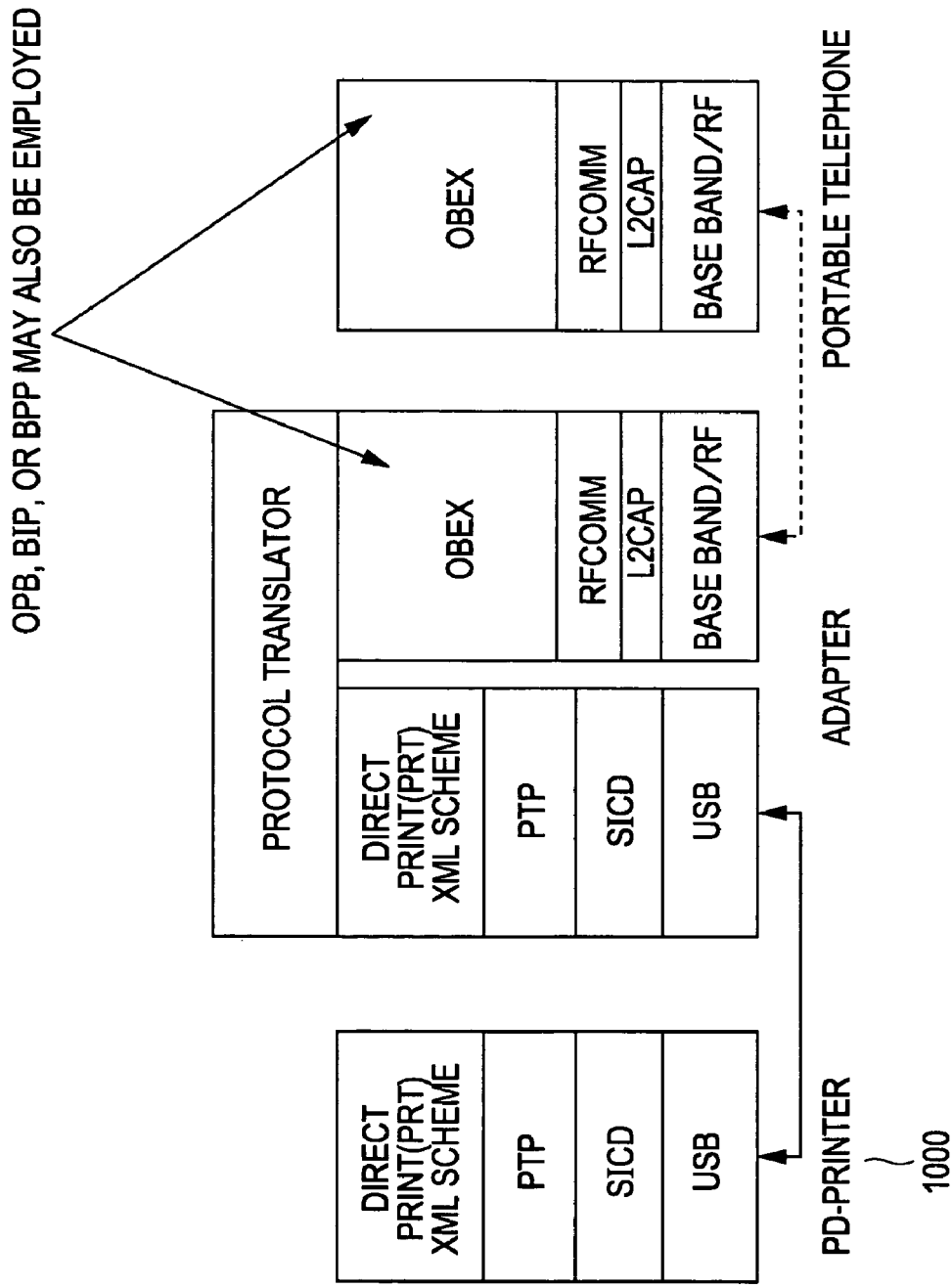
FIG. 10 is a diagram showing a structure of a communication protocol stack for communication among a PD printer, an adapter, and a mobile telephone with a camera and a Bluetooth device according to an embodiment of the present invention.

The process performed when the connection is realized using Bluetooth protocols shown on the right-hand side of FIG. 10 is basically similar to the process described above with reference to FIG. 20, and a duplicated explanation thereof is omitted.

Figure 11:
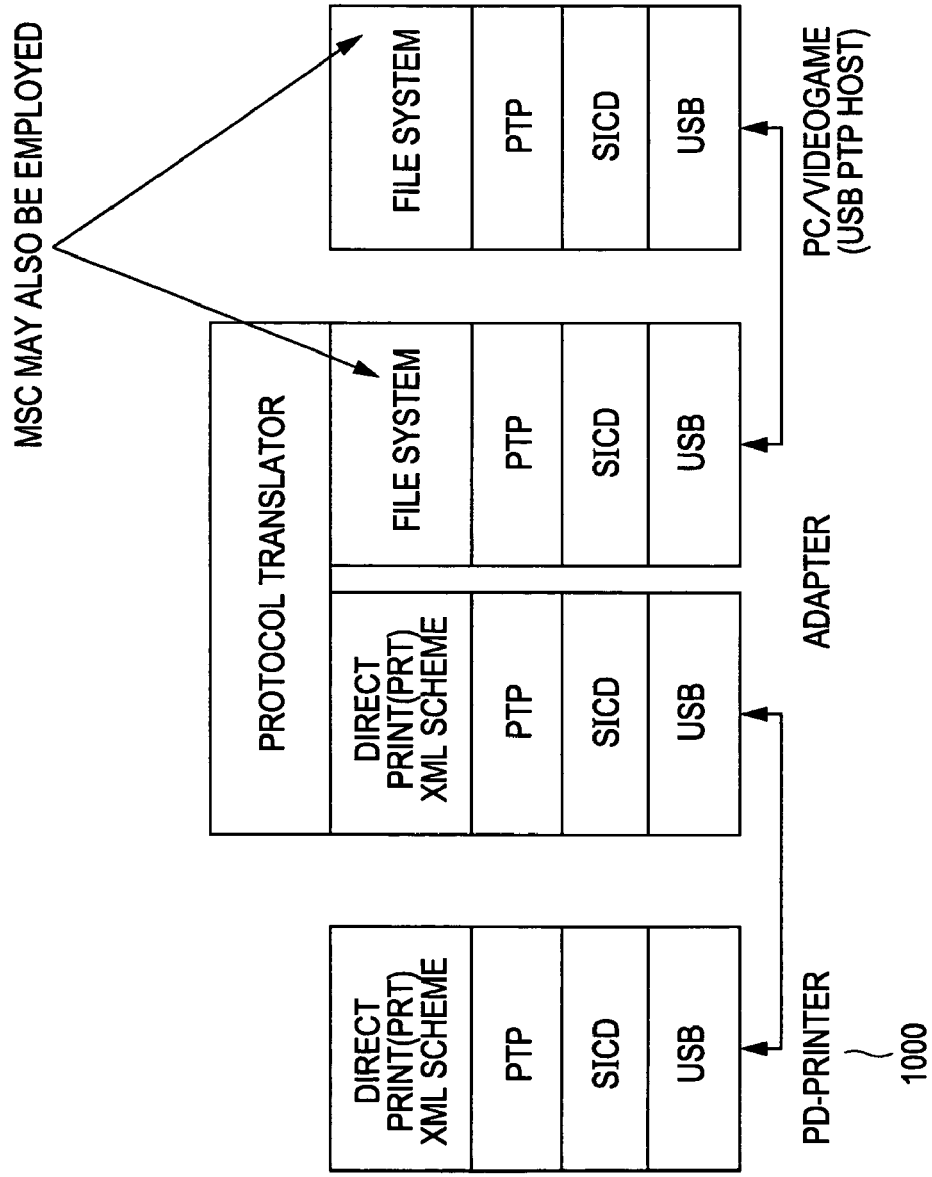
FIG. 11 is a diagram showing a structure of a communication protocol stack for communication among a PD printer, an adapter, and a personal computer with a USB host terminal according to an embodiment of the present invention.
Figure 12:
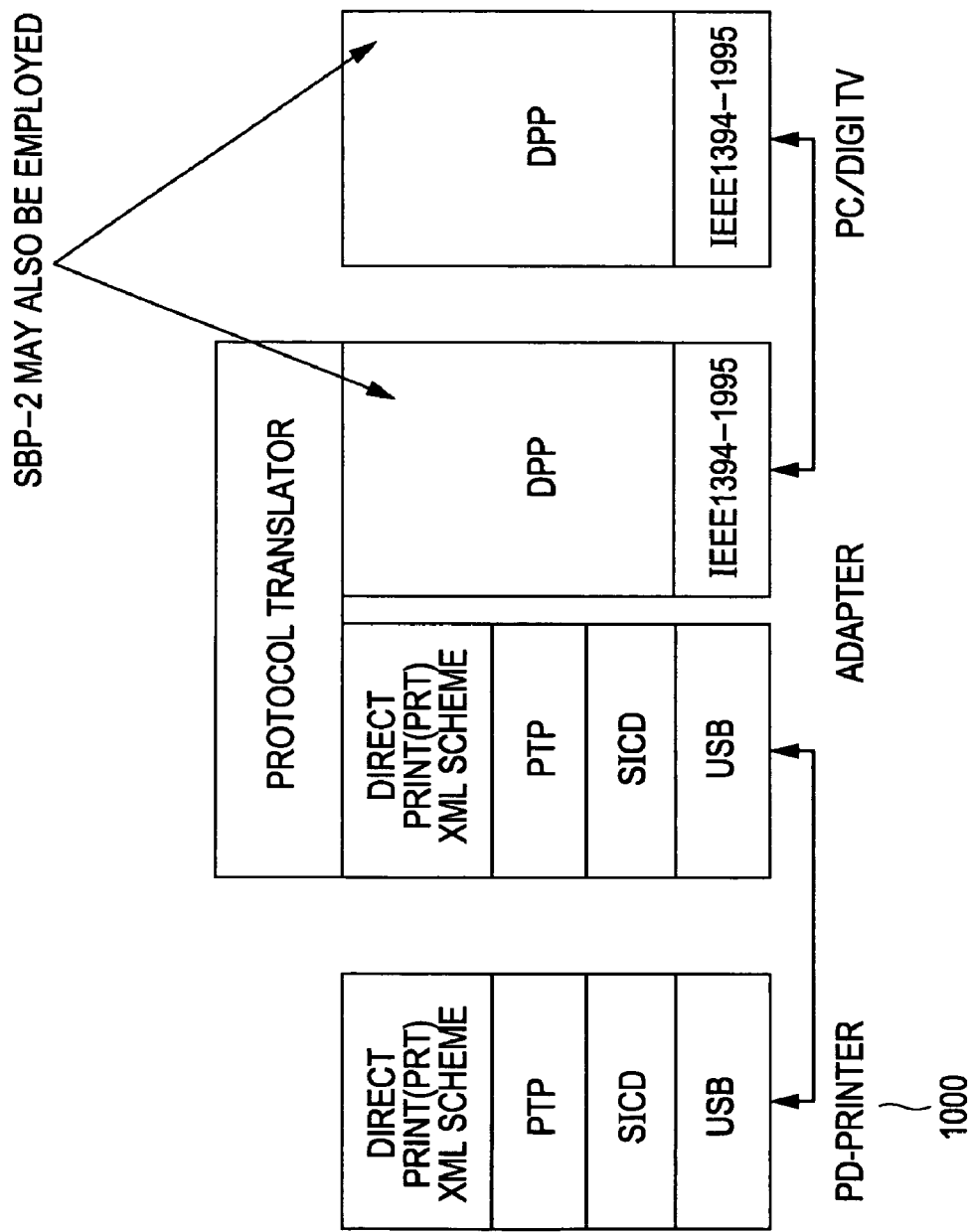
FIG. 12 is a diagram showing a structure of a communication protocol stack for communication among a PD printer, an adapter, and a personal computer with an IEEE1394-1995 terminal according to an embodiment of the present invention.
Figure 13:
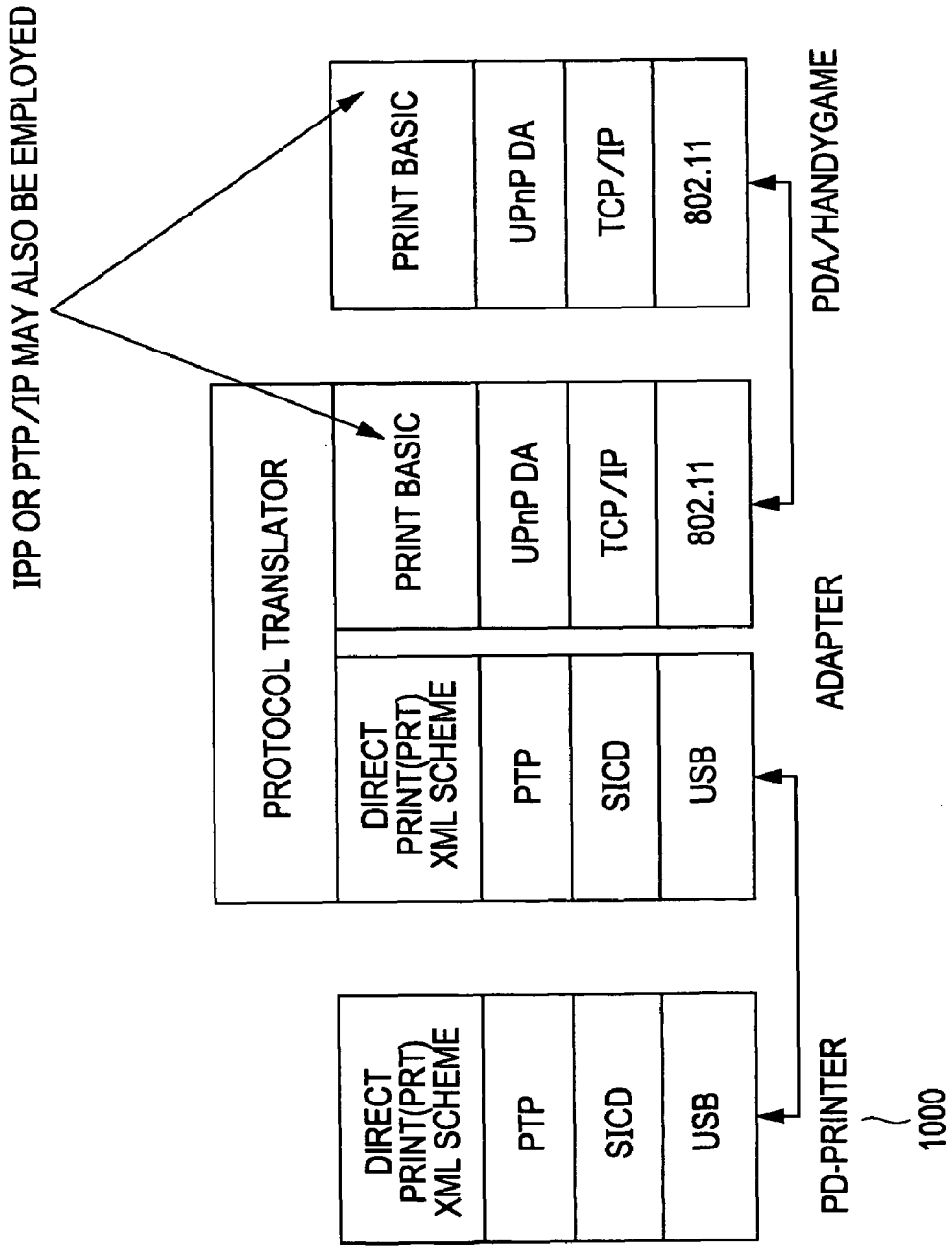
FIG. 13 is a diagram showing a structure of a communication protocol stack for communication among a PD printer, an adapter, and a PDA device with an 802.11 device according to an embodiment of the present invention.

When the connection is realized using the USB protocols shown-on the right-hand side of FIG. 11, the process is performed simply using SendObjectInfo/SendObject of PTP, and thus a further detailed explanation thereof is omitted.

First Embodiment

A first embodiment of the present invention is described below with reference to figures referred to in the above description and also with reference to FIGS. 22 to 27. In these figures, numerals 4000 to 4536 are used to denote step numbers.

In FIG. 22 and FIGS. 24 to 27 showing the operation of the adapter according to the first embodiment of the invention, interactions among the PD printer 1000 (printer), the adapter 1200 (adapter), and the camera-equipped mobile telephone 1100 (DSC) are described in the order of time. In the operation described herein, it is assumed that the PD printer 1000 and the DSC 1100 operate in a similar manner to a printer and a digital camera of common types available in markets.

Operation Sequence in a State in which Adapter is Connected

Figure 22:
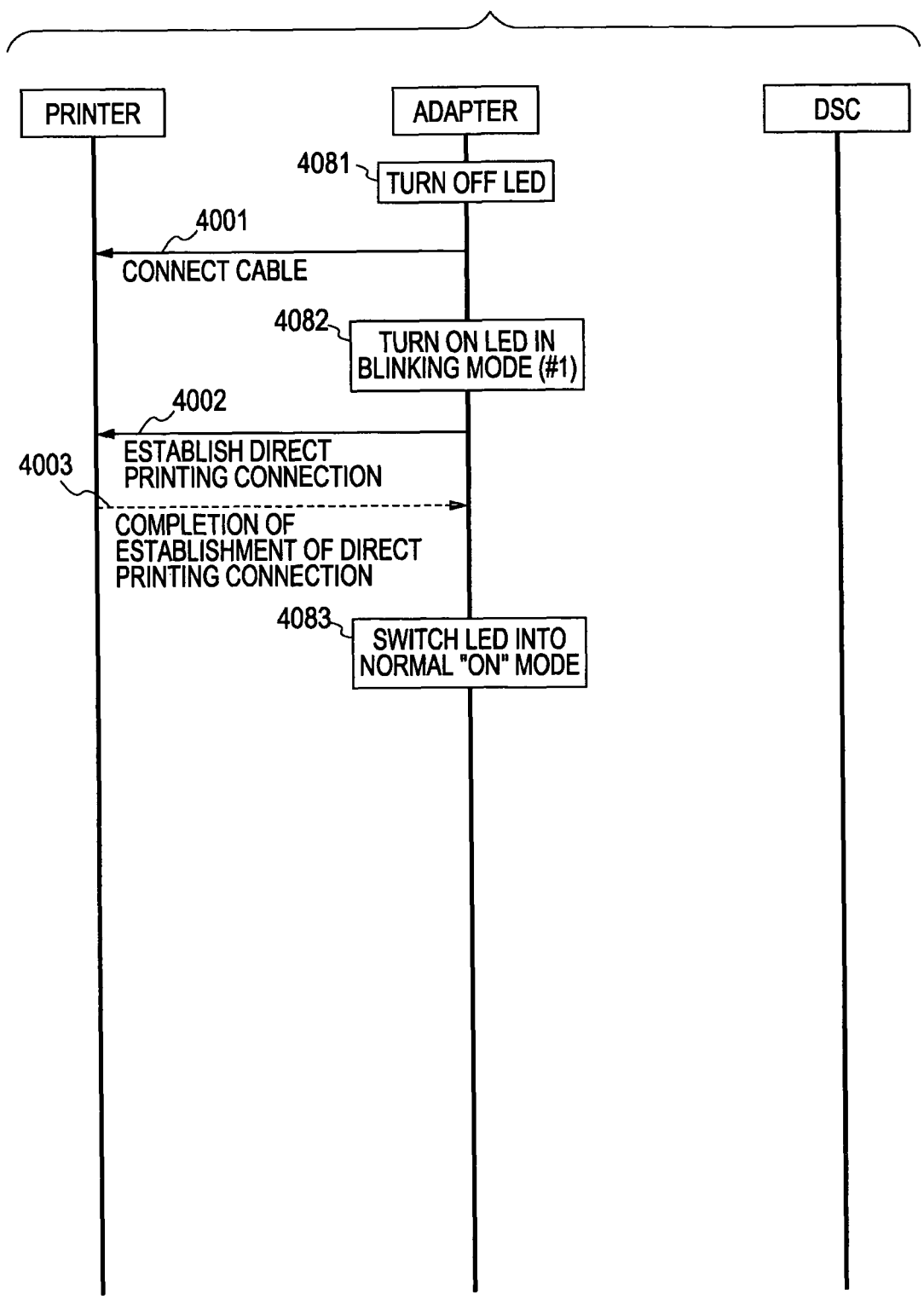
FIG. 22 is a diagram showing an operation sequence of a PD printer, an adapter, and a camera-equipped mobile telephone in a state in which the adapter is connected to the PD printer, according to an embodiment of the present invention.

FIG. 22 is a diagram showing an operation sequence of the PD printer 1000, the adapter 1200, and the DSC in a state in which the adapter 1200 is connected to the PD printer 1000, according to an embodiment of the present invention.

In the description of the operation sequence of the adapter 1200, the change in status of the LED 1204 indicating the status of the adapter 1200 is also described.

In the present embodiment, the status of the LED 1204 is switched depending on the status of the adapter 1200 as follows.

When the power of the adapter 1200 is in an OFF state, the LED 1204 is maintained in an OFF state. When the adapter 1200 is in a state in which the connection between the adapter 1200 and the PD printer 1000 is being established, the LED 1204 is in a blinking mode #1 (in which the LED 1204 blinks in green at intervals of 1 second). When the adapter 1200 is in a state in which the connection between the adapter 1200 and the PD printer 1000 and the adapter 1200 is ready to receive image data transferred from the DSC, the LED 1204 is lit in a normal ON mode (in which the LED 1204 is continuously lit in green). When the adapter 1200 is in a state in which the adapter 1200 is receiving image data transferred from the DSC, the LED 1204 is in a blinking mode #2 (in which the LED 1204 blinks in green 5 times/sec). When the adapter 1200 is in a state in which after image data has been completely received from the DSC, the PD printer 1000 is executing a print job, the LED 1204 is in a blinking mode #3 (in which the LED 1204 blinks in green 2 times/sec). When the adapter 1200 is in a state in which the adapter 1200 receives a printer error notification from the PD printer 1000 and printing is suspended, the LED 1204 is in a blinking mode #4 (in which the LED 1204 blinks in yellow 2 times/sec).

It is possible to indicate a greater number of states of the adapter 1200 by increasing the number of blinking modes.

The operation sequence is now described with reference to step numbers.

(4081) The adapter is in an initial state in which the adapter is not connected to the PD printer 1000, and the electric power is in an OFF state. Thus, the LED 1204 is in the OFF state.

(4001) In this state, if a user connects the adapter 1200 to the PD printer 1000, electric power is supplied to the adapter from the PD printer via a USB power supply circuit. Alternatively, the adapter may have a battery installed therein, and electric power may be supplied from the battery to the adapter 1200 via a power switch. This allows a reduction in power consumption of the PD printer 1000, which is useful when the PD printer 1000 is of a mobile type. If the battery of the adapter 1200 is of a rechargeable type, the adapter 1200 is capable of performing high-power communication, which requires higher power than can be supplied via the USB, with the DSC. In this case, when the battery of the adapter 1200 is sufficiently charged, the adapter 1200 is brought into a waiting state in which the adapter 1200 is ready to receive image data transferred from the DSC, and the LED 1204 is switched from the blinking mode #1 to the normal ON mode. Alternatively, the power of the adapter 1200 is maintained in the OFF state until the battery is sufficiently charged.

(4002) If the electric power for the adapter is turned on, the adapter establishes a direct print connection with the PD printer.

(4082) During the process in which the adapter is establishing the direct print connection with the PD printer, the LED is lit in the blink #1 mode. The timing of turning on the LED in the blink #1 mode may be immediately after step 4001 or 4002. In the process of establishing the direct print connection, information indicating the capability of the printer may be acquired, and the user interface of the adapter, used in the printing operation, may be controlled depending on the acquired information about the capability of the printer in terms of, for example, the paper size and the paper type available on the printer, the image correction, etc. For example, when the PD printer 1000 is capable of printing only on A4-size paper or L-size paper, the user interface of the adapter is controlled such that the paper selection button allows selection of only A4-size paper or L-size paper.

(4003) When the direct print connection between the adapter and the PD printer is established, the adapter receives, from the PD printer, a notification indicating that the direct print connection has been established. Thus, part of the protocol stack shown in FIG. 9 relating to the direct printer connection has been established.

(4083) If the direct printer connection is established, it becomes possible for the adapter to receive image data transferred from the DSC, and the LED is turned on in the continuous ON mode. The mode in which the LED is lit may be changed depending on whether the PD printer is in a ready status or not.

Operation Sequence from Start of Transferring of Image to End of Printing

Figure 23:
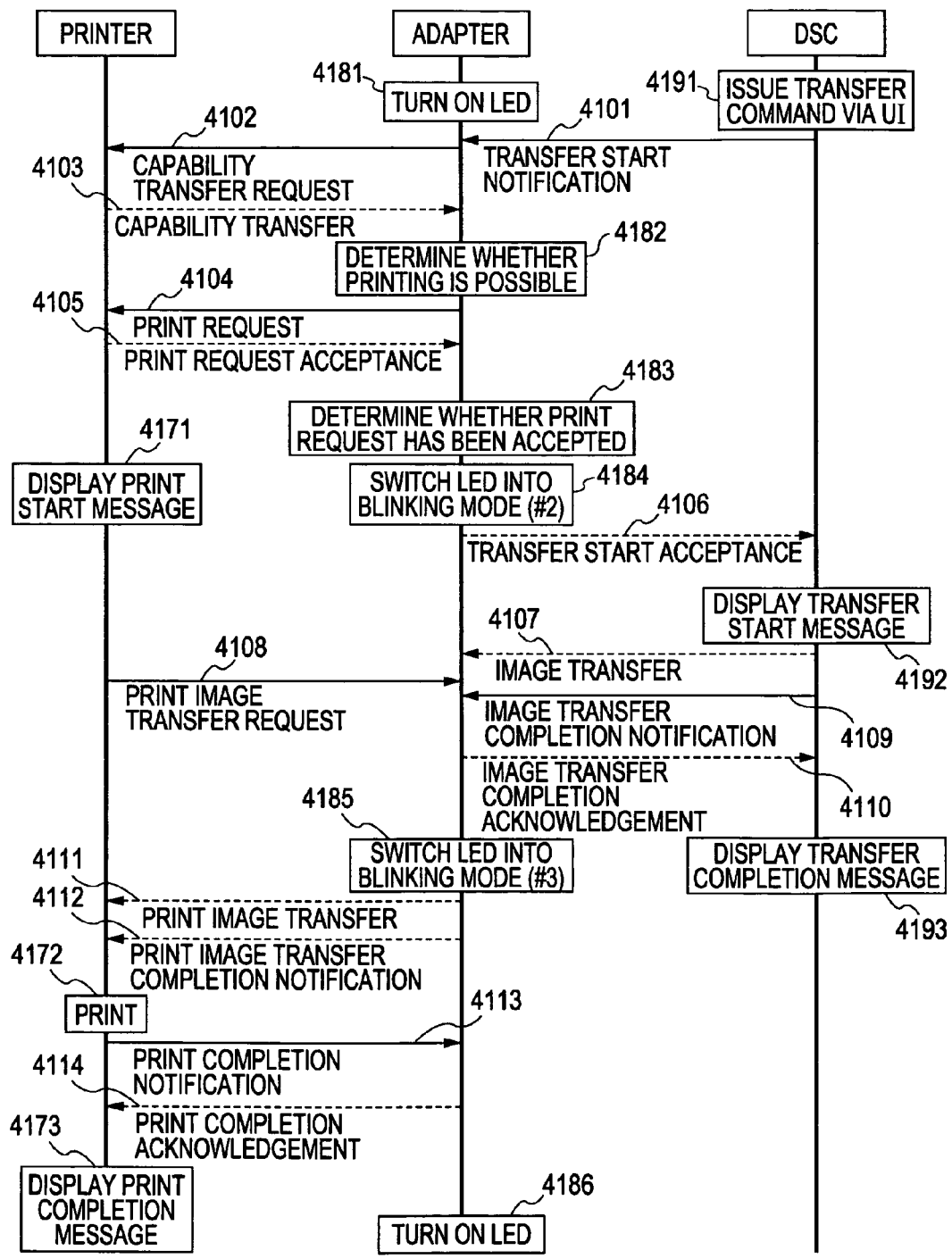
FIG. 23 is a diagram showing an operation sequence of a PD printer, an adapter, and a camera-equipped mobile telephone in terms of a process from a step in which the camera-equipped mobile telephone starts sending image data to a step in which printing is completed, according to an embodiment of the present invention.

FIG. 23 shows the operation sequence of the PD printer and the adapter from a step at which transferring of image data is started by the DSC to a step at which printing is completed, according to an embodiment of the present invention.

The sequence is explained in detail below with reference to step numbers shown in FIG. 23.

(4181) The adapter is in an initial state in which the adapter is capable of receiving image data sent from the DSC, and the LED is lit in the continuous ON mode. In this state, a user may set operation conditions by operating buttons on the adapter 1200 in terms of, for example, the paper size, the paper type, the number of copies, and enabling/disabling of printing of date.

(4191) The user issues an image transfer command by operating the operation button 1103 while referring to indication displayed on the liquid crystal display 1102 of the DSC. When the image transfer command is issued, it is not necessarily required that the communication connection between the DSC and the adapter is established, and thus the image transfer command may be issued when the user is outside his/her home or office. In this case, issuing of the image transfer command and sending of an image transfer start notification are performed separately in different steps in the sequence, and the communication connection between the DSC and the adapter is established when the transfer start notification is sent.

(4101) If the connection is established, the DSC sends the image transfer start notification to the adapter. If necessary, a connection establishment process is performed between the adapter and the DSC. In this specific example, an IrDA connection part in the protocol stack shown in FIG. 9 is established.

If the adapter receives the image transfer start notification from the DSC, the adapter requests the PD printer to transfer capability information and issue a print job before the adapter returns a transfer start acceptance response, as described below with reference to steps 4102 to 4105.

(4102) The adapter requests the PD printer to send capability information.

(4103) The PD printer sends the capability information to the adapter.

(4182) The adapter determines whether the PD printer is capable of printing image data transferred from the DSC, based on the capability information received from the PD printer and the image transfer start notification received from the DSC. For example, when the image format of the image data transferred from the DSC is included in image formats printable by the PD printer, the adapter determines that the PD printer is capable of printing the image transferred from the DSC but otherwise the adapter determines the opposite.

If it is determined that the PD printer is capable of printing the image transferred from the DSC, the following steps are performed as follows (the operation performed when the PD printer is not capable of printing the image data transferred from the DSC will be described below with reference to a step 4203 in the flow chart of FIG. 24).

(4104) The adapter issues a print request to the PD printer. If it is necessary to send print job information together with the print request message, the adapter may produce print job information including information indicating printing conditions specified by the user based on the image transfer start notification received from the DSC, and may send the produced print job information together with the print request to the PD printer.

(4105) The PD printer returns a print request acceptance response to the adapter.

(4183) The adapter checks the content of the received print request acceptance response to determine whether the print request has been accepted.

Alternatively, the adapter may acquire, in advance, information indicating the status of the PD printer. In the determination as to whether the print request has been accepted, for example, when the print request acceptance response returned from the PD printer indicates that the PD printer is in a print ready state, the adapter determines that the print request has been accepted. However, for example, if the returned print request acceptance response indicates that the PD printer is now performing a print job received from the PC and thus the PD printer is in a busy state, the adapter determines that the PD printer is currently in a state in which the PD printer is not capable of printing the image data transferred from the DSC. When the access cover 1003 is in an open state, no paper is set on the PD printer, or no ink is set on the PD printer, it is also determined that the PD printer is not capable of printing the image data transferred from the DSC.

In the following explanation, it is assumed that the print request has been accepted (the operation performed when the determination is that the print request is not accepted will be described below with reference to step 4206 in the flow chart shown in FIG. 24).

(4106) In response to the transfer start notification received in step 4101 from the DSC, the adapter returns a transfer start acceptance response.

(4171) The PD printer displays, on the liquid crystal display 1006, a message indicating that the print request has been received and is ready to start printing.

(4184) During the period in which the adapter is receiving image data sent from the DSC, the LED is lit in the blinking mode #2 (the timing of switching the LED into the blinking mode #2 may be immediately after step 4105, step 4106, or step 4107).

(4192) The DSC displays, on the liquid crystal display 1102, a message indicating that transferring of image data has been started.

(4107) The DSC sends the image data to the adapter. The image data received by the adapter is stored in the RAM 3203 of the adapter. The storing of the image data may be performed such that a particular fixed write start address is determined in advance, and the image data is always stored starting from the write start address (in this case, existing image data is overwritten) or such that the RAM is operated as a ring buffer and the image data is stored starting from an address immediately after an end address of previous image data. When the RAM has a sufficiently high storage capacity, the RAM can be used as the ring buffer that allows previous image data to be retained. In this case, the adapter may have a proper user interface that allows a user to issue a command to print image data stored in the RAM without having to re-transmit the image data from the DSC to the adapter.

(4108) The PD printer requests the adapter to transfer the image data.

(4109) When transferring of all image data is completed, the DSC sends an image transfer completion notification to the adapter (instead of sending such notification, a code indicating the end of image data may be transmitted at the end of the transferring of the image data in accordance with the transfer protocol).

(4110) In response to the image data transfer completion notification, the adapter returns an acknowledgment to the DSC.

(4185) During the period in which the PD printer is performing the print job after the transferring of the image data from the DSC is completed, the LED is lit in the blinking mode #3 (the timing of switching the LED into the blinking mode #3 may be immediately after step 4109 or step 4110 or immediately before step 4111).

(4193) The DSC displays, on the liquid crystal display 1102, a message indicating that the sending of the image data is completed.

(4111) The adapter 1200 transfers the received image data to the PD printer 1000.

(4112) When transferring of all received image data to the PD printer 1000 is completed, the adapter 1200 notifies the PD printer 1000 that the transferring of all image data to the PD printer 1000 is completed (instead of sending such a notification, a code indicating the end of image data may be transmitted at the end of the transferring of the image data in accordance with the transfer protocol).

(4172) The PD printer 1000 performs printing in accordance with the image data received from the adapter 1200.

(4113) When the printing is completed, the PD printer 1000 notifies the adapter 1200 that the printing is completed.

(4114) In response to the print completion notification from the PD printer, the adapter returns an acknowledgement.

(4173) The PD printer 1200 displays, on the liquid crystal display, a message indicating that the printing is completed.

(4186) If the adapter determines that the printing by the PD printer is completed, it becomes possible for the adapter to receive another image data from the DSC, and the LED is lit in the continuous ON mode (the timing of switching the LED into the continuous ON mode may be immediately after step 4113 or immediately after step 4114).

When the printing is completed, the image data stored in the RAM 3203 of the adapter may be automatically deleted so that high security is achieved for the image data.

Figure 24:
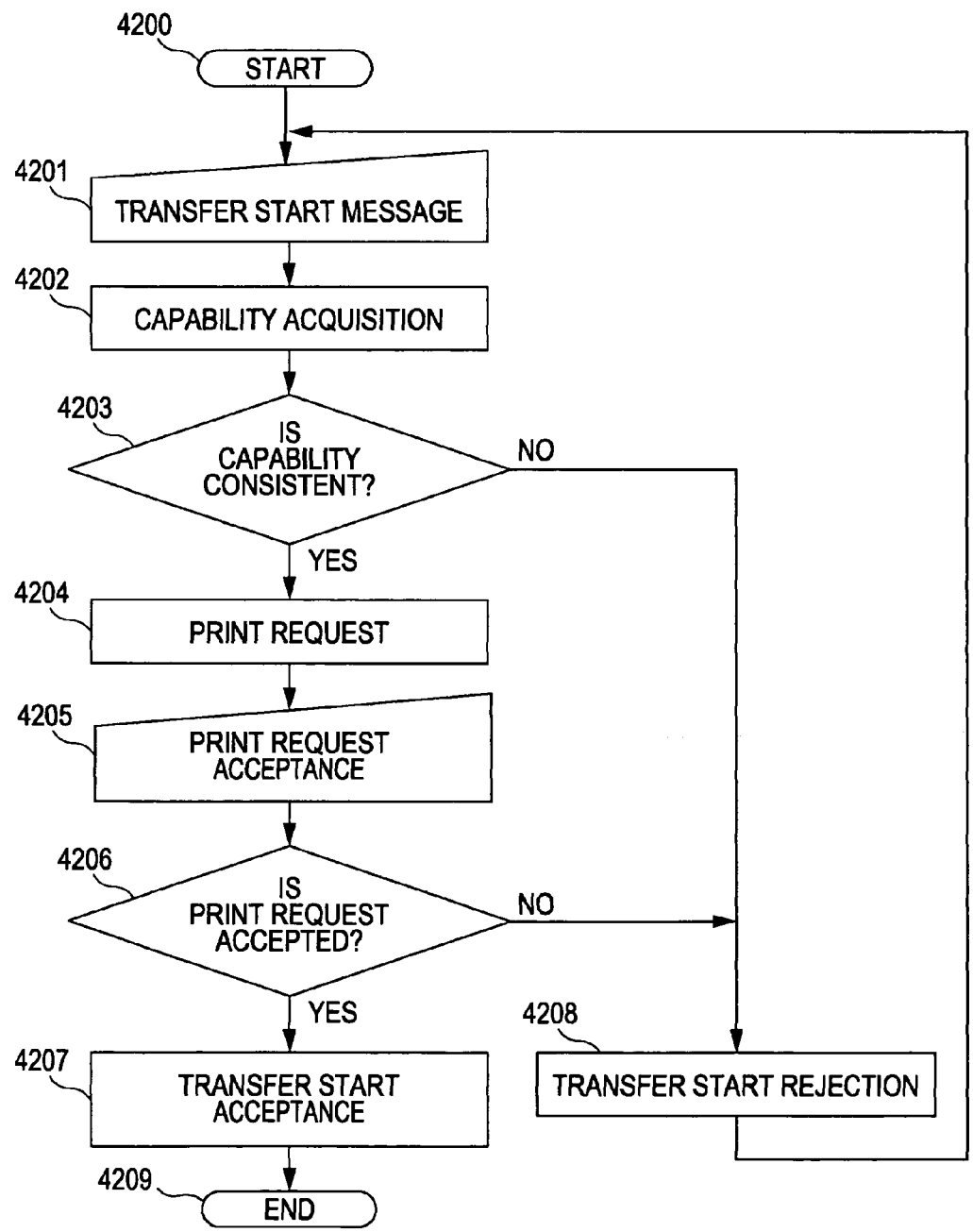
FIG. 24 is a diagram showing an operation sequence of an adapter in terms of a process from a step in which the adapter waits for image transfer notification to be received from a camera-equipped mobile telephone to a step in which the adapter accepts the start of image data transfer, according to an embodiment of the present invention.

Flow of the Operation of the Adapter from Waiting Step to Transfer Start Acceptance Step FIG. 24 is a flow chart showing the operation of the adapter from a step in which the adapter is waiting for image data to be sent from the DSC to a step in which the adapter accepts an image transfer notification.

The sequence is explained in detail below with reference to step numbers shown in FIG. 24.

(4200) In the first step of the flow chart shown in FIG. 24, the adapter is in a state in which the connection process explained above with reference to FIG. 22 is completed and the LED is lit in the continuous ON mode.

(4201) The adapter waits in step 4201 until the direct print connection to the PD printer is established and an image transfer start notification is sent from the DSC. If the image transfer start notification is received from the DSC, image transfer start notification data is stored in the RAM 3203, and the process proceeds to step 4202.

(4202) The adapter acquires capability information indicating the capability of the PD printer, and stores the acquired capability information in the RAM 3203.

(4203) The adapter examines the information acquired in step 4201 to detect the file format of the image data sent from the DSC. The adapter further examines the information acquired in step 4202 to determine whether the file format of the image data sent from the DSC is supported by the PD printer. If the file format is supported, the process proceeds to step 4204, but otherwise the process proceeds to step 4208.

(4204) The adapter issues a print request to the PD printer. Alternatively, information indicating the status of the PD printer may be acquired before the print request is issued. In this case, if the PD printer is not in the ready state, the process proceeds to step 4208 without issuing the print request.

(4205) The adapter waits in step 4205 until the PD printer accepts the print request and returns a print request acceptance response to the adapter.

(4206) The adapter checks the content of the received print request acceptance response to determine whether the print request has been accepted. If the print request has been accepted, the process proceeds to step 4207, but otherwise to step 4208.

(4207) In response to the transfer start notification received in step 4201 from the DSC, the adapter returns a transfer start acceptance response.

(4208) In response to the transfer start notification received in step 4201 from the DSC, the adapter returns a transfer start rejection message. Instead of explicitly representing the refusal by returning the transfer start rejection message, no response may be returned to the DSC. In this case, the DSC determines that the transfer start is refused when a timeout occurs.

An additional LED blinking mode may be prepared, and the LED may be lit in this mode for a particular period to indicate that the transfer start is refused.

(4209) The adapter receives image data sent from the DSC.

In an alternative embodiment described below, it is assumed that the adapter 1200 has a plurality of communication units (such as an IrDA communication unit and a Bluetooth communication unit), and is capable of concurrently receiving image data from a plurality of image supply devices (such as a DSC #1 and a DSC #2).

In this case, the adapter 1200 needs to perform processes specific to the respective image supply devices in addition to the process described above with reference to FIGS. 22 to 24.

Figure 25A:
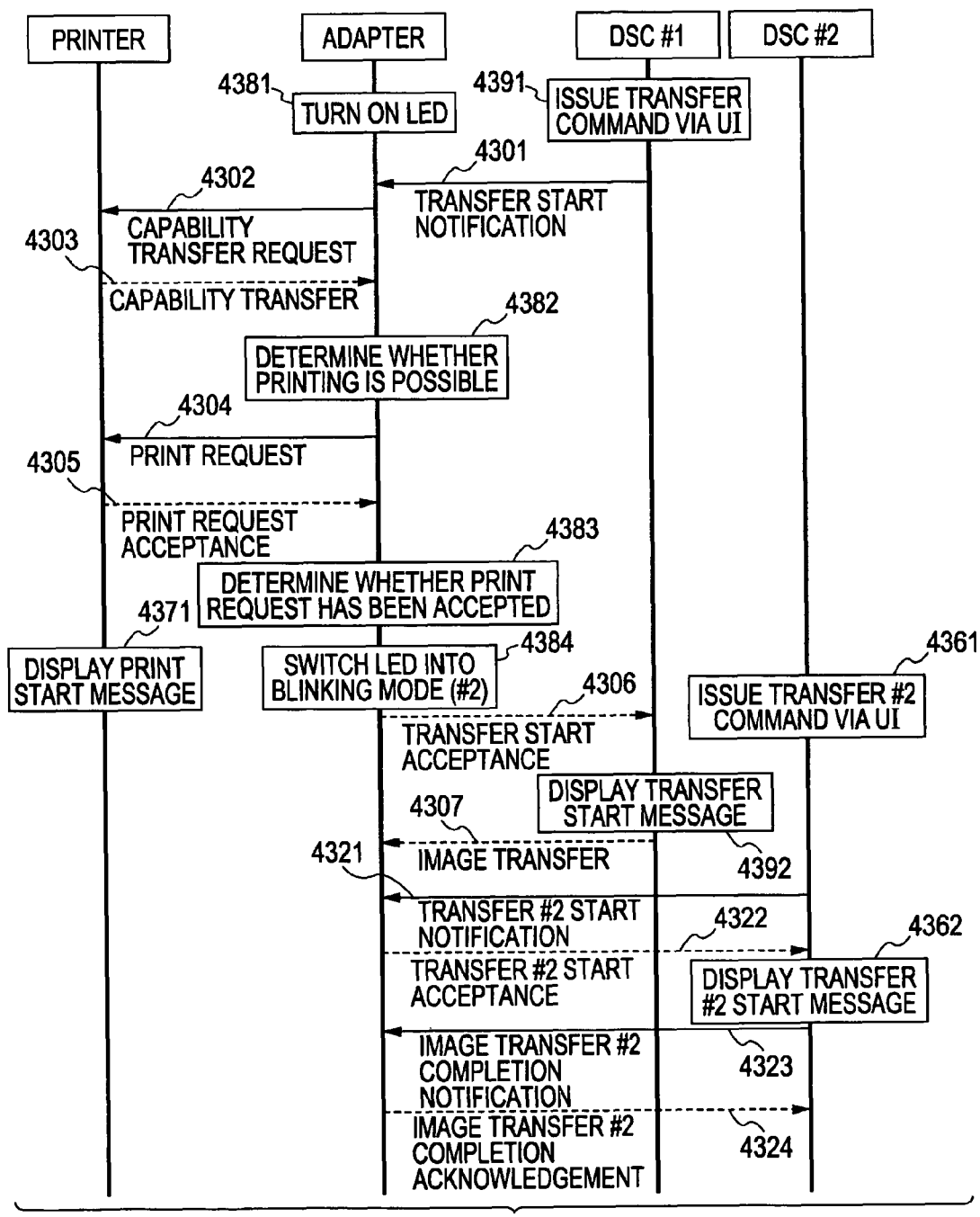
Figure 25B:
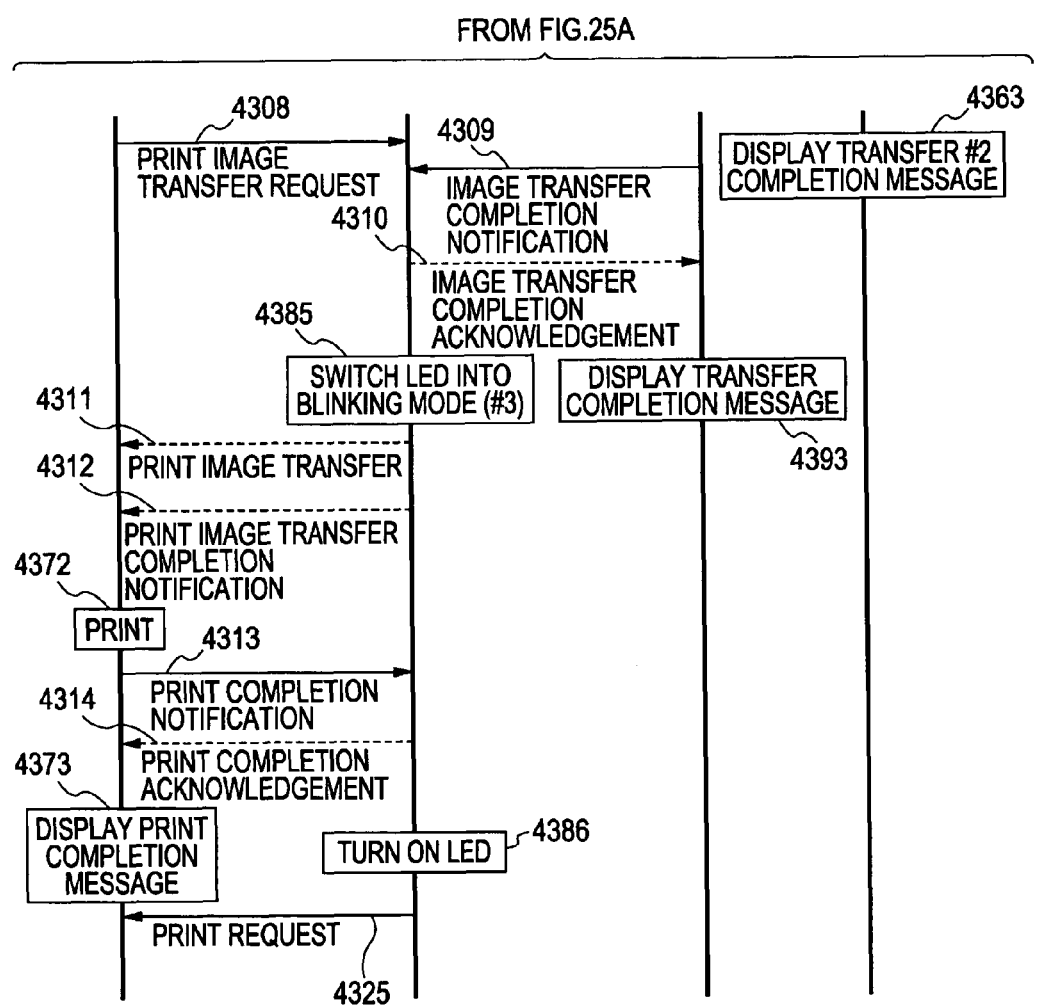

FIG. 25 is a diagram showing an operation sequence of direct printing in an environment that allows image data to be supplied from a plurality of image supply devices according to an embodiment of the present invention.

Communication steps 4301 to 4314 and processing steps 4371 to 4393 are similar to communication steps 4101 to 4114 and processing steps 4171 to 4193 shown in FIG. 23 and thus a duplicate explanation thereof is omitted. The sequence shown in FIG. 25 is different from that shown in FIG. 23 in that there is an additional device DSC #2, and additional steps, that is, communication steps 4321 to 4325 and processing steps 4361 to 4363, are performed between the DSC #2 and the adapter 1200, between the adapter 1200 and the PD printer 1000, or by the DSC #2.

Steps from the beginning of the flow to 4307 are similar to those of the flow shown in FIG. 23.

(4321) After a transfer start request is issued from the DSC #1, another transfer start request #2 is issued from the DSC #2 via a user interface of the DSC #2.

(4322) If the adapter 1200 receives the transfer start request #2 from the DSC #2, the adapter 1200 immediately accepts the start of the transfer #2.

(4362) If the DSC #2 receives the transfer start acceptance response, the DSC #2 displays a message that the transfer is started, and starts transferring of image data. The image data received by the adapter 1200 is stored in a storage area different from the storage area where the image data received from the DSC #1 is stored.

(4323) If the DSC #2 completes the transmission of all image data, the DSC #2 notifies the adapter 1200 of the completion of the transmission of all image data.

(4324) In response to the transfer completion notification from the DSC #2, the adapter 1200 returns an image transfer completion response to the DSC #2. Note that steps 4323 to 4324 may be performed at any time in a period from step 4301 in which a transfer start notification is issued from the DSC #1 to step 4325 that will be described below.

(4363) The DSC #2 displays, on its liquid crystal display, a message indicating that the sending of the image data is completed.

Thereafter, following steps 4308 to 4386 are performed in a similar manner as described above with reference to FIG. 23.

(4325) If the adapter 1200 detects, via communication steps 4313 and 4314, that the PD printer 1000 has completed the printing of image data sent from the DSC #1, the adapter 1200 issues a request to print image data received from the DSC #2. The following steps for the image data received from the DSC #1 are performed in a similar manner to steps starting from 4304 for the image data received from the DSC #1.

In a case in which a transfer request is issued by the DSC #1 in the middle of a printing process for image data transferred from the DSC #2, the transfer request from the DSC #1 is treated in a similar manner except that the DSC #1 and the DSC #2 are counterchanged.

In the embodiment described above, in step 4322, the adapter 1200 immediately accepts the transfer start command issued by the DSC #2. This is because it has already been determined in response to the transfer request from the DSC #1 that the PD printer 1000 is now in a state that allows it to accept a print request from the adapter 1200 via the determination step 4382 as to whether printing is possible and via the determination step 4383 as to whether printing has been started.

If the operation sequence is controlled such that the adapter 1200 makes determination in terms of starting of printing immediately after image data is transferred from the DSC #1 and issues a print request to the PD printer 1000, then the PD printer 1000 will receive the print request from the DSC #1 in communication step 4304 and will accept this print request in communication step 4305. The result of this is that when the PD printer 1000 receives a print request from another image supply device (DSC #2) in this situation, the PD printer 1000 rejects that print request. On the other hand, in a case in which the adapter 1200 accepts the transfer start request from the DSC #2 after the print request is accepted by the PD printer 1000, the PD printer 1000 accepts the print request after printing for image data transferred from the DSC #1 is completed, and thus the waiting time for the process for the DSC #2 becomes unnecessarily long. In a worst case, this causes a timeout error to occur.

As described above, when the adapter 1200 is capable of communicating with a plurality of image supply devices, if the PD printer 1000 has accepted a print request issued by the adapter 1200, the adapter 1200 is allowed to immediately accept a further transfer start notification when it is issued by an image supply device. In this case, transferring of image data is immediately started, and thus the waiting time of the image supply device is minimized, the transferring is completed at an earlier time, and the image supply device is released from the transferring operation.

Figure 26:
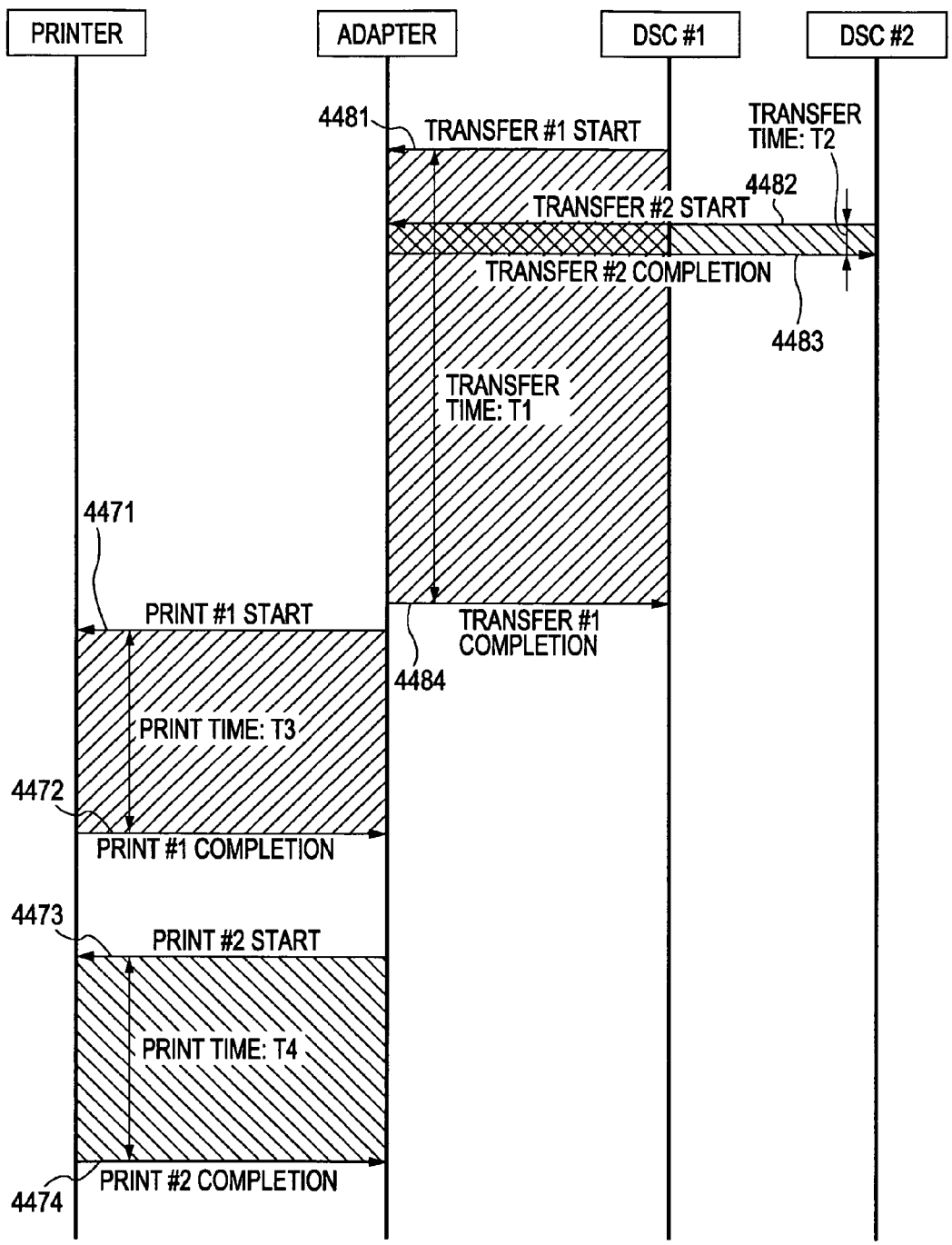
FIG. 26 is a timing chart associated with direct printing in an environment in which image data is supplied from a plurality of image supply devices.

With reference to FIG. 26, the reduction in the waiting time of an image supply device is described below.

FIG. 26 is a timing chart associated with direct printing in an environment in which image data is supplied from a plurality of image supply devices.

In FIG. 26, reference numeral 4481 denotes the timing of the start of transfer from the DSC #1, reference numeral 4482 the timing of the start of transfer from the DSC #2, reference numeral 4483 the timing of the end of transfer from the DSC #2, and reference numeral 4484 the timing of the end of transfer from the DSC #1. The transfer time T1 spent to transfer image data from the DSC #1 is given by a period from 4481 to 4484, and the transfer time T2 spent to transfer image data from the DSC #2 is given by a period from 4482 to 4483.

Reference numeral 4471 denotes the timing of the start of printing (printing #1) for image data given via transferring (transfer #1) from the DSC #1, reference numeral 4472 denotes the timing of the end of printing #1, reference numeral 4473 denotes the timing of the start of printing (printing #2) for image data given via transferring (transfer #2) from the DSC #2, and reference numeral 4474 denotes the timing of the end of printing #2. The print time T3 spent to perform the printing #1 for the image data given via the transfer #1 is given by a period from 4471 to 4472, and the print time T4 spent to perform the printing #2 for the image data given via the transfer #2 is given by a period from 4473 to 4474.

As can be understood from the above discussion, in an operation environment in which an adapter is capable of communicating with a plurality of image supply devices, if the above-described operation scheme designed for such operation environment according to the present embodiment of the invention is not employed, the transfer #2 encounters a waiting time of up to (T1+T3). However, if the above-described operation scheme according to the present embodiment of the invention is employed, a reduction in waiting time by up to (T1+T3) is possible.

FIG. 27 is a flow chart of the direct printing in the environment that allows image data to be supplied from a plurality of image supply devices according to the present embodiment of the invention.

In the flow chart of FIG. 27, there is shown a process performed by the adapter 1200 under the control of the CPU 3201 of the adapter 1200, after the initialization shown in FIG. 22 is completed.

(4501) The adapter 1200 determines whether a transfer start notification is received from the DSC #1. If the answer to step 4501 is No, the process proceeds to step 4511, but otherwise to step 4502.

(4502) The adapter 1200 acquires information indicating the status of the PD printer 1000.

(4503) Based on the acquired information indicating the status of the PD printer 1000, the adapter 1200 determines whether the PD printer 1000 is now printing data other than image data sent from the adapter 1200. If the determination in step 4503 is Yes, the process proceeds to step 4504. However, if the determination in step 4503 is No, the process proceeds to step 4505.

(4504) The adapter 1200 refuses the transfer start notification sent from the DSC #1, and the process proceeds to step 4511.

(4505) The adapter 1200 determines whether the PD printer 1000 is now processing a print job issued by the adapter 1200 based on the transfer request issued by the DSC #2. If the determination in step 4505 is No, the process proceeds to step 4506, but otherwise to step 4507.

(4506) The adapter 1200 issues a print request to the PD printer 1000, and the process proceeds to step 4507.

(4507) The adapter 1200 accepts the transfer start notification issued by the DSC #1. In response, the DSC #1 starts sending image data to the adapter 1200. The adapter 1200 records the time at which the sending of the image data is started. The process then proceeds to step 4511.

(4511) The adapter 1200 determines whether a transfer start notification from the DSC #2 is received. If the determination in step 4511 is No, the process proceeds to step 4521, but otherwise to step 4512.

(4512) The adapter 1200 acquires information indicating the status of the PD printer 1000.

(4513) Based on the acquired information indicating the status of the PD printer 1000, the adapter 1200 determines whether the PD printer 1000 is now printing data other than data sent from the adapter 1200. If the determination in step 4512 is Yes, the process proceeds to step 4514, but otherwise to step 4515.

(4514) The adapter 1200 refuses the transfer start notification sent from the DSC #2, and the process proceeds to step 4521.

(4515) The adapter 1200 determines whether the PD printer 1000 is now processing a print job issued by the adapter 1200 based on the transfer request issued by the DSC #1. If the determination in step 4515 is No, the process proceeds to step 4516, but otherwise to step 4517.

(4516) The adapter 1200 issues a print request to the PD printer 1000, and the process proceeds to step 4517.

(4517) The adapter 1200 accepts the transfer start notification issued by the DSC #2. In response, the DSC #2 starts sending image data to the adapter 1200. The adapter 1200 records the time at which the sending of the image data is started. The process then proceeds to step 4521.

(4521) The adapter 1200 compares the time at which the transferring of image data from the DSC #1 was started and the time at which the transferring of the image data from the DSC #2 was started. If the transfer start time from the DSC #1 has been recorded and the transfer start time from the DSC #1 is earlier, or if the transfer start time from the DSC #2 have not been recorded, the process proceeds to step 4522, but otherwise the process proceeds to step 4531.

(4522) The adapter 1200 responds to the image transfer request from the PD printer 1000 by transferring the image data received from the DSC #1. If the receiving of image data from the DSC #1 is not yet completed by this point of time, this step 4522 is skipped without performing transferring of data to the PD printer 1000, and the process proceeds to step 4523.

(4523) The adapter 1200 determines whether the PD printer 1000 has completed the printing of data transferred in step 4522. If the determination in step 4523 is No, the process proceeds to step 4531, but otherwise to step 4524.

(4524) The adapter 1200 clears the data indicating the transfer start time of the DSC #1.

(4525) The adapter 1200 determines whether transferring of data from the DSC #2 to the adapter 1200 has already been started. If the determination in step 4525 is No, the process proceeds to step 4531, but otherwise to step 4526.

(4526) This step is performed only when the answer to step 4515 is Yes, and thus step 4516 was skipped, that is, the request for printing of data transferred from the DSC #2 was not issued. The request for printing of data transferred from the DSC #2 is now issued to the PD printer 1000. Thereafter, the process proceeds to step 4531.

(4531) The adapter 1200 compares the time at which the transferring of image data from the DSC #2 was started and the time at which the transferring of the image data from the DSC #1 was started. If the transfer start time from the DSC #2 has been recorded and the transfer start time from the DSC #2 is earlier, or if the transfer start time from the DSC #1 have not been recorded, the process proceeds to step 4532, but otherwise the process proceeds to step 4501.

(4532) The adapter 1200 responds to the image transfer request from the PD printer 1000 by transferring the image data received from the DSC #2. If the receiving of image data from the DSC #2 is not yet completed by this point of time, this step 4532 is skipped without performing transferring of data to the PD printer 1000, and the process proceeds to step 4533.

(4533) The adapter 1200 determines whether the PD printer 1000 has completed the printing of data transferred in step 4532. If the determination in step 4533 is No, the process proceeds to step 4501, but otherwise to step 4534.

(4534) The adapter 1200 clears the data indicating the transfer start time of the DSC #2.

(4535) The adapter 1200 determines whether transferring of data from the DSC #1 to the adapter 1200 has already been started. If the determination in step 4535 is No, the process proceeds to step 4501, but otherwise to step 4536.

(4536) This step is performed only when the answer to step 4505 is Yes, and thus step 4506 was skipped, that is, the request for printing of data transferred from the DSC #1 was not issued. The request for printing of data transferred from the DSC #1 is now issued to the PD printer 1000. Thereafter, the process proceeds to step 4501.

In the embodiment described above, it is assumed by way of example that image data is supplied from two image supply devices DSC #1 and DSC #2. A reduction in the waiting time can also be achieved in a case in which image data is supplied from three or more image supply devices.

Second Embodiment

Depending on the transfer method (such as that using IrDA, Bluetooth, or USB) used by the DSC #1 or the DSC #2, an unnecessary waiting time can occur, which makes it impossible to perform printing in a minimum time. To avoid the above problem, a second embodiment of the present invention provides a "transfer completion priority model" to reduce the total print time depending on conditions such as the transfer method and/or the image size.

Figure 28B:
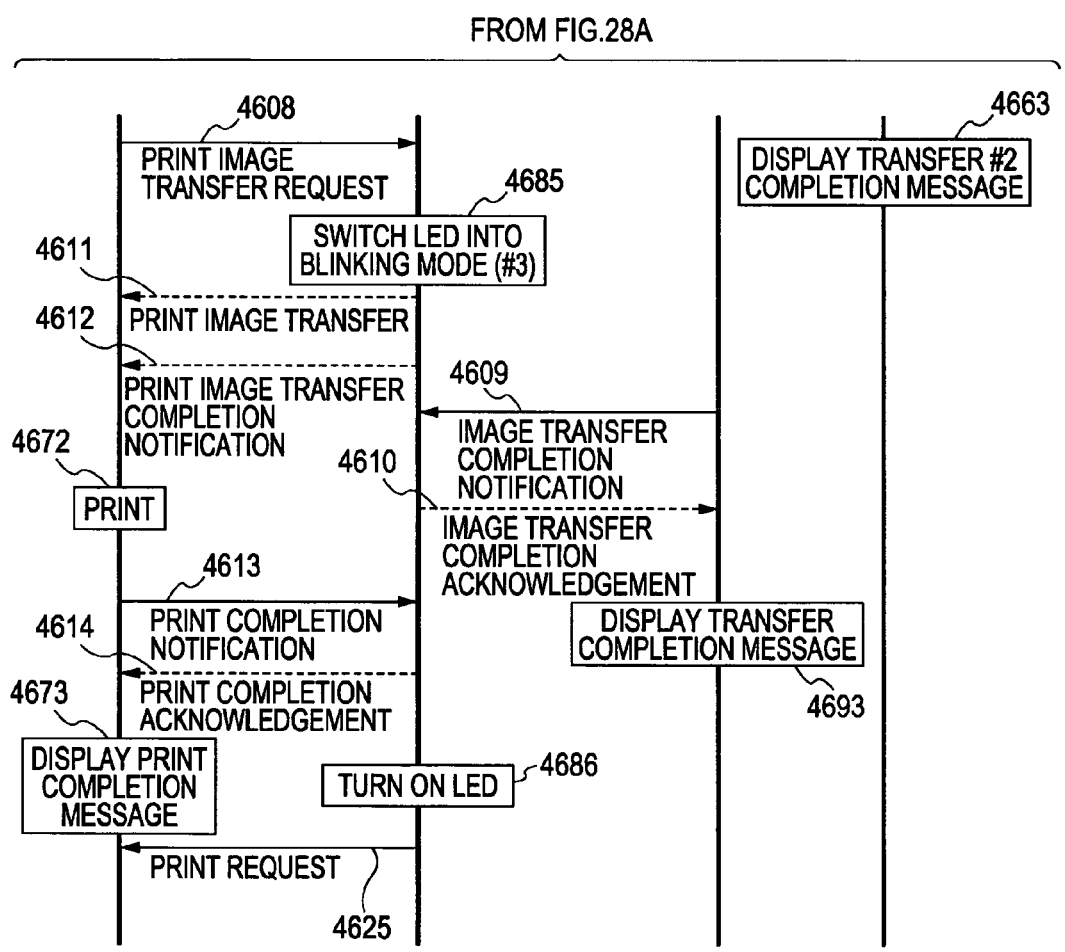

FIG. 28 is a diagram showing an operation sequence in a transfer completion priority mode according to the present embodiment of the invention.

Communication steps 4601 to 4607 and processing steps 4671 to 4693 are similar to communication steps 4301 to 4307 and processing steps 4371 to 4393 shown in FIG. 25, and thus a duplicate explanation thereof is omitted. The difference of the operation sequence shown in FIG. 28 from that shown in FIG. 25 is in that the transfer speed from the DSC #1 is much lower than the transfer speed from the DSC #2, and, as a result, the PD printer 1000 performs printing for the image data transferred from the DSC #2 before for the image data transferred from the DSC #1, and transferring of image data from the DSC #1 is completed via communication steps 4609 to 4610 in the middle of the printing process performed by the PD printer 1000 to the image data transferred from the DSC #2.

Steps from the beginning of the flow to 4607 are similar to those of the flow shown in FIG. 23.

(4621) After a transfer start request is issued from the DSC #1, another transfer start request #2 is issued from the DSC #2 via a user interface of the DSC #2.

(4622) If the adapter 1200 receives the transfer start request #2 from the DSC #2, the adapter 1200 immediately accepts the start of the transfer #2.

(4662) If the DSC #2 receives the transfer start acceptance response, the DSC #2 displays a message that the transfer is started, and starts transferring of image data. The image data received by the adapter 1200 is stored in a storage area different from the storage area where the image data received from the DSC #1 is stored.

(4623) If the DSC #2 completes the transmission of all image data, the DSC #2 notifies the adapter 1200 of the completion of the transmission of all image data.

(4624) In response to the transfer completion notification from the DSC #2, the adapter 1200 returns an image transfer completion response to the DSC #2.

(4663) The DSC displays, on its liquid crystal display, a message indicating that the sending of the image data is completed.

(4608) In response to an image transfer request from the PD printer 1000, the adapter 1200 decides that the image data which has been completely received from the DSC #2 should be transferred to the PD printer 1000 in preference to image data from the DSC #1 which has not been completed received yet. In this situation, if the content of the print request issued in step 4604 is inconsistent with printing for the image data transferred from the DSC #2, the adapter 1200 may send a cancel notification to the PD printer 1000 and may send a correct print request for the image data transferred from the DSC #2 to the PD printer 1000.

(4685) During the period in which the PD printer 1000 is performing the print job after the transferring of the image data from the DSC #2 is completed, the LED is lit in the blinking mode #3.

(4611) The adapter 1200 transfers the image data received from the DSC #2 to the PD printer 1000.

(4612) When transferring of all image data received from the DSC #2 to the PD printer 1000 is completed, the adapter 1200 notifies the PD printer 1000 that the transferring of all image data to the PD printer 1000 is completed.

(4672) The PD printer 1000 performs printing in accordance with the image data originally sent from the DSC #2 and received via the adapter 1200.

(4609) If the DSC #1 completes the transmission of all image data, the DSC #1 notifies the adapter 1200 of the completion of the transmission of all image data.

(4610) In response to the transfer completion notification from the DSC #1, the adapter 1200 returns an acknowledgement. Note that steps 4609 to 4610 may be performed at any time in a period from step 4608 in which the adapter 1200 decides to give priority to the image transferred from the DSC #2 to step 4625 that will be described below.

(4613) When the printing is completed, the PD printer 1000 notifies the adapter 1200 that the printing is completed.

(4625) If the adapter 1200 detects, via communication steps 4613 and 4614, that the PD printer 1000 has completed the printing of image data sent from the DSC #2, the adapter 1200 issues a request to print image data received from the DSC #1. The following steps for the image data received from the DSC #1 are performed in a similar manner to steps starting from 4304 for the image data received from the DSC #1 in the flow shown in FIG. 25.

In a case in which a transfer request is issued by the DSC #1 in the middle of a printing process for image data transferred from the DSC #2, the transfer request from the DSC #1 is treated in a similar manner except that the DSC #1 and the DSC #2 are counterchanged.

The determination as to whether the image data transferred from the DSC #1 or the image data transferred from the DSC #2 should be employed as the image data to be transferred in step 4608 is basically made such that when transferring of image data from one of the DSC #1 and the DSC #2 is completed but transferring from the other one is not completed yet, the image data which has been already completely received is employed as the image data to be transferred in step 4608. By making the determination in this way, it is possible to reduce the total printing time. In a case in which transferring from the DSC #1 and transferring from the DSC #2 are both already completed, there is little possibility that a reduction in the total printing time is achieved whether higher priority is given to either image data, and thus it is more reasonable to give higher priority to image data whose transferring was started earlier.

Now, referring to FIG. 29, the reduction in the total time needed for the printing process is discussed below.

FIG. 29 is a timing chart of an operation in a transfer completion priority mode according to the present embodiment of the invention.

In FIG. 29, reference numeral 4781 denotes the timing of the start of transfer from the DSC #1, reference numeral 4782 the timing of the start of transfer from the DSC #2, reference numeral 4783 the timing of the end of transfer from the DSC #2, and reference numeral 4784 the timing of the end of transfer from the DSC #1. The transfer time T1 spent to transfer image data from the DSC #1 is given by a period from 4781 to 4784, and the transfer time T2 spent to transfer image data from the DSC #2 is given by a period from 4782 to 4783. Because the timing 4783 of the end of transfer from the DSC #2 is earlier than the timing of the end of transfer from the DSC #1, the adapter 1200 determines that the printing by the PD printer 1000 can be performed first for the image data transferred from the DSC #2.

Reference numeral 4771 denotes the timing of the start of printing (printing #2) for image data given via the transfer (transfer #2) from the DSC #2, and reference numeral 4772 denotes the timing of the end of printing #2, reference numeral 4773 denotes the timing of the start of printing (printing #1) for image data given via the transfer (transfer #1) from the DSC #1, and reference numeral 4774 denotes the timing of the end of printing #1. The print time T4 spent to perform the printing #2 for the image data given via the transfer #2 is given by a period from 4771 to 4772, and the print time T3 spent to perform the printing #1 for the image data given via the transfer #1 is given by a period from 4773 to 4774.

In the operation sequence shown in FIG. 29, as can be seen from comparison with FIG. 26, the print time T4 is included in the transfer time T1 and thus the total processing time is given by (T1+T3) and the total processing is less by T4 than the total processing time given by (T1+T3+T4) in the operation sequence shown in FIG. 26. This occurs when the following condition is satisfied:

T1>T2+T4+(difference between the start time of transfer #1 and the start time of transfer #2)

For a more general condition T1>T2, the reduction in the total processing time is given by Min(T4, T1−T2↓(difference between the start time of transfer #1 and the start time of transfer #2))

T1 and T2 vary depending on the communication method (such as IrDA, Bluetooth, USB, etc.) and the size of transferred image date. Information about the communication method and the data size can be acquired before transfer is completed, and thus it is possible to estimate the possible amount of reduction in total processing time. In view of the above, instead of simply giving high priority to image data with an earlier transfer completion time, the operation mode may be switched between the mode according to the first embodiment and the mode according to the second embodiment, depending on whether the amount of reduction in total processing time satisfies a predetermined condition such as reduced time<T4/2 reduced time<constant (for example, 10 sec)

FIG. 30 is a flow chart of an operation in a transfer completion priority mode according to the present embodiment of the invention.

The flow shown in FIG. 30 is similar to that shown in FIG. 27 except for six steps described below and thus the following discussion will be focused on the difference, that is, these six steps.

(4807) Transferring from the DSC #1 is started. However, unlike in step 4507 of the processing sequence shown in FIG. 27, recording of the transfer start time is not performed.

(4817) Transferring from the DSC #2 is started. However, unlike in step 4517 of the processing sequence shown in FIG. 27, recording of the transfer start time is not performed.

(4821) Unlike in step 4521 of the processing sequence shown in FIG. 27 in which a comparison is made in terms of the transfer start time, a determination is made as to whether transfer from the DSC #1 is completed. If the answer is No, the process proceeds to step 4831, but otherwise to step 4822.

(4831) Unlike in step 4531 of the processing sequence shown in FIG. 27 in which a comparison is made in terms of the transfer start time, a determination is made as to whether transfer from the DSC #2 is completed. If the determination in step 4831 is No, the process proceeds to step 4801, but otherwise to step 4832.

The processing sequence according to the present embodiment does not include steps corresponding to steps 4524 and 4534 of the processing sequence shown in FIG. 27.

(4823). If the answer is Yes, the process proceeds to step 4825.

(4833) If the answer is Yes, the process proceeds to step 4835.

In the embodiment described above, it is assumed by way of example that image data is supplied from two image supply devices DSC #1 and DSC #2, a reduction in the total time of printing process can also be achieved in a case in which image data is supplied from three or more image supply devices.

Third Embodiment

In the second embodiment described above, the processing sequence is performed in the transfer completion priority mode to reduce the total time needed for the printing process.

However, in the transfer completion priority mode according to the second embodiment, if data transferred from the DSC #1 and data transferred from the DSC #2 are different in property (as is the case when a document content to be printed on normal paper is transferred from the DSC #1 and a photographic image content to be printed on photographic paper is transferred from the DSC #2), there is a possibility that printing is performed on paper of a wrong type/size different from the type/size specified by a user.

The possibility that content is printed on wrong paper against the intention of a user is discussed in further detail below with reference to FIG. 31.

Figure 31:
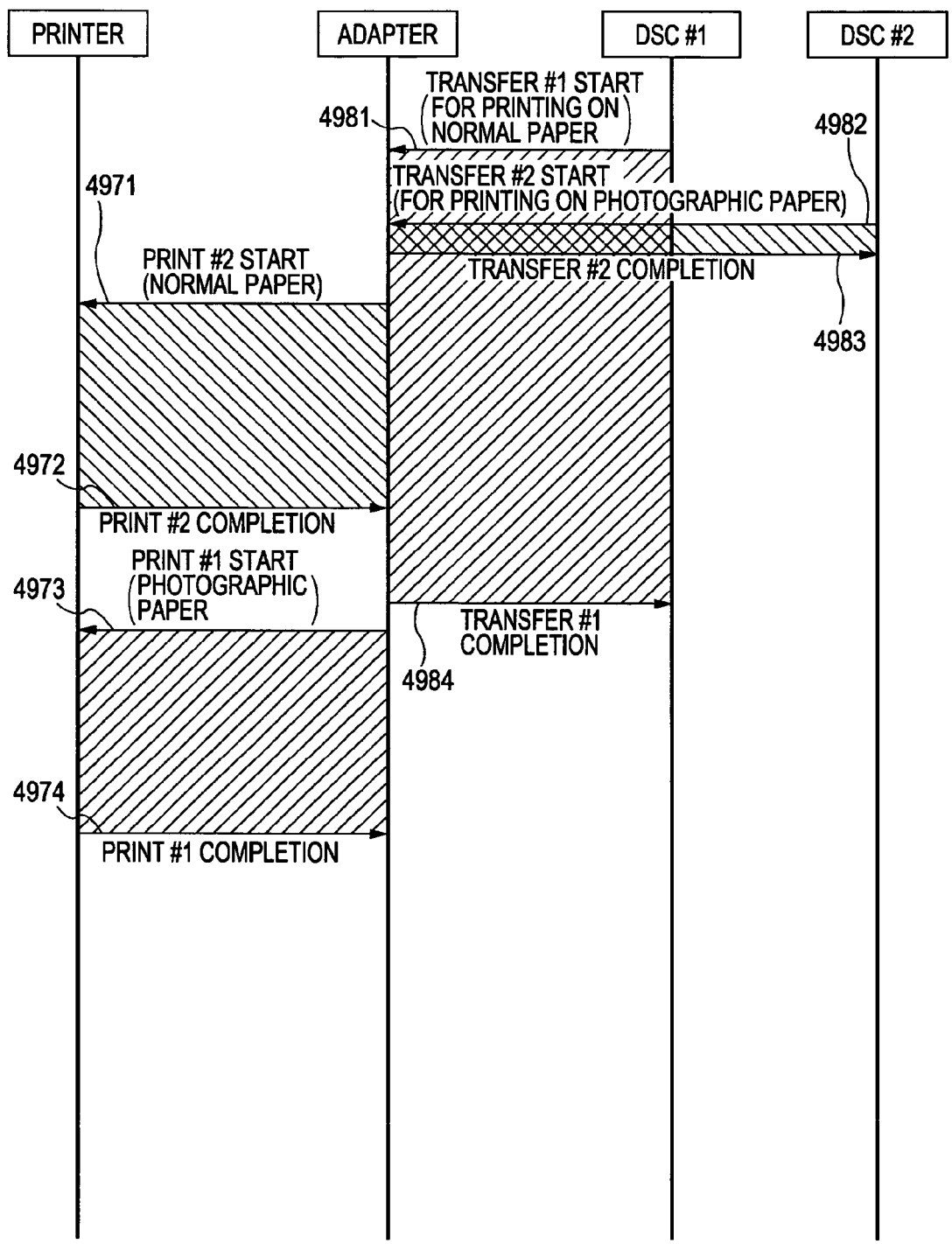
FIG. 31 is a timing chart of an operation in a transfer completion priority mode according to an embodiment of the present invention, wherein a problem can occur depending on the situation.

FIG. 31 is a timing chart of an operation in a transfer completion priority mode according to an embodiment of the present invention, wherein the above-described problem can occur depending on the situation.

In FIG. 31, reference numeral 4981 denotes the timing of the start of transfer from the DSC #1. In this specific example, it is assumed that a print job (such as a document image in the format of PNG) to be printed on normal paper is transferred in this transfer step. Reference numeral 4982 denotes the timing of the start of transfer from the DSC #2. In this specific example, it is assumed that a print job (such as a photographic image in the format of JPEG) to be printed on photographic paper is transferred in this transfer step. Reference numeral 4983 denotes the timing of the end of transfer from the DSC #2, and reference numeral 4984 denotes the timing of the end of transfer from the DSC #1.

Because the user first issued the command to perform transfer #1 from the DSC #1 and then the command to perform transfer #2 from the DSC #2, the user most likely sets paper such that photographic paper for use for the image data transferred via the transfer #2 is placed under normal paper for use for the image data transferred via the transfer #1 so that the automatic paper feeder 1007 of the PD printer 1000 first feeds normal paper and then photographic paper, or the user sets photographic paper for the image data transferred via the transfer #2 after the automatic paper feeder 1007 actually fed the normal paper for the image data given via the transfer #1. In the present discussion, it is assumed by way of example that the paper size is A4 for both print jobs.

Reference numeral 4971 denotes the timing of the start of printing (printing #2) for image data given via the transfer (transfer #2) from the DSC #2, reference numeral 4972 the timing of the end of printing #2, reference numeral 4973 the timing of the start of printing (printing #1) for image data given via the transfer (transfer #1) from the DSC #1, and reference numeral 4974 the timing of the end of printing #1.

In this situation, the most likely occurrence is that normal paper specified by a user for the image data transferred (#1) from the DSC #1 is fed in step 4971, and photographic paper specified by a user for the image data transferred (#2) from the DSC #2 is fed in step 4973. The result of this is that the photographic image in the JPEG format is printed on the normal paper in step 4972, and the document in the PNG format is printed on the photographic paper in step 4974.

In the present embodiment, to reduce the risk that printing will be performed on wrong paper different from that specified by a user, direct printing is performed in the manner described below with reference to a timing chart shown in FIG. 32 and a flow chart shown in FIG. 33.

Figure 32:
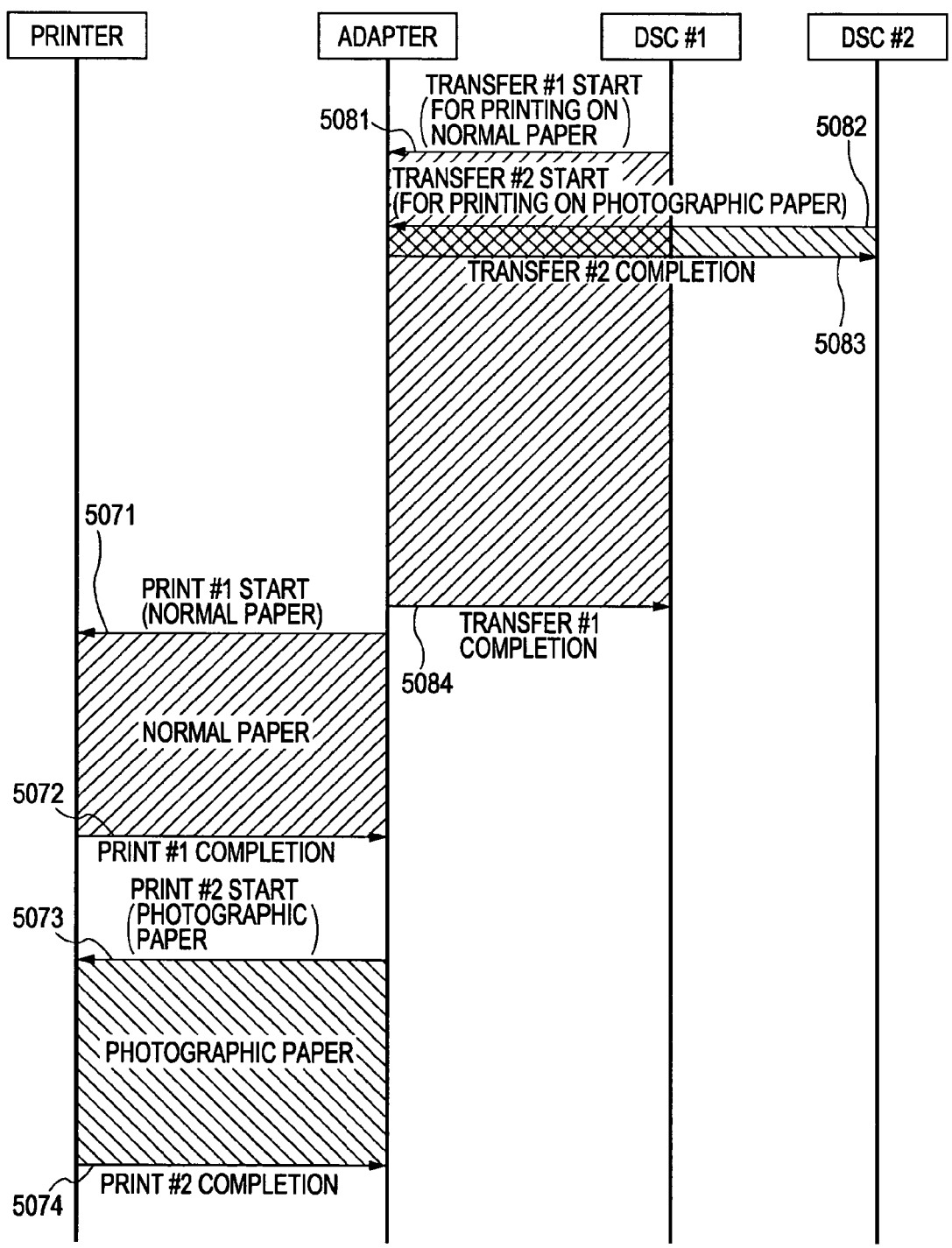
FIG. 32 is a timing chart of an improved operation in a transfer completion priority mode according to an embodiment of the present invention, wherein there is a possibility that a problem can occur.

FIG. 32 is a timing chart of an improved operation in the transfer completion priority mode according to the present embodiment of the invention.

In FIG. 32, reference numeral 5081 denotes the timing of the start of transfer from the DSC #1. In this specific example, it is assumed that a print job (such as a document image in the format of PNG) to be printed on normal paper is transferred in this transfer step. Reference numeral 5082 denotes the timing of the start of transfer from the DSC #2. In this specific example, it is assumed that a print job (such as a photographic image in the format of JPEG) to be printed on photographic paper is transferred in this transfer step. Reference numeral 5083 denotes the timing of the end of transfer from the DSC #2, and reference numeral 5084 denotes the timing of the end of transfer from the DSC #1.

Reference numeral 5071 denotes the timing of the start of printing (printing #1) for image data given via the transfer (transfer #1) from the DSC #1, reference numeral 5072 denotes the timing of the end of printing #1, reference numeral 5073 denotes the timing of the start of printing (printing #2) for image data given via the transfer (transfer #2) from the DSC #2, and reference numeral 5074 denotes the timing of the end of printing #2.

In the above operation, normal paper specified by a user for the image data transferred (#1) from the DSC #1 is fed in step 5071, and photographic paper specified by a user for the image data transferred (#2) from the DSC #2 is fed in step 5073. As a result, the document in the PNG format is printed on the normal paper in step 5072, and the photographic image in the JPEG format is printed on the photographic paper in step 5074.

Figure 33B:
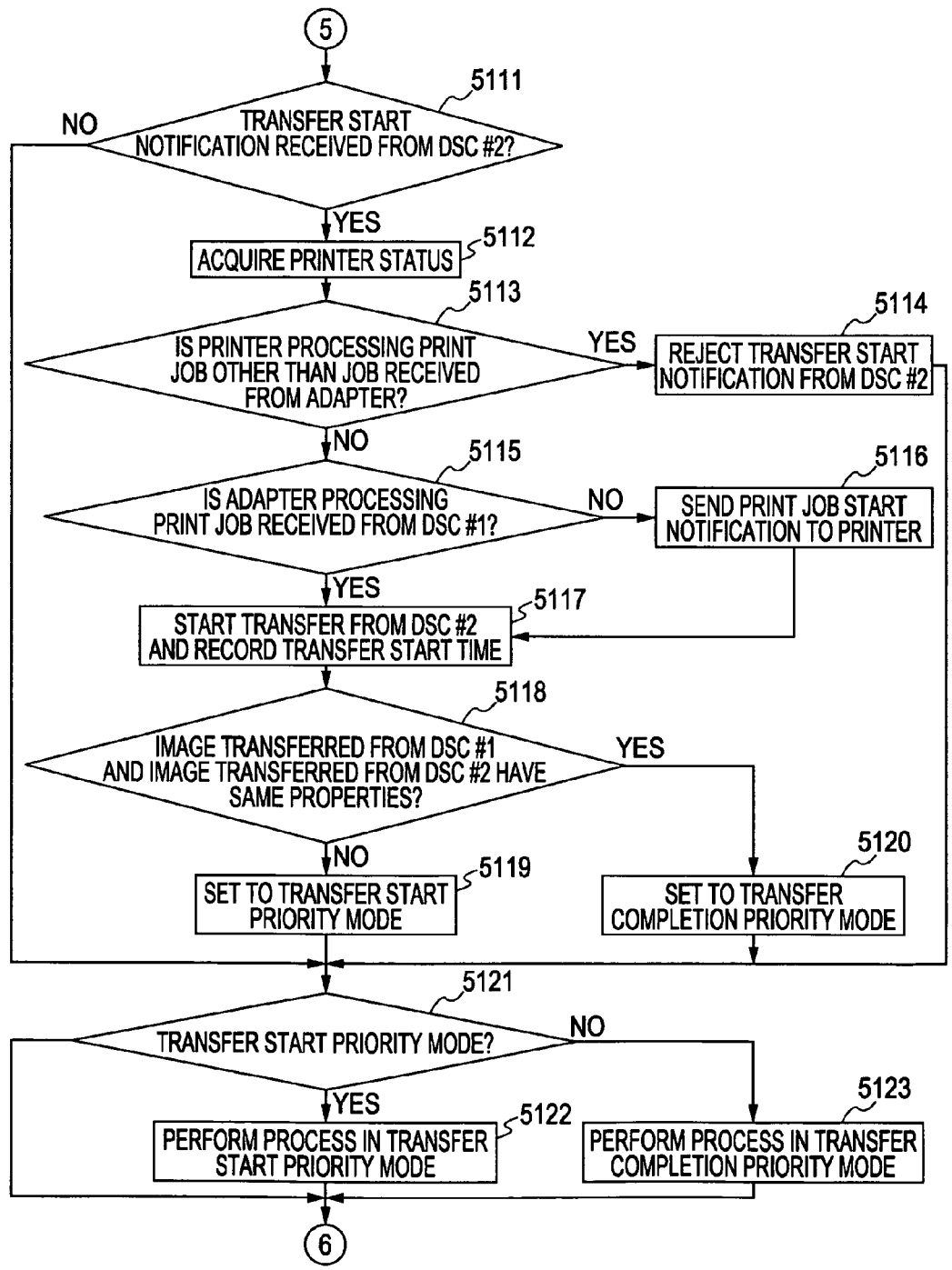

FIG. 33 is a flow chart of the improved operation in the transfer completion priority mode according to the present embodiment of the invention.

In FIG. 33, as in FIG. 27 or 30, the process performed by the adapter 1200 under the control of the CPU 3201 is shown for steps after the initialization shown in FIG. 22 is completed.

Steps 5101 to 5106 are similar to steps 4501 to 4506 shown in FIG. 27, and thus a duplicated explanation thereof is omitted.

(5107) The adapter 1200 accepts the transfer start notification issued by the DSC #1. In response, the DSC #1 starts sending image data to the adapter 1200. The adapter 1200 records the time at which the sending of the image data is started. The process then proceeds to step 5108.

(5108) A determination is made as to whether the property of the image data transferred from the DSC #1 is consistent with the property of the image data being currently transferred from the DSC #2. If the answer is No, then it is determined that printing should be performed in the same order as the order in which transferring was started so that printing will be performed on correct specified paper. The process then proceeds to step 5109.

(5109) The operation mode is set to the transfer start priority mode, and the process proceeds to step 5111.

On the other hand, in the case in which the answer in step 5108 is Yes, it is determined that the order of printing can be changed without creating the risk that printing will be performed on wrong paper different from the paper specified by the user, and the process proceeds to step 5110.

(5110) The operation mode is set to the transfer completion priority mode, and the process proceeds to step 5111.

In a case in which transferring from the DSC #2 is not currently being performed, the determination in step 5108 is made as No, although no problem will occur whether the determination is Yes or No.

Steps 5111 to 5116 are similar to steps 4511 to 4516 shown in FIG. 27, and thus a duplicated explanation thereof is omitted.

(5117) The adapter 1200 accepts the transfer start notification issued by the DSC #2. In response, the DSC #2 starts sending image data to the adapter 1200. The adapter 1200 records the time at which the sending of the image data is started. The process then proceeds to step 5118.

(5118) A determination is made as to whether the property of the image data transferred from the DSC #2 is consistent with the property of the image data being currently transferred from the DSC #1. If the answer is No, then it is determined that printing should be performed in the same order as the order in which transferring was started so that printing will be performed on correct specified paper. The process then proceeds to step 5119.

(5119) The operation mode is set to the transfer start priority mode, and the process proceeds to step 5121.

On the other hand, in the case in which the answer in step 5118 is Yes, it is determined that the order of printing can be changed without creating the risk that printing will be performed on wrong paper different from the paper specified by the user, and the process proceeds to step 5120.

(5120) The operation mode is set to the transfer completion priority mode, and the process proceeds to step 5121.

In a case in which transferring from the DSC #2 is not currently being performed, the determination in step 5118 is made as No, although no problem will occur whether the determination is Yes or No.

(5121) A determination is made as to whether the current operation mode is the transfer start priority mode. If the answer is Yes, the process proceeds to step 5122, but otherwise (that is, if the current operation mode is the transfer completion priority mode) the process proceeds to step 5123.

(5122) The operation is performed in the transfer start priority mode in a similar manner to the operation in steps 4521 to 4536 in FIG. 27, and thus a further detailed description is omitted herein. After this operation is completed, the process returns to step 5101.

(5123) The operation is performed in the transfer completion priority mode in a similar manner to the operation in steps 4821 to 4836 in FIG. 30, and thus a further detailed description is omitted herein. After this operation is completed, the process returns to step 5101.

In the embodiment described above, it is assumed by way of example that image data is supplied from two image supply devices DSC #1 and DSC #2, a reduction in the total time of printing process can also be achieved in a case in which image data is supplied from three or more image supply devices.

In this third embodiment, the operation mode is switched between the transfer start priority mode and the transfer completion priority mode depending on whether the image format is identical for a plurality of image data. However, the criterion for the determination as to whether the operation mode should be switched is not limited to whether the image format is identical or not. The determination as to whether the operation mode should be switched may be made based on another condition, as long as it is possible to determine whether a change in printing order for image data transferred from the DSC #1 and DSC #2 results in a high risk that printing will be performed on wrong paper different from the paper specified by a user. For example, when paper size information is attached to each of image data transferred from the DSC #1 and the DSC #2, the determination may be made depending on whether the paper size is the same, or depending on whether the paper type is the same. Instead of making the determination based on the strict coincidence in image format, image formats may be grouped, for example, into a photographic format group consisting of JPEG, TIFF, etc. and a document format group consisting of PNG, GIF, etc., and the determination may be made based on comparison in terms of the format group. The determination may also be made based on a combination of a plurality of criteria. The adapter 1200 may have a user interface disposed thereon which allows a user to switch the operation mode between the transfer start priority mode and the transfer completion priority mode. When transferring is completed for image data in which transferring was started later, this fact may be notified to a user so that the user may select the operation mode.

By switching the operation mode between the transfer start priority mode and the transfer completion priority mode in the above-described manner, it is possible to reduce the risk that content is printed on wrong paper against the intention of a user.

Fourth Embodiment

In the third embodiment described above, disclosed is the technique to reduce that risk that content is printed on wrong paper against the intention of a user.

However, in the flow shown in FIG. 33, although the risk that a content is printed on wrong paper against the intention of a user can be reduced in the case in which only one image is transferred from each of the DSC #1 and the DSC #2, the risk is not necessarily reduced sufficiently when two or more images are continuously transferred from one DSC (for example, the DSC #1).

For example, there can be a system in which when a DSC (for example, the DSC #1) transfers image data using an IrDA device, image data is transferred on a one-by-one basis, but it is possible to select a plurality of pages to be printed on the liquid crystal display 1102 of the DSC #1 and the DSC #1 transfers the selected pages on a one-by-one basis.

FIG. 34 is a timing chart associated with direct printing in an environment in which a plurality of image data supplied from a plurality of image supply devices are printed in the direct print mode according to an embodiment of the present invention, wherein there is a possibility that a problem occurs.

In the example shown in FIG. 34, the DSC #1 transfers two contents to be printed on normal paper (for example, two document images in the PNG format) to the adapter 1200 and the DSC #2 transfers one content to be printed on photographic paper (for example, a photographic image in the JPEG format) to the adapter 1200.

In FIG. 34, reference numeral 5281 denotes the timing of the start of transfer of first image data from the DSC #1, reference numeral 5282 denotes the timing of the start of transfer from the DSC #2, reference numeral 5283 denotes the timing of the end of transfer from the DSC #2, reference numeral 5284 denotes the timing of the end of transfer of the first image data from the DSC #1, reference numeral 5285 denotes the timing of the start of transfer of second image data from the DSC #1, and reference numeral 5286 denotes the timing of the end of transfer of the second image data from the DSC #1.

When a plurality of image data are transferred from the same image source at intervals (T1 from the timing 5284 to the timing 5285) shorter than a predetermined value TT, the adapter 1200 determines that these transferred images belong to the same job, and the adapter 1200 does not allow any other image source to interrupt this job. As a result, transferring is started in the order first image from DSC #1, DSC #2, and second image from DSC #1.

Because the user first issued the print command for two images from the DSC #1 (more strictly speaking, the user first issued the transfer command #1-1 and the transfer command #1-2) and then issued the transfer command #2 to transfer image data from the DSC #2, the user most likely sets paper such that photographic paper for use for image data transferred via the transfer #2 is placed under two sheets of normal paper for use for the image data transferred via the transfer #1 so that the automatic paper feeder 1007 feeds paper in the order normal paper, normal paper, and photographic paper, or the user very likely sets paper such that after the automatic paper feeder 1007 of the PD printer 1000 fed two sheets of normal paper for use for the image data transferred via the transfer #1 and the PD printer 1000 completed the printing of the image data transferred via the transfer #1-1 and the transfer #1-2, the user places photographic paper for use for the image data transferred via the transfer #2. In the present discussion, it is assumed by way of example that the paper size is A4 for both print jobs.

Reference numeral 5271 denotes the timing of the start of printing (printing #1-1) for image data given via the transfer (transfer #1-1) from the DSC #1, reference numeral 5272 denotes the timing of the end of printing #1-1, reference numeral 5273 denotes the timing of the start of printing (printing #2) for image data given via the transfer (transfer #2) from the DSC #2, reference numeral 5274 denotes the timing of the end of printing #2, reference numeral 5275 denotes the timing of the start of printing (printing #1-2) for image data given via the transfer (transfer #1-2) from the DSC #1, and reference numeral 5276 denotes the timing of the end of printing #1-2.

In the above operation, normal paper specified by a user for the second image data transferred (#1-2) from the DSC #1 is fed in step 5273, and photographic paper specified by a user for the image data transferred (#2) from the DSC #2 is fed in step 5275. The result of this is that the photographic image in the JPEG format is printed on the normal paper in step 5274, and the document in the PNG format is printed on the photographic paper in step 5074.

In view of the above-described problem, the present embodiment of the invention provides a technique to reduce that risk that in the printing operation in the transfer start priority mode, content is printed on wrong paper against the intention of a user. The technique is described in detail below with reference to a timing chart shown in FIG. 35 and a flow chart shown in FIG. 36.

Figure 35:
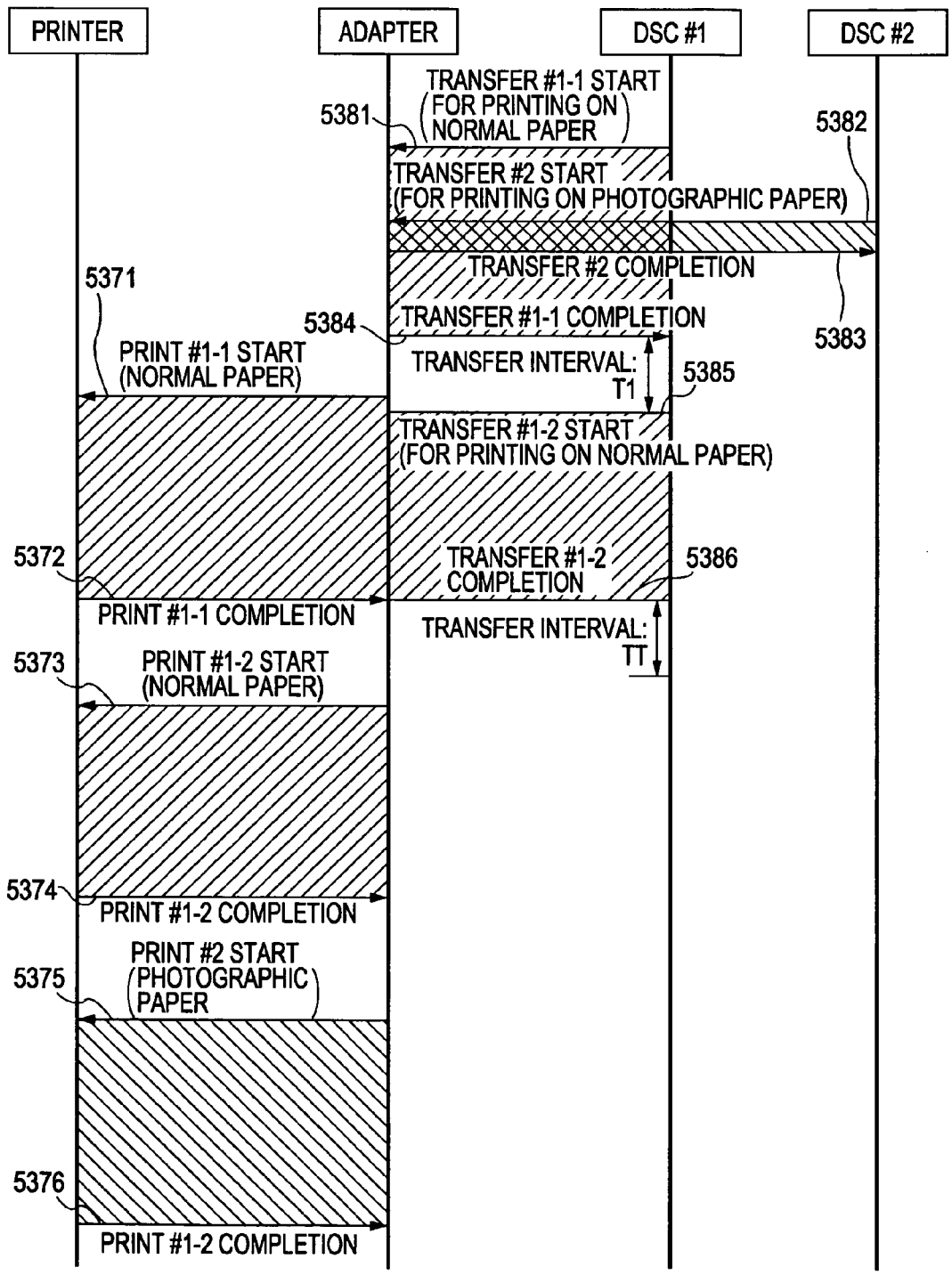
FIG. 35 is a timing chart of an improved direct printing operation in an environment in which image data is supplied from a plurality of image supply devices according to an embodiment of the present invention, wherein an occurrence of a problem is prevented.

FIG. 35 is a timing chart of an improved direct printing operation in an environment in which a plurality of image data are supplied from a plurality of image supply devices according to an embodiment of the present invention.

In the example shown in FIG. 35, as in the example shown in FIG. 34, the DSC #1 transfers two contents to be printed on normal paper (for example, two document images in the PNG format) to the adapter 1200 and the DSC #2 transfers one content to be printed on photographic paper (for example, a photographic image in the JPEG format) to the adapter 1200.

In FIG. 35, steps 5381 to 5386 are similar to steps 5281 to 5286 shown in FIG. 34, and thus a duplicate explanation thereof is omitted.

Reference numeral 5371 denotes the timing of the start of printing (printing #1-1) for image data given via the transfer (transfer #1-1) from the DSC #1, reference numeral 5372 denotes the timing of the end of printing #1-1, reference numeral 5373 denotes the timing of the start of printing (printing #1-2) for image data given via the transfer (transfer #1) from the DSC #1, reference numeral 5374 denotes the timing of the end of printing #1-2, reference numeral 5375 denotes the timing of the start of printing (printing #2) for image data given via the transfer (transfer #2) from the DSC #2, and reference numeral 5376 denotes the timing of the end of printing #2.

In the above operation, normal paper specified by a user for the second image data transferred (#1-2) from the DSC #1 is fed in step 5373, and photographic paper specified by a user for the image data transferred (#2) from the DSC #2 is fed in step 5375. As a result, the document in the PNG format is printed on the correct normal paper in step 5374, and the photographic image in the JPEG format is printed on the correct photographic paper in step 5375.

FIG. 36 is a flow chart of the improved direct printing operation in the environment in which a plurality of image data is supplied from a plurality of image supply devices according to the present embodiment of the invention.

In FIG. 36, as in FIG. 27, 30, or 33, the process performed by the adapter 1200 is shown for steps after the initialization shown in FIG. 22 is completed.

(5401) A transfer start notification sent from the DSC #1 is received and processed in a similar manner to steps 4501 to 4510 in the transfer start priority mode shown in FIG. 27, and thus a further detailed explanation thereof is omitted herein.

(5411) A transfer start notification sent from the DSC #2 is received and processed in a similar manner to steps 5111 to 5120 shown in FIG. 33, and thus a further detailed explanation thereof is omitted herein.

(5441) A determination is made as to whether TT seconds have been elapsed since the completion of transfer from the DSC #1 without receiving a next image transfer notification from the DSC #1. If the answer to step 5441 is Yes, the process proceeds to step 5442, but otherwise to step 5451.

(5442) It is determined that transfer of image data was completed for all image data when the latest transfer of image data was completed. The data indicating the start time of the transfer from the DSC #1 is cleared, and the process proceeds to step 5451.

(5451) A determination is made as to whether TT seconds have been elapsed since the completion of transfer from the DSC #2 without receiving a next image transfer notification from the DSC #2. If the answer to step 5451 is Yes, the process proceeds to step 5452, but otherwise to step 5461.

(5452) It is determined that transfer of image data was completed for all image data when the latest transfer of image data was completed. The data indicating the start time of the transfer from the DSC #2 is cleared, and the process proceeds to step 5461.

(5461) A determination is made as to whether a next image transfer notification was received within TT seconds after the previous transfer from the DSC #1 was completed. If the answer to step 5461 is Yes, the process proceeds to step 5462, but otherwise to step 5471.

(5462) It is determined that the image data transferred this time is one of a sequence of image data and further image data will be transmitted, and the start time of the transfer from the DSC #1 is set to the start time of the previous transfer so that even if a transfer request is issued from the DSC #2 during the period from the previous transfer from the DSC #1 to the current transfer from the DSC #1, the image data received via the current transfer from the DSC #1 is printed in preference to the other image data. The process then proceeds to step 5471.

(5471) A determination is made as to whether a next image transfer notification was received within TT seconds after the previous transfer from the DSC #2 was completed. If the answer to step 5471 is Yes, the process proceeds to step 5472, but otherwise to step 5421. It is determined that the image data transferred this time is one of a sequence of image data and further image data will be transmitted, and the start time of the transfer from the DSC #2 is set to the start time of the previous transfer so that even if a transfer request is issued from the DSC #1 during the period from the previous transfer from the DSC #2 to the current transfer from the DSC #2, the image data received via the current transfer from the DSC #2 is printed in preference to the other image data. The process then proceeds to step 5421 (step 5472).

Steps 5421 to 5436 are similar to steps 4521 to 4536 shown in FIG. 27 except for two points described below, and thus a duplicated explanation of similar steps is omitted.

The difference between the process shown in FIG. 36 and the process shown in FIG. 27 is that the process shown in FIG. 36 does not include two steps corresponding to steps 4524 and 4534 of the process shown in FIG. 27. This is to ensure that during the period in which the current transfer is being performed and the following period of TT seconds after the current transfer is completed, priority is given to the following image data transferred from the same DSC, if such image data is transferred. Thus, if the determination in step 5423 in FIG. 36 is Yes, the process proceeds to step 5425. In the case in which the determination in step 5433 is Yes, the process proceeds to step 5435.

In the embodiment described above, when the intervals at which a plurality of image data are transferred are shorter than the predetermined value TT, the plurality of image data are regarded as belonging to the same print job. However, other criteria may be employed for the determination. For example, the threshold value of the transfer interval may be varied in proportion to the time needed to transfer image data, or the determination may be made based on the total time needed to complete printing. It is not needed to fix the threshold value, but the threshold value may be set separately depending on the communication method (such as IrDA, Bluetooth, etc.) or the image format (such as JPEG, PNG, etc.) so that differences in transfer timing due to differences of the communication method or the image format are properly reflected in the determination.

In any case, a plurality of image data, which belong to the same print job but which are transferred separately, is correctly detected and printed on correct paper.

Other Embodiments

The method of transferring image/print data is not limited to those employed in the above-described embodiments. The advantages of the present invention can be achieved regardless of the order of steps in the transfer procedure or regardless of whether the transfer start procedure is performed by a sender or a receiver. For example, in the embodiments described above, the transfer of image data from a DSC to the adapter is started when a transfer start notification is sent from the DSC. Alternatively, the adapter may periodically transmit an image transfer request to a DSC (or DSCs) at predetermined intervals, and transfer of image data may be started when an image transfer acceptance response is returned from the DSC (from one of the DSCs).

In the embodiments described above, it is assumed that the image supply device is the digital camera 1100, the adapter is the adapter 1200, and the image output device is the PD printer 1000. However, devices are not limited to those employed in the embodiments described above. For example, not only the digital camera but also other devices such as a mobile device capable of storing image data, a playback device such as a DVD player or a CD player, et. may be used as the image supply device.

In the embodiments described above, it is assumed that the digital camera 1100 and the adapter 1200 are connected to each other via a communication channel dedicated to data transfer. However, the present invention is not limited to such a connection. The advantages of the present invention may also be achieved when the digital camera 1100 and the adapter 1200 is connected via a communication channel other than the direct print connection between the adapter 1200 and the PD printer 1000. For example, the digital camera 1100 and the adapter 1200 may be connected to each other via a simplified direct print connection.

The present invention may also be achieved by directly or remotely supplying a software program that implements one or more functions according to any of the above-described embodiments of the present invention to a system or an apparatus, reading the supplied software program, and executing the software program. Note that the term "software program" is herein used to describe not only a program in a narrow sense but a wide variety of means that provides a function of a program. Thus, a program code installed on a computer to implement one or more functions according to any of the above-described embodiments of the invention on the computer also falls within the scope of the present invention. That is, a computer program for implementing one or more functions according to any of the above-described embodiments of the invention also falls within the scope of the present invention. In this case, there is no particular restriction on the form of the program as long as it functions as a program. That is, the program may be realized in various forms such as an object code, a program executed by an interpreter, script data supplied to an operating system, etc.

As for a storage media used to supply the program, a ROM, a floppy (registered trademark) disk, a hard disk, an optical disk, a magneto-optical disk, a MO, a CD-ROM, a CD-R, a CD-RW, a magnetic tape, and a nonvolatile memory card, a ROM, a DVD (DVD-ROM or DVD-R) may be used. The program may also be supplied such that a client computer is connected to an Internet Web site via a browser, and an original computer program according an embodiment of the present invention or a file including the computer program expressed in a compressed form and an automatic installer is downloaded into a storage medium such as a hard disk of the client computer. The program code of the program according an embodiment of the present invention may be divided into a plurality of files, and respective files may be downloaded from different Web sites. Thus, a WWW server that provide a program file that allows the functions according to an embodiment of the present invention to be implemented on a computer also falls within the scope of the present invention.

The program according to the present invention may be stored in an encrypted form on a storage medium such as a CD-ROM and may be distributed to users. Particular authorized users are allowed to download key information used to decrypt the encrypted program from a Web site via the Internet. The decrypted program may be installed on a computer thereby achieving the functions according to an embodiment of the present invention.

Furthermore, the functions according to any of the above-described embodiments of the present invention can be implemented not only by executing a program on a computer, but also by performing a part or all of the process with an operating system (OS) running on the computer in accordance with the program.

To implement one or more functions according to any of the above-described embodiments of the invention, the program stored on a storage medium may be loaded into a memory of an extension card inserted in a computer or into a memory of an extension unit connected to the computer, and part or all of the process may be performed by a CPU disposed on the extension card or the extension unit in accordance with the loaded program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-174925 filed Jun. 15, 2005, which is hereby incorporated by reference herein in its entirety.

What is claimed is:

1. An adapter for communicating with an image supply device and a printing device in order to print, via the printing device, an image stored in the image supply device, comprising:

a first acquisition unit configured to acquire a first image from a first image supply device;
a second acquisition unit configured to acquire a second image from a second image supply device;
a print request transmission unit configured to transmit a print request for the first image acquired by the first acquisition unit to the printing device to print the first image before the acquisition of the first image, the print request including image designation information for designating an image to be printed;
a reception unit configured to receive, from the printing device, a transfer request of the first image to be printed with the print request for the first image, the transfer request being issued in response to the print request for the first image; and
a transfer unit configured to transfer the first image to the printing device in response to receipt of the transfer request of the first image, as an image to be printed with the print request for first image,
wherein, when the acquisition of the second image is completed before the acquisition of the first image is completed and predetermined attribute information for each of the first image and the second image is same, (i) the transfer unit transfers the second image as an image to be printed with the print request for the first image in response to receipt of the transfer request, and (ii) the print request transmission unit retransmits the print request for requesting the printing of the first image after the printing device has finished printing the second image.

2. The adapter according to claim 1, wherein the predetermined attribute information is image format information.

3. An adapter for communicating with an image supply device and a printing device in order to print, via the printing device, an image stored in the image supply device, comprising:

a first acquisition unit configured to acquire a first image from a first image supply device;
a second acquisition unit configured to acquire a second image from a second image supply device;
a print setting acquisition unit configured to acquire a print setting for the first image and a print setting for the second image;
a print request transmission unit configured to transmit a print request for the first image acquired by the first acquisition unit to the printing device to print the first image before the acquisition of the first image, the print request including image designation information for designating the first image and print setting information on the print settings acquired by the print setting acquisition unit;
a reception unit configured to receive, from the printing device, a transfer request of the first image to be printed with the print request for the first image, the transfer request being issued in response to the print request for the first image; and
a transfer unit configured to transfer the first image to the printing device in response to receipt of the transfer request of the first image, as an image to be printed with the print request for first image,
wherein, when the acquisition of the second image is completed before the acquisition of the first image is completed and the print setting for the first image and the print setting for the second image are the same, (i) the transfer unit transfers the second image as an image to be printed with the print request for the first image in response to receipt of the transfer request and (ii) the print request transmission unit retransmits the print request for requesting the printing of the first image after the printing device has finished printing the second image.

4. The adapter according to claim 3, wherein the print setting includes settings associated with a paper size, and
wherein, when the acquisition of the second image is completed before the acquisition of the first image is completed and a paper size setting for the first image and a paper size setting for the second image are the same, the transfer unit transfers the second image instead of the first image in response to the transfer request of the first image corresponding to the print request.

5. The adapter according to claim 3, wherein the first acquisition unit acquires the image by a transfer method different from a transfer method employed by the second acquisition unit.

6. The adapter according to claim 3, wherein the print request transmission unit transmits the print request before completion of the acquisition of the first image.

7. A method of controlling an adapter for communicating with an image supply device and a printing device in order to print, via the printing device, an image stored in the image supply device, comprising:
acquiring a first image from a first image supply device;
acquiring a second image from a second image supply device;
transmitting a print request for the acquired first image to the printing device to print the first image before the acquisition of the first image, the print request including image designation information for designating an image to be printed;
receiving, from the printing device, a transfer request of the first image to be printed with the print request for the first image, the transfer request being issued in response to the print request for the first image; and
transferring the first image to the printing device in response to receipt of the transfer request of the first image, as an image to be printed with the print request for first image,
wherein, when the acquisition of the second image is completed before the acquisition of the first image is completed and predetermined attribute information for each of the first image and the second image is same, (i) the second image is transferred as an image to be printed with the print request for the first image in the transferring step in response to receipt of the transfer request, and (ii) the print request for requesting the print of the first image is retransmitted after the printing device has finished printing the second image.

8. The method of controlling the adapter according to claim 7, wherein the print request includes print setting information associated with the first image.

9. The method of controlling the adapter according to claim 7, wherein the predetermined attribute information is image format information.

10. A method of controlling an adapter for communicating with an image supply device and a printing device in order to print, via the printing device, an image stored in the image supply device, comprising:
acquiring a first image from a first image supply device;
acquiring a second image from a second image supply device;
acquiring a print setting for the first image and a print setting for the second image;
transmitting a print request for the acquired first image to the printing device to print the first image before the acquisition of the first image, the print request including image designation information for designating the first image and print setting information on the print settings acquired in the print setting acquiring step;
receiving, from the printing device, a transfer request of the first image to be printed with the print request for the first image, the transfer request being issued in response to the print request for the first image; and
transferring the first image to the printing device in response to receipt of the transfer request of the first image, as an image to be printed with the print request for first image,
wherein, when the acquisition of the second image is completed before the acquisition of the first image is completed and the print setting for the first image and the print setting for the second image are the same, (i) the second image is transferred in the transferring step as an image to be printed with the print request for the first image in response to receipt of the transfer request, and (ii) the print request for requesting the printing of the first image is retransmitted after the printing device has finished printing the second image.

11. The method of controlling the adapter according to claim 10,
wherein the print setting includes settings associated with a paper size, and
wherein, when the acquisition of the second image is completed before the acquisition of the first image is completed and a paper size setting for the first image and a paper size setting for the second image are the same, the second image instead of the first image is transferred in the transferring step in response to the transfer request of the first image.

* * * * *